United States Patent
Mills et al.

(10) Patent No.: US 10,400,713 B2
(45) Date of Patent: Sep. 3, 2019

(54) ELECTRICALLY CONTROLLED FUEL SYSTEM MODULE

(71) Applicant: Eaton Corporation, Cleveland, OH (US)

(72) Inventors: Vaughn K. Mills, Chelsea, MI (US); Matthew Memmer, Plymouth, MI (US); Curtis T. Moy, Oxford, MI (US); Steven Ambrose, Farmington Hills, MI (US); Russell Trapp, Ypsilanti, MI (US); Robert P. Benjey, Dexter, MI (US); Max Russell Franklin, Birmingham, MI (US); Kenneth Brauning, Clinton Township, MI (US); Santosh Balasaheb Patil, Pune (IN); Atish Dinkar Gawale, Nasik (IN); Santosh Kumar Sharma, Pune (IN); Hrushikesh Arun Barve, Pune (IN); Pritam Bhurke, Pune (IN); Daniel L. Pifer, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 111 days.

(21) Appl. No.: 15/468,739

(22) Filed: Mar. 24, 2017

(65) Prior Publication Data
US 2018/0087475 A1    Mar. 29, 2018

Related U.S. Application Data

(63) Continuation-in-part of application No. PCT/US2015/051950, filed on Sep. 24, 2015.
(Continued)

(30) Foreign Application Priority Data

Mar. 21, 2017 (IN) .............................. 201711009914

(51) Int. Cl.
*F02M 25/08* (2006.01)
*F02D 41/00* (2006.01)
(Continued)

(52) U.S. Cl.
CPC ... *F02M 25/0836* (2013.01); *B60K 15/03504* (2013.01); *B60K 15/03519* (2013.01);
(Continued)

(58) Field of Classification Search
CPC .......... F02M 25/0836; F02M 25/0872; F02M 25/0809; F02M 25/089; F02D 41/004
See application file for complete search history.

(56) References Cited

U.S. PATENT DOCUMENTS 4,880,135 A * 11/1989 Neou ..................... B65D 88/62
220/721
5,282,497 A    2/1994 Allison
(Continued)

FOREIGN PATENT DOCUMENTS

DE    10247935 A1    4/2004
EP    1031725 A2    8/2000
(Continued)

OTHER PUBLICATIONS

European Search Report for EP Application No. 15844048.7 dated Mar. 14, 2018, 8 pages.
(Continued)

Primary Examiner — Joseph J Dallo
(74) Attorney, Agent, or Firm — RMCK Law Group PLC

(57) ABSTRACT

A fuel tank system constructed in accordance to one example of the present disclosure includes a fuel tank, a first vent tube, an evaporative emissions control system and a cam driven tank venting control assembly. The first vent tube is disposed in the fuel tank. The evaporative emissions control system is configured to recapture and recycle emitted
(Continued)

fuel vapor. The evaporative emissions control system has a controller. The cam driven tank venting control assembly has a rotary actuator that rotates a cam assembly based on operating conditions. The cam assembly has at least a first cam having a first cam profile configured to selectively open and close the first vent tube based on operating conditions.

20 Claims, 61 Drawing Sheets

Related U.S. Application Data

(60) Provisional application No. 62/054,657, filed on Sep. 24, 2014, provisional application No. 62/056,063, filed on Sep. 26, 2014, provisional application No. 62/061,344, filed on Oct. 8, 2014, provisional application No. 62/114,548, filed on Feb. 10, 2015, provisional application No. 62/140,112, filed on Mar. 30, 2015, provisional application No. 62/356,851, filed on Jun. 30, 2016, provisional application No. 62/336,963, filed on May 16, 2016, provisional application No. 62/339,465, filed on May 20, 2016, provisional application No. 62/455,178, filed on Feb. 6, 2017, provisional application No. 62/465,482, filed on Mar. 1, 2017, provisional application No. 62/475,584, filed on Mar. 23, 2017.

(51) Int. Cl.
*B60K 15/035* (2006.01)
*B60K 15/03* (2006.01)

(52) U.S. Cl.
CPC ......... *F02D 41/004* (2013.01); *F02M 25/089* (2013.01); *F02M 25/0809* (2013.01); *F02M 25/0872* (2013.01); *B60K 2015/0325* (2013.01); *B60K 2015/0358* (2013.01); *B60K 2015/03217* (2013.01); *B60K 2015/03509* (2013.01); *B60K 2015/03514* (2013.01); *B60K 2015/03576* (2013.01); *B60K 2015/03585* (2013.01)

(56) References Cited

U.S. PATENT DOCUMENTS

| | | | |
|---|---|---|---|
| 5,413,137 A | 5/1995 | Gimby | |
| 5,944,076 A * | 8/1999 | Palvoelgyi | B60K 15/03519 123/516 |
| 6,029,635 A * | 2/2000 | Sekine | B60K 15/035 123/516 |
| 6,176,259 B1 * | 1/2001 | Harde | B60K 15/03504 123/516 |
| 6,546,955 B1 | 4/2003 | Burke | |
| 6,609,537 B1 | 8/2003 | Horrer et al. | |
| 7,077,112 B2 | 7/2006 | Mitani et al. | |
| 7,213,582 B2 | 5/2007 | Treudt et al. | |
| 7,377,253 B2 * | 5/2008 | Washeleski | B60K 15/03504 123/198 D |
| 7,444,997 B2 | 11/2008 | Hill | |
| 7,694,665 B2 | 4/2010 | Ehrman et al. | |
| 7,814,892 B2 | 10/2010 | Hill | |
| 7,861,695 B2 | 1/2011 | Althof et al. | |
| 7,866,356 B2 * | 1/2011 | Benjey | F02M 25/089 141/198 |
| 7,908,099 B2 | 3/2011 | Behar et al. | |
| 8,146,570 B2 * | 4/2012 | Ishida | F02M 25/089 123/516 |
| 8,273,164 B2 | 9/2012 | Makino et al. | |
| 8,584,704 B2 | 11/2013 | Pifer et al. | |
| 8,887,775 B2 * | 11/2014 | Burkholder | B67D 7/362 137/433 |
| 8,955,559 B2 * | 2/2015 | Hatakeyama | B60K 15/03504 141/44 |
| 9,151,235 B2 | 10/2015 | Martin et al. | |
| 9,222,444 B2 * | 12/2015 | McLain | F02M 25/08 |
| 9,242,551 B2 | 1/2016 | Criel et al. | |
| 9,383,245 B2 | 7/2016 | Kato | |
| 9,458,802 B2 | 10/2016 | Dudar et al. | |
| 9,616,744 B2 | 4/2017 | Hill et al. | |
| 9,809,441 B2 * | 11/2017 | Dudar | B67D 7/3272 |
| 9,816,450 B2 | 11/2017 | Akita et al. | |
| 9,840,985 B2 | 12/2017 | Martin et al. | |
| 9,850,853 B2 | 12/2017 | Dudar et al. | |
| 9,890,747 B2 | 2/2018 | Williams et al. | |
| 2008/0105329 A1 * | 5/2008 | Benjey | B67D 7/0476 141/59 |
| 2012/0012599 A1 | 1/2012 | Graham et al. | |
| 2013/0160877 A1 | 6/2013 | Walter et al. | |
| 2015/0019066 A1 | 1/2015 | Dudar et al. | |
| 2015/0083088 A1 | 3/2015 | Pearce et al. | |
| 2016/0298576 A1 | 10/2016 | Reddy et al. | |
| 2018/0087475 A1 * | 3/2018 | Mills | B60K 15/03519 |

FOREIGN PATENT DOCUMENTS

| | | | |
|---|---|---|---|
| WO | 2016049320 A1 | 3/2016 | |
| WO | 2017046242 A1 | 3/2017 | |
| WO | WO 2017200636 A2 * | 11/2017 | ....... B60K 15/03519 |

OTHER PUBLICATIONS

International Search Report and Written Opinion for International Application No. PCT/US2015/051950 dated Dec. 9, 2015, 14 pages.
International Search Report and Written Opinion for International Application No. PCT/US2017/036885 dated Aug. 28, 2017, 16 pages.
International Search Report and Written Opinion for International Application No. PCT/US2017/041888 dated Sep. 28, 2017, 21 pages.

* cited by examiner

O = 2.13mm  OL = 4.88mm
Open Close Sequence

| Valve# | 1 | 2 | 3 | Angle |
|---|---|---|---|---|
| 1 | C | O | C | 10° |
| 2 | C | O | C | 50° |
| 3 | O | O | O | 90° |
| 4 | O | C | O | 130° |
| 5 | OL | OL | OL | 170° |
| 6 | C | C | O | 210° |
| 7 | C | C | C | 250° |
| 8 | C | O | O | 290° |
| 9 | O | O | C | 330° |

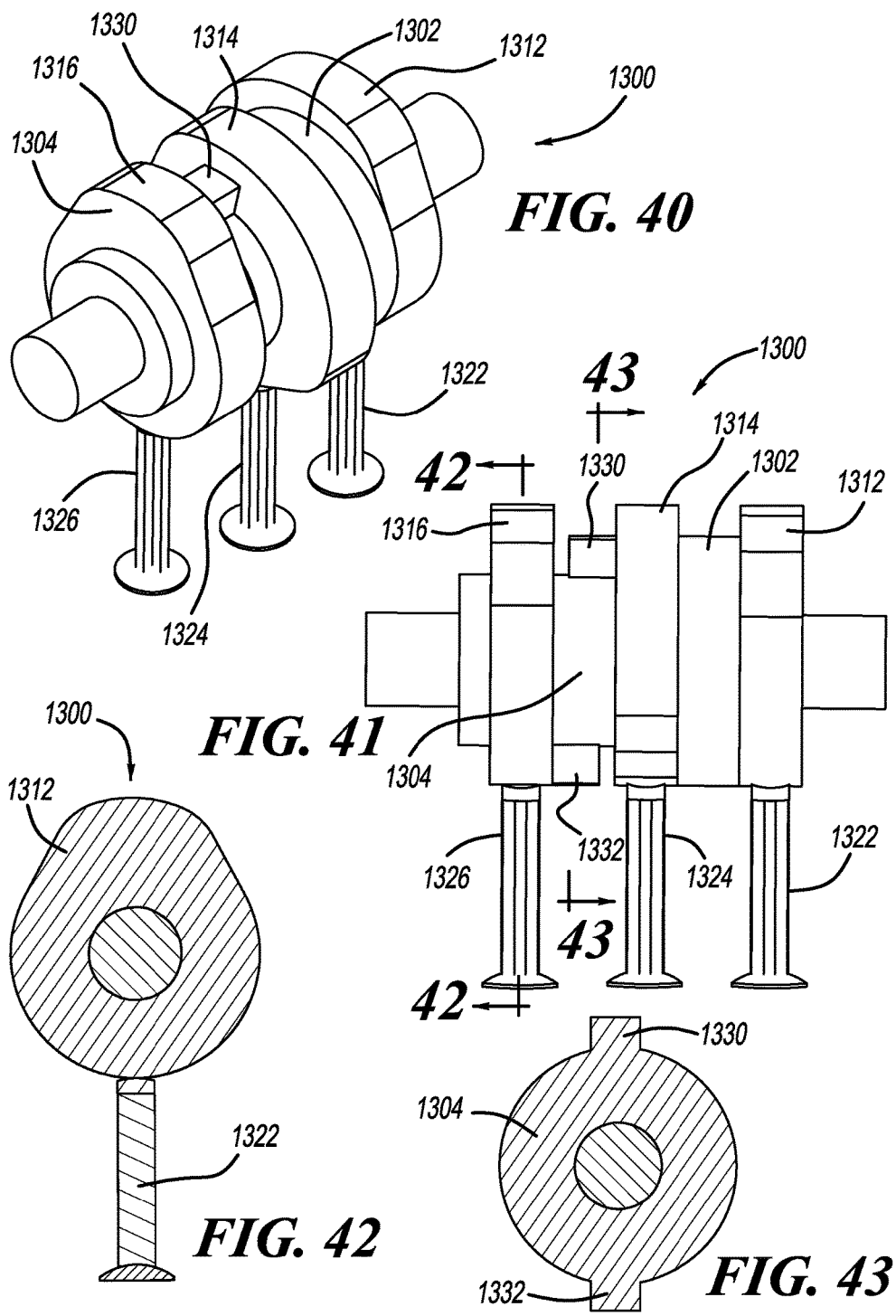

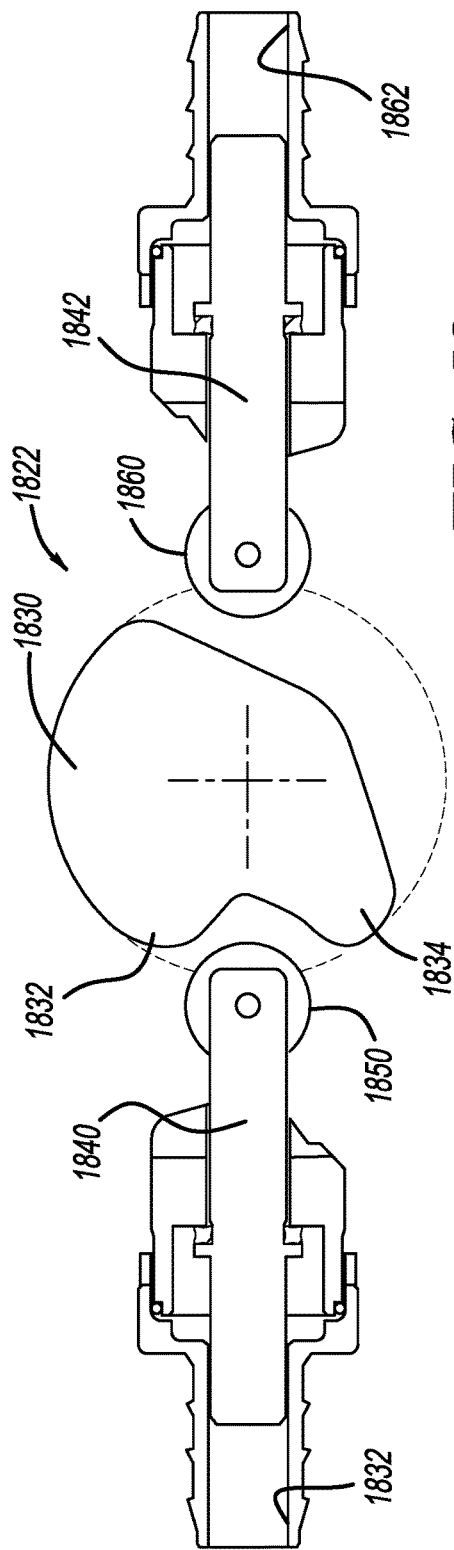
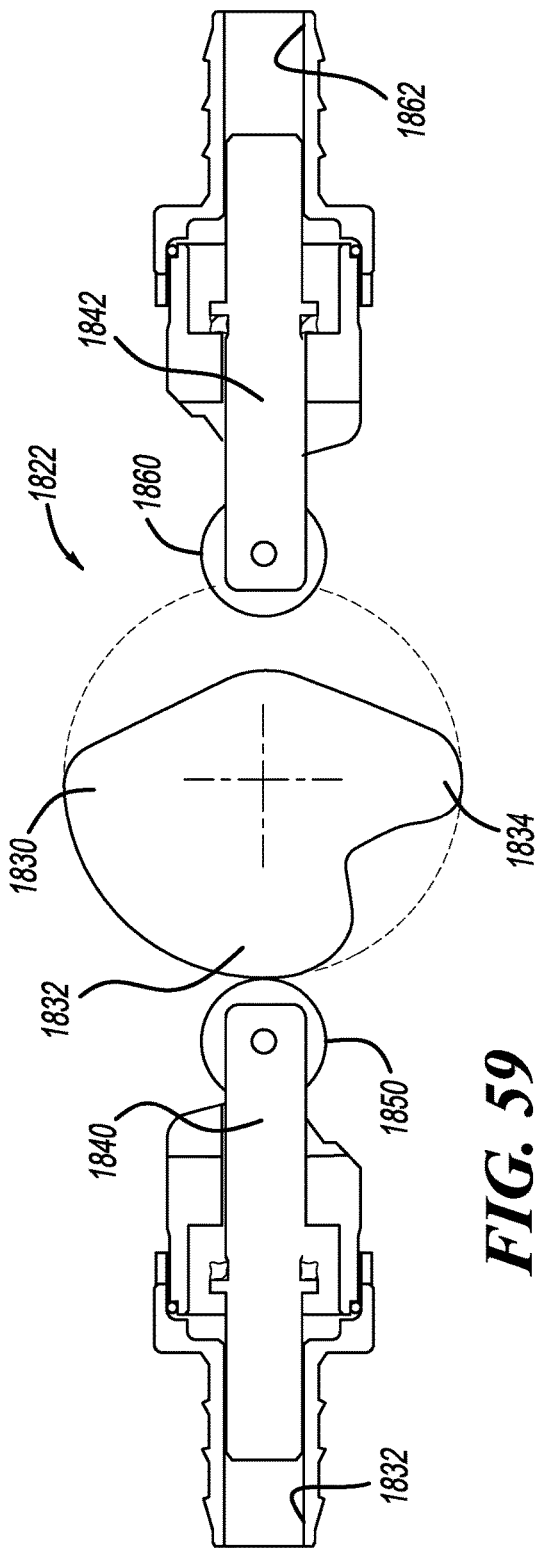
FIG. 58
FIG. 59

ELECTRICALLY CONTROLLED FUEL SYSTEM MODULE

CROSS-REFERENCE TO RELATED APPLICATIONS

This application is a continuation-in-part of International Application No. PCT/US2015/051950 filed on Sep. 24, 2015, which claims the benefit of U.S. Patent Application No. 62/054,657 filed on Sep. 24, 2014; U.S. Patent Application No. 62/056,063 filed on Sep. 26, 2014; U.S. Patent Application No. 62/061,344 filed on Oct. 8, 2014; U.S. Patent Application No. 62/114,548 filed on Feb. 10, 2015; and U.S. Patent Application No. 62/140,112 filed on Mar. 30, 2015. This application claims of the benefit of U.S. Patent Application No. 62/356,851 filed on Jun. 30, 2016. This application claims the benefit of U.S. Patent Application No. 62/336,963 filed on May 16, 2016; U.S. Patent Application No. 62/339,465 filed on May 20, 2016; U.S. Patent Application No. 62/455,178 filed on Feb. 6, 2017; U.S. Patent Application No. 62/465,482 filed on Mar. 1, 2017; U.S. Patent Application No. 62/475,584 filed on Mar. 23, 2017; and Indian Patent Application No. 201711009914 filed on Mar. 21, 2017. The disclosures of the above applications are incorporated herein by reference.

FIELD

The present disclosure relates generally to fuel tanks on passenger vehicles and more particularly to a fuel tank having an electronically controlled module that manages the complete evaporative system for the vehicle.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fuel tank system constructed in accordance to one example of the present disclosure includes a fuel tank, a first vent tube, an evaporative emissions control system and a cam driven tank venting control assembly. The first vent tube is disposed in the fuel tank. The evaporative emissions control system is configured to recapture and recycle emitted fuel vapor. The evaporative emissions control system has a controller. The cam driven tank venting control assembly has a rotary actuator that rotates a cam assembly based on operating conditions. The cam assembly has at least a first cam having a first cam profile configured to selectively open and close the first vent tube based on operating conditions.

According to additional features, the first cam profile has profiles that correspond to at least a fully closed valve position, a fully open valve position and a partially open valve position. The fuel tank system further includes a second vent tube disposed in the fuel tank. The cam assembly further comprises a second cam having a second cam profile configured to selectively open and close the second vent tube based on operating conditions. The second cam profile has profiles that correspond to at least a fully closed valve position, a fully open valve position and a partially open valve position. The fuel tank system can further comprise a third cam having a third cam profile and a fourth cam having a fourth cam profile. The third cam profile is configured to selectively open and close a third vent tube disposed in the fuel tank. The fourth cam profile is configured to selectively open and close a fourth vent tube disposed in the fuel tank. The fuel tank system further includes a first valve. The first valve selectively opens and closes based on rotation of the first cam. The first valve can be a poppet valve. The fuel tank system can further include a second valve. The second valve selectively opens and closes based on rotation of the second cam. The second valve can be a poppet valve.

A fuel tank system constructed in accordance to additional features of the present disclosure includes a fuel tank and an evaporative emissions control system. The evaporative emissions control system is configured to recapture and recycle emitted fuel vapor. The evaporative emissions control system includes a liquid trap, a first device, a second device, a control module and a G-sensor. The first device is configured to selectively open and close a first vent. The second device is configured to selectively open and close a second vent. The control module regulates operation of the first and second solenoids to provide over-pressure and vacuum relief for the fuel tank. The G-sensor provides a signal to the control module based on a measured acceleration.

According to additional features, the fuel tank system includes a jet pump that is driven by the fuel pump. The liquid trap signals the control module to actuate a jet pump solenoid to turn on the jet pump when the liquid trap fills to a predetermined point and run for a specific period of time. The fuel tank system can further include a liquid trap level sensor that measures liquid level in the liquid level trap. The fuel tank system can include a fuel level sensor. The fuel level sensor indicates fuel level thereat. The first and second devices close based on the fuel level reaching a threshold. The first device is selectively opened and closed to adjust the rate of pressure rise within the fuel tank. The first device can be a first solenoid. The second device can be a second solenoid.

A fuel tank system constructed in accordance to one example of the present disclosure includes a fuel tank and an evaporative emission control system. The evaporative emissions control system is configured to recapture and recycle emitted fuel vapor. The evaporative emissions control system further includes a manifold assembly having a first solenoid and a second solenoid. The control module is configured to regulate operation of the first and second solenoids to selectively open and close pathways in the manifold assembly to provide over-pressure and vacuum relief for the fuel tank.

According to additional features, the fuel tank system can further include a first roller over valve pick up tube disposed in the fuel tank and fluidly connected to the manifold assembly. A second roll over valve pick up tube can be disposed in the fuel tank and is fluidly connected to the manifold assembly. A fuel line vent vapor (FLVV) pick-up tube can be disposed in the fuel tank and be fluidly connected to the manifold assembly. A float level sensor assembly can be disposed in the fuel tank and be configured to provide a signal to the control module indicative of a fuel level state.

According to other features, a first vent valve can be disposed in the fuel tank and be fluidly connected to the manifold assembly. A second vent valve can be disposed in the fuel tank and be fluidly connected to the manifold assembly. The fuel tank system can further include a liquid trap. The liquid trap can further comprise a venturi jet that is configured to drain liquid from the liquid trap by way of a vacuum. One of the first and second vent valves can further comprise a liquid vapor discriminator. One of the first and second vent valves comprises a solenoid activated vent valve. The solenoid activated vent valve can further comprise a vent valve body that defines a first opening and a second opening. The first opening communicates with a canister. The second opening communicates with the manifold assembly. The solenoid activated vent valve further includes a biasing member that biases a spring plate toward a seal. The spring plate further comprises an overmolded diaphragm.

An evaporative emissions control system configured to recapture and recycle emitted fuel vapor on a vehicle fuel tank constructed in accordance to one example of the present disclosure includes a first vent tube, a second vent tube, a first vent valve, a second vent valve, a vent shut-off assembly and a control module. The first and second vent tubes are disposed in the fuel tank. The first vent valve is disposed on the first vent tube and is configured to selectively open and close a first port fluidly coupled to the first vent tube. The second vent valve is disposed on the second vent tube and is configured to selectively open and close a second port fluidly coupled to the second vent tube. The vent shut-off assembly selectively opens and closes the first and second valves to provide overpressure and vacuum relief for the fuel tank. The control module regulates operation of the vent shut-off assembly based on operating conditions.

According to other features, the vent shut-off assembly comprises a cam assembly having a cam shaft that includes a first cam and a second cam. The first and second cams have respective profiles that correspond to at least a fully opened valve position, a fully closed valve position and a partially open valve position. The first and second vent valves are caused to selectively open and close based on rotation of the respective first and second cams to deliver fuel vapor through the respective first and second tubes. The evaporative emissions control system can further include an actuator assembly that drives the cam assembly. The actuator assembly includes a motor. The motor can include a direct current motor that rotates a worm gear that in turn drives a drive gear coupled to the cam shaft.

According to other features, the cam assembly is received in a housing. The motor is mounted outboard of the housing. In another arrangement, the cam assembly and the motor can be received in a housing. The housing can further include a drain configured thereon. The evaporative emissions control system can further include a third valve tube and a third vent valve. The third vent tube is disposed in the fuel tank. The third vent valve is disposed on the third vent tube and is configured to selectively open and close a third port fluidly coupled to the third vent tube. The cam assembly further includes a third cam that selectively opens and closes a third port fluidly coupled to the third vent valve.

In other features, the third port is configured solely as a refueling port. During refueling, the third valve is opened by the third cam until the control module controls the vent shut-off assembly to close the third valve based on a fuel level reaching a predetermined level corresponding to a "Fill" position. The vent shut-off assembly can include a first cam shaft having a first cam and a second cam shaft having a second cam. The first and second cam shafts can be coaxial and configured for relative rotation. The second cam shaft is configured to rotate upon engagement of a first tab arranged on the first cam shaft and a second tab arranged on the second cam shaft.

According to other features, the vent shut-off assembly comprises a solenoid that actuates a valve member assembly relative to a valve body. The valve body has a first inlet, a second inlet and an outlet. The valve member assembly comprises a first valve closing element, a second valve closing element and a third valve closing element. The first valve closing element is supported by a distal shaft. The second valve closing element defines apertures therethrough and is supported by the distal shaft. The third valve closing element is supported by a proximal shaft. The first valve closing element selectively closes the first inlet. The second and third valve closing elements selectively close the second inlet. A first biasing member can be arranged between a first spring support and the first valve closing element. The first biasing member biases the first closing element toward a closed position. A second biasing member can be arranged between the first spring support and the second valve closing element. The second biasing member biases the second closing element toward a closed position. A third biasing member can be arranged between a second spring support and the third valve closing element. The third biasing member can bias the third closing element toward a closed position.

In other features, the vent shut-off assembly comprises a single cam having a first cam lobe that selectively engages the first vent valve and a second cam lobe that selectively engages the second vent valve. The single cam selectively rotates between four venting positions. In a first position, the first and second valves are closed. In a second position, the first valve is open and the second valve is closed. In a third position, the first valve is closed and the second valve is open. In a fourth position, the first and second valves are open. In one arrangement, a valve shuttle collectively comprises the first and second vent valves. The valve shuttle can translate within a main housing that defines a first port, a second port, a third port and a fourth port. An actuator assembly drives the cam assembly. The actuator assembly includes a motor that actuates a ball screw mechanism. Actuation of the ball screw mechanism translates the valve shuttle within the main housing.

In another configuration, the vent shut-off assembly comprises a rack and pinion assembly having a drive gear driven by a motor and a driven gear that rotates at least one cam. The vent shut-off assembly can include a pneumatically driven motor that drives at least one cam. The vent shut-off assembly can include a hydraulically driven motor that drives at least one cam. An energy storage device can be connected to the vent shut-off assembly. The energy storage device provides power to the vent shut-off assembly in the event of power loss. The vent shut-off assembly can include a solenoid valve having a valve body that defines a first port, a second port and a third port. A first seal assembly selectively opens and closes the first port. A second seal assembly selectively opens and closes the second port. First and second electromagnetic coils selectively move the respective first and second seal assemblies. The first vent valve can be two-staged. In one arrangement, the actuator assembly is driven by a fuel pump in the fuel tank.

According to other features, the vent shut-off assembly includes a cam disk that selectively translates first and second valves in a follower guide to open the respective first and second ports. The first and second valves include respective cam followers on distal ends thereof. The cam followers slidably engage a cam profile arranged on the cam disk. A manifold defines fluid paths associated with the first and second ports.

A fuel tank system constructed in accordance to additional features of the present disclosure includes a fuel tank and an evaporative emissions control system. The evaporative emissions control system is configured to recapture and recycle emitted fuel vapor. The evaporative emissions control system includes a first vent valve, a second vent valve, a pressure sensor and a control module. The first vent valve is configured to selectively open and close a first vent. The second vent valve is configured to selectively open and close a second vent. The pressure sensor is configured to sense a pressure in the fuel tank. The control module is configured to regulate operation of the first and second vent valves to provide over-pressure and vacuum relief for the fuel tank. The control module is programmed to periodically monitor the pressure in the fuel tank. Future control of the first and second vent valves is based on differences in the measured fuel tank pressure and the liquid level.

According to other features, the control module is programmed to maintain the first and second vent valves in a current position if a currently measured fuel tank pressure is greater than a previously measured fuel tank pressure. The fuel tank system can further include a liquid trap, a liquid level sensor, a fuel level sensor and a G-sensor. The liquid level sensor can be configured to determine a liquid level in the liquid trap. The fuel level sensor can be configured to determine a fuel level in the fuel tank. The G-sensor can provide a signal to the control module based on a measured acceleration. The control module is further programmed to determine if a G-sensor and fuel level measurement combination are part of an existing dynamic map.

A method of controlling an evaporative emissions control system associated with a fuel tank and configured to recapture and recycle emitted fuel vapor is provided. The evaporative emissions control system includes a liquid trap, a first vent valve configured to selectively open and close a first vent, a second vent valve configured to selectively open and close a second vent, and a G-sensor configured to measure an acceleration of the fuel tank. The first and second vent valves are set in a first position. A first fuel tank pressure is determined. A second fuel tank pressure is determined. A determination is made whether the second fuel tank pressure is greater than the first fuel tank pressure. The first and second vent valves are maintained in the first position if the second fuel tank pressure is greater than the first fuel tank pressure. An acceleration from the G-sensor and a fuel level in the fuel tank is determined if the second fuel tank pressure is not greater than the first fuel tank pressure. The first and second valves are set to a second position based on the determined acceleration and fuel level. A determination is made whether the determined acceleration and fuel level are part of an existing dynamic map associated with the evaporative emissions control system. The determined acceleration and fuel level are subsequently added to the dynamic map.

BRIEF DESCRIPTION OF THE DRAWINGS

The present disclosure will become more fully understood from the detailed description and the accompanying drawings, wherein:

FIG. 40 is a front perspective view of a vent shut-off assembly constructed in accordance to another example of the present disclosure;

FIG. 41 is a front view of the vent shut-off assembly of FIG. 40;

FIG. 42 is a sectional view of the vent shut-off assembly of FIG. 41 taken along lines 42-42;

FIG. 43 is a sectional view of the vent shut-off assembly of FIG. 41 taken along lines 43-43;

FIG. 58 is a sectional view of a vent shut-off assembly constructed in accordance to another example of the present disclosure and shown in a first venting state where first and second poppet valves are closed;

FIG. 59 is a sectional view of the vent shut-off assembly of FIG. 58 and shown with the first poppet valve open and the second poppet valve closed;

DETAILED DESCRIPTION

Figure 1:
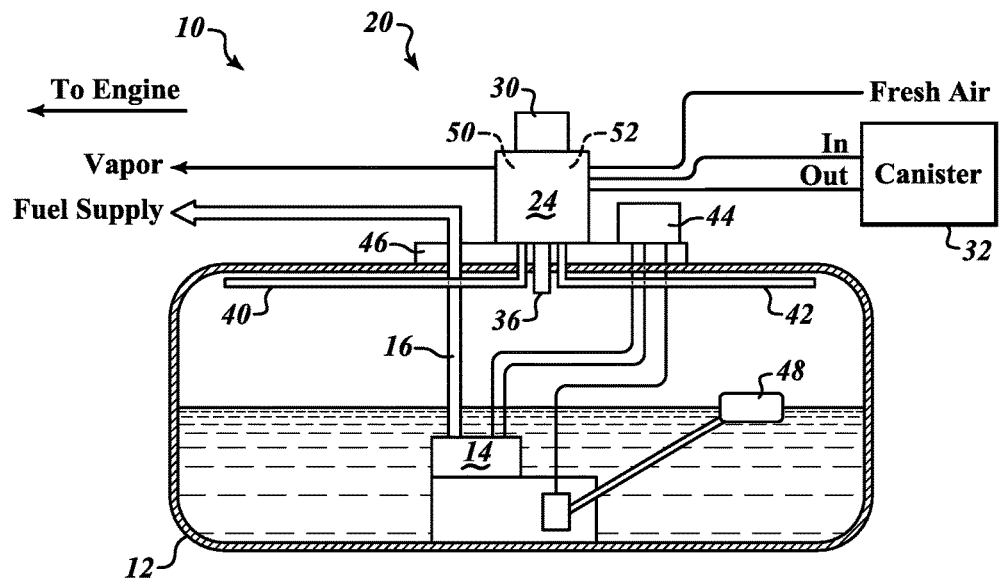
FIG. 1 is a schematic illustration of a fuel tank system having an evaporative emissions control system including a manifold having two solenoids, a controller, an electrical connector and associated wiring in accordance to one example of the present disclosure.

With initial reference to FIG. 1, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump 14. The fuel pump 14 can be configured to deliver fuel through a fuel supply line 16 to a vehicle engine. An evaporative emissions control system 20 can be configured to recapture and recycle the emitted fuel vapor. As will become appreciated from the following discussion, the evaporative emissions control system 20 provides an electronically controlled module that manages the complete evaporative system for a vehicle. The evaporative control system 20 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 20 may also be compatible with pressurized systems including those associated with hybrid powertrain vehicles.

Figure 3:
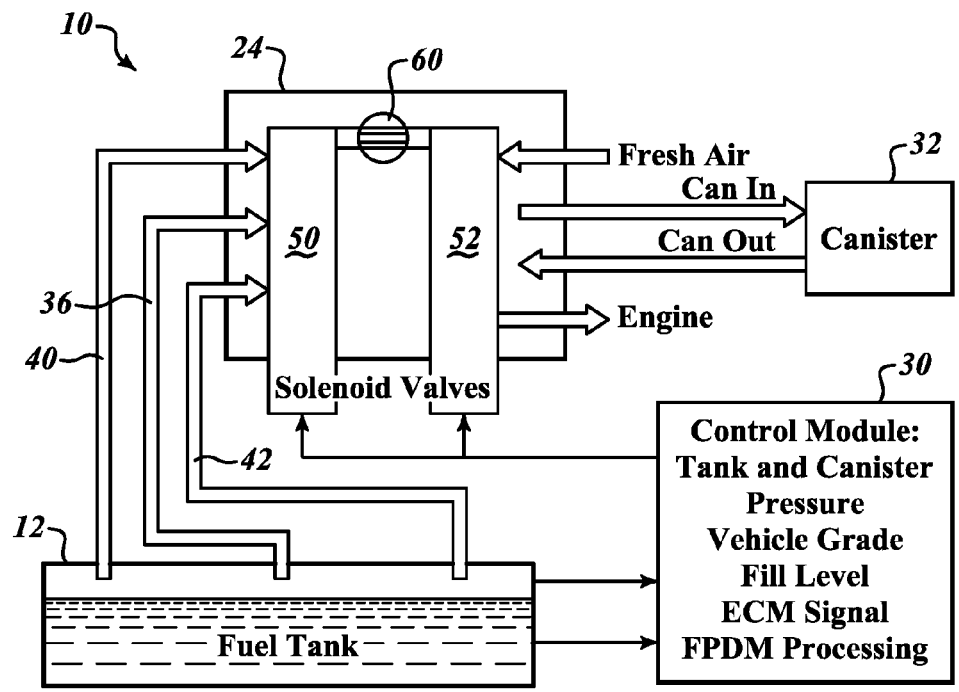
FIG. 3 is schematic illustration of the fuel tank system of FIG. 1 according to a first implementation.

The evaporative emissions control system 20 includes a manifold assembly 24, a control module 30, a purge canister 32, a fuel line vent vapor (FLVV) pick-up tube 36, a first roll-over valve (ROV) pick-up tube 40, a second ROV pick up tube 42, an electrical connector 44, a fuel delivery module (FDM) flange 46 and a float level sensor assembly 48. In one example, the manifold assembly 24 can include a manifold body including conventional worm tracks and further comprise first and second solenoid 50, 52 (FIG. 3). The first solenoid 50 can be a tank side solenoid. The second solenoid 52 can be a canister side solenoid. The control module 30 can be adapted to regulate the operation of first and second solenoids 50, 52 to selectively open and close pathways in the manifold assembly 24, in order to provide over-pressure and vacuum relief for the fuel tank 12. The manifold 24 can additionally comprise a mechanical grade shut-off valve 60 (FIG. 3).

The control module 30 can further include or receive inputs from a tank pressure sensor, a canister pressure sensor, a temperature sensor and a vehicle grade sensor. The control module 30 can additionally include fill level signal reading processing, fuel pressure driver module functionality and be compatible for two-way communications with a vehicle electronic control module (not specifically shown). The manifold assembly 24 can be configured to control a flow of fuel vapor between the fuel tank 12 and the purge canister 32. The purge canister 32 adapted to collect fuel vapor emitted by the fuel tank 12 and to subsequently release the fuel vapor to the engine. The control module 30 can also be configured to regulate the operation of evaporative emissions control system 20 in order to recapture and recycle the emitted fuel vapor. The float level sensor assembly 48 can provide fill level indications to the control module 30. The control module 30 can close the first solenoid 50 when the float level sensor assembly 48 provides a signal indicative of a full fuel level state. While the control module 30 is shown in the figures generally adjacent to the solenoids 50 and 52, the control module 30 may be located elsewhere in the evaporative emissions control system 20 such as adjacent the canister 32 for example.

With continued reference to FIG. 1, additional features of the evaporative emissions control system 20 will be described. In one configuration, the ROV pick-up tube 40 and the ROV pick-up tube 42 can be secured to the fuel tank 12 with clips. By way of non-limiting example, the inner diameter of the FLVV pick-up tube 36 can be 12 mm. The inner diameter of the ROV pick-up tubes 40 and 42 can be 3-4 mm. The ROV pick-up tubes 40 and 42 can be routed to high points of the fuel tank 12. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 20 can replace conventional fuel tank systems that require mechanical components including in-tank valves with an electronically controlled module that manages the complete evaporative system for a vehicle. In this regard, some components that may be eliminated using the evaporative emissions control system 20 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 30, manifold 24, solenoids 50, 52 and associated electrical connector 44. Various other components may be modified to accommodate the evaporative emissions control system 20 including the fuel tank 12. For example, the fuel tank 12 may be modified to eliminate valves and internal lines to pick-up points. The flange of the FDM 46 may be modified to accommodate the manifold 24, the control module 30 and the electrical connector 44. In other configurations, the fresh air line of the canister 32 and dust box may be modified. In one example, the fresh air line of the canister 32 and the dust box may be connected to the control module 30.

Figure 2:
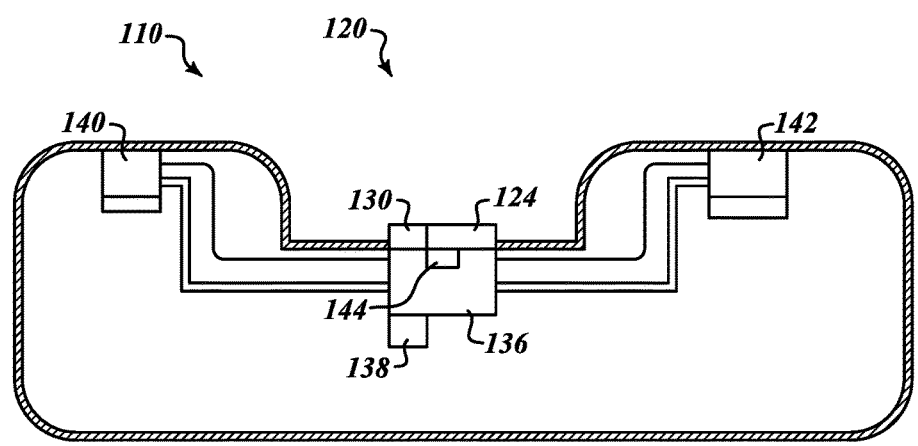
FIG. 2 is a schematic illustration of a fuel tank system having an evaporative emissions control system including a manifold having two solenoids, a controller and a liquid trap according to another example of the present disclosure.

Turning now to FIG. 2, a fuel tank system 110 constructed in accordance to another example of the present disclosure will be described. The fuel tank system 110 includes an evaporative emissions control system 120. Unless otherwise described, the evaporative emissions control system 120 can be configured similar to the evaporative emissions control system 20 described above. The evaporative emissions control system 120 can include a manifold assembly 124, a control module 130, a liquid trap 136, a drain valve 138, a first vent valve 140, and a second vent valve 142. The second vent valve 142 can be a refueling vent valve. A mechanical LVD 144 can be provided at the liquid trap 136. In one configuration, the liquid trap 136 can include a venturi jet that drains liquid by way of a vacuum out of the liquid trap 136 when the fuel pump is on. The manifold assembly 124 can include a first solenoid 150 and a second solenoid 152.

Figure 2A:
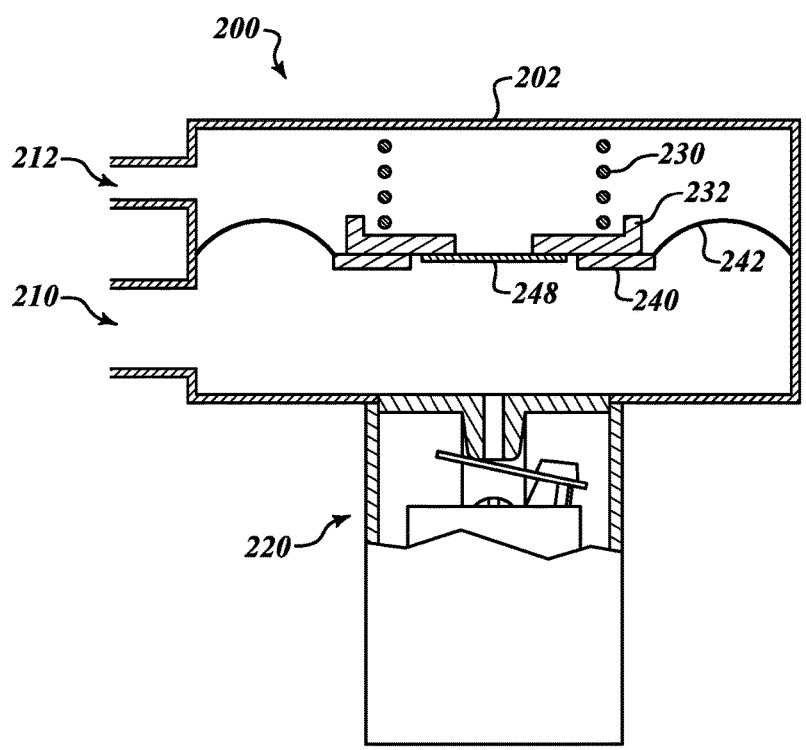
FIG. 2A is a schematic illustration of an exemplary solenoid activated vent valve that may be used with the evaporative emissions control system of FIG. 2.

With reference to FIG. 2A, a solenoid activated vent valve 200 is shown. The solenoid activated vent valve 200 can be configured for use at one of or both of the first valve 140 and the second valve 142. The solenoid activated vent valve 200 can include a vent valve body 202 that defines a first opening 210 and a second opening 212. The first opening 210 can communicate with the canister (such as canister 32, FIG. 1). The second opening 212 can communicate with the manifold assembly 124. The solenoid activated vent valve 200 can further include a liquid vapor discriminator 220. In other configurations, a baffle may be incorporated if a centralized liquid trap is used. The solenoid activated vent valve 200 can additionally include a biasing member or spring 230 that biases a spring plate 232 toward a seal 240. A diaphragm 242 can be overmolded to the spring plate 232. A heat staked membrane 248 can be positioned proximate to the seal 240. In operation, if the first solenoid 150 is off (corresponding to a closed position), the spring 230 biases the spring plate 232 against the seal 240 and the diaphragm is forced shut. If the fuel tank pressure is higher than atmosphere, the heat staked membrane 248 allows air to pass through. If the control module 130 is set to vent, the first solenoid 150 is on (corresponding to an open position), the spring plate 232 moves away from the seal 240 against the spring 230 and the solenoid activated vent valve 200 vents out to the canister (see canister 32, FIG. 1).

The system schematics shown in FIGS. 3-19, illustrate various operating conditions where the solenoid valves 50 and 52 provide discrete opening and closing of the FLVV pick-up tube 36, the ROV pick-up tube 40 and the ROV pick-up tube 42. It will be appreciated from the schematic illustrations that the solenoid valve 50 and/or 52 can comprise a two-position solenoid, a latching solenoid, a poppet system to allow selective opening and closing and other configurations. Moreover, the solenoid valve 50 and/or 52 can comprise a collection of more than one solenoid. For example, a dedicated solenoid may be incorporated at the tank solenoid 50 for opening and closing each of the FLVV pick-up tube 36, the ROV pick-up tube 40 and the ROV pick-up tube 42 on the tank side. Similarly a dedicated solenoid may be incorporated at the canister solenoid 52 for opening and closing each of the vapor paths illustrated.

Figure 4:
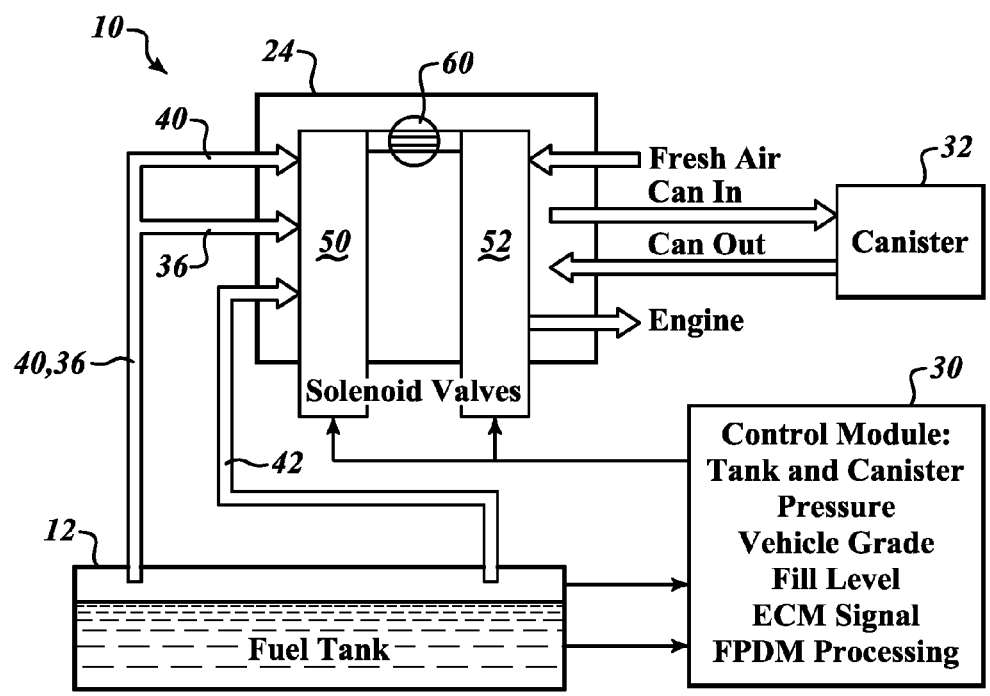
FIG. 4 is a schematic illustration of the fuel tank system of FIG. 1 according to a second implementation.

Turning now to FIG. 3, a system schematic of the fuel tank system 10 according to a first example is shown. The mechanical grade shut-off 60 can be configured to close in the event of a roll-over or vehicle crash event. The mechanical grade shut-off 60 does not require power to close. FIG. 4 illustrates a system schematic of the fuel tank system 10 according to a second example. In FIG. 4, the FLVV pick-up tube 36 and the ROV pick-up tube 40 are arranged according to another example as shown.

Figure 5:
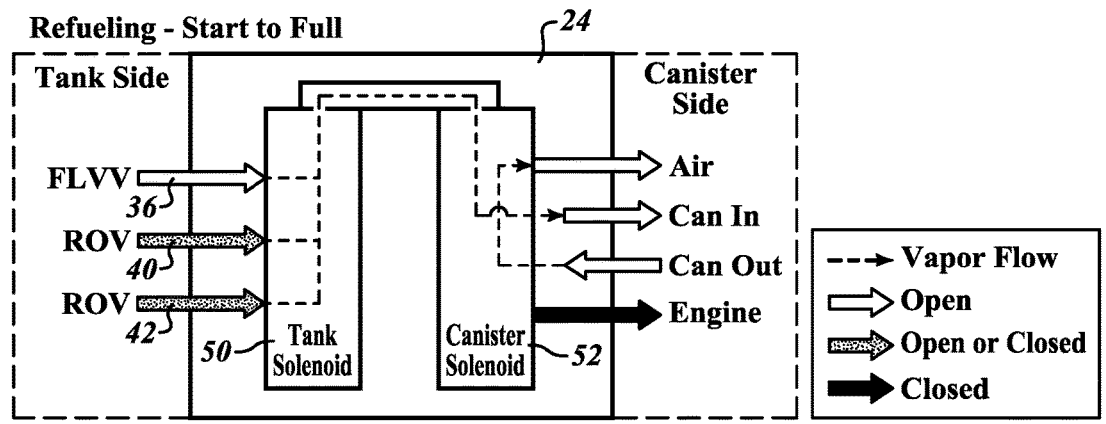
FIG. 5 is a schematic illustration of the fuel tank system of FIG. 3 and shown during initial onset of a refueling event.
Figure 6:
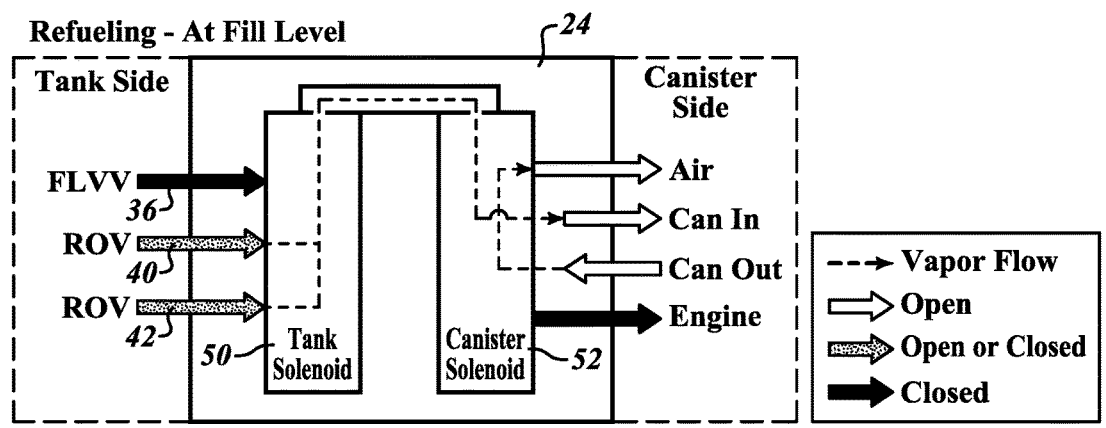
FIG. 6 is a schematic illustration of the fuel tank system of FIG. 5 and shown with the fuel tank at fill level during a refueling event.

With reference to FIG. 5, a system schematic is shown during an initial refueling event. The FLVV pick-up tube 36 is open for full flow. FIG. 6 shows a system schematic during refueling when a full fill level is attained. A fuel level sensor signal (such as from the level sensor assembly 48, FIG. 1) can trigger closure to stop fueling.

Figure 7:
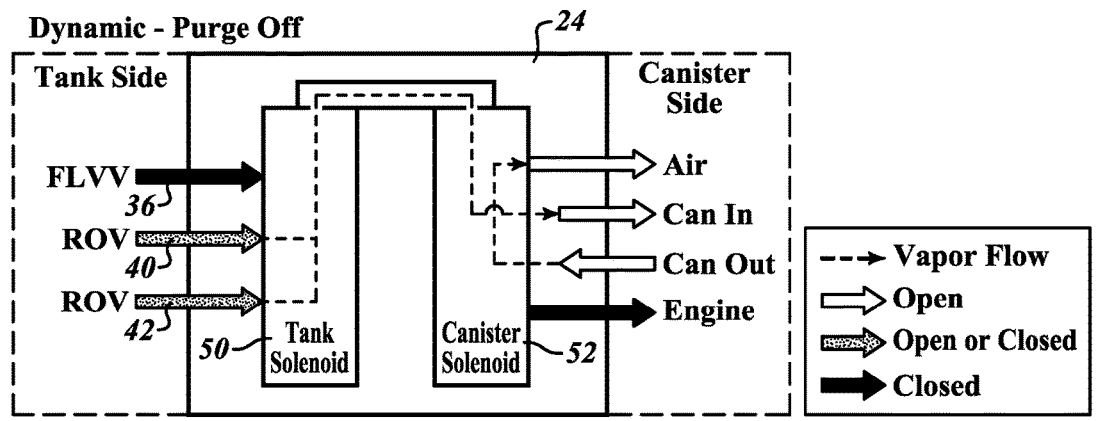
FIG. 7 is a schematic illustration of the fuel tank system of FIG. 3 and shown in a "purge off" state during a dynamic driving condition.
Figure 8:
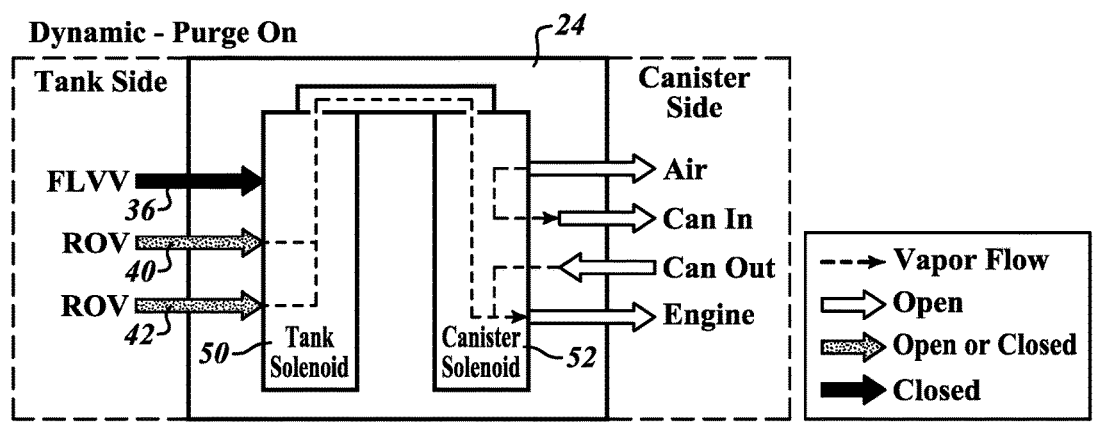
FIG. 8 is a schematic illustration of the fuel tank system of FIG. 7 and shown in a "purge on" state during a dynamic driving condition.

With reference to FIGS. 7 and 8, a system schematic is shown during dynamic conditions such as driving. The fuel tank system 10 monitors fuel level, tank pressure, and vehicle grade. The control module 30 opens the solenoid valves 50, 52 as needed to vent. In FIG. 7, purge is set to off. In FIG. 8, purge is set to on. During a purge event, fresh air is drawn through the canister 32.

Figure 9:
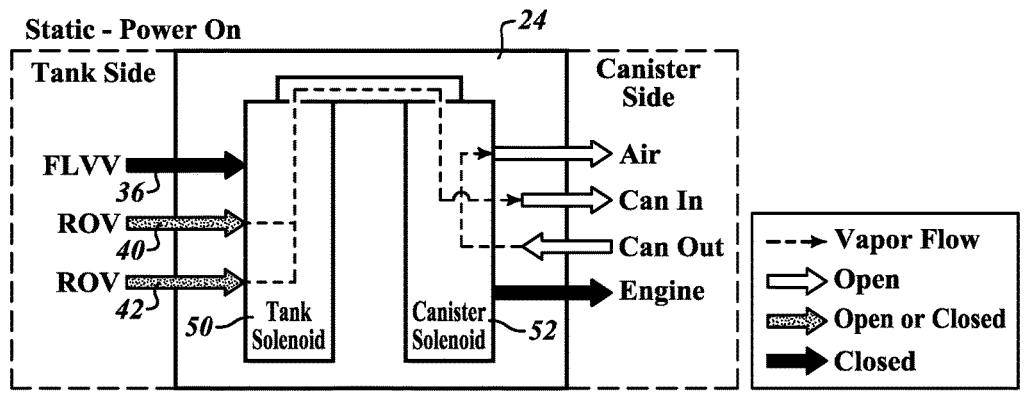
FIG. 9 is a schematic illustration of the fuel tank system of FIG. 3 and shown in a "power on" state during a static (parked) condition.
Figure 10:
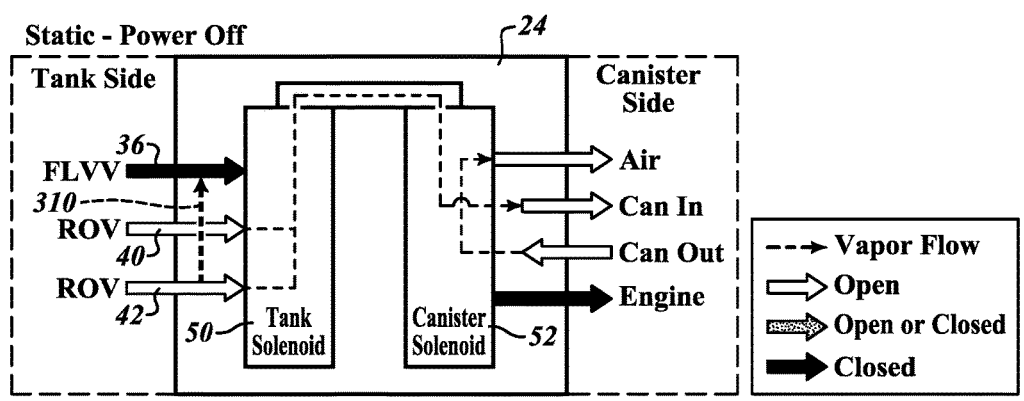
FIG. 10 is a schematic illustration of the fuel tank system of FIG. 9 and shown in a "power off" state during a static (parked) condition.

FIGS. 9 and 10 show a system schematic during a static condition such as parked. The control module 30 determines which of the ROV pick-up tubes 40, 42 to open based on grade, fuel level and tank pressure. In FIG. 9, power is on whereas in FIG. 10, power is off. When power is off, a bypass 310 can open to allow liquid to drain back into the fuel tank 12.

Figure 11:
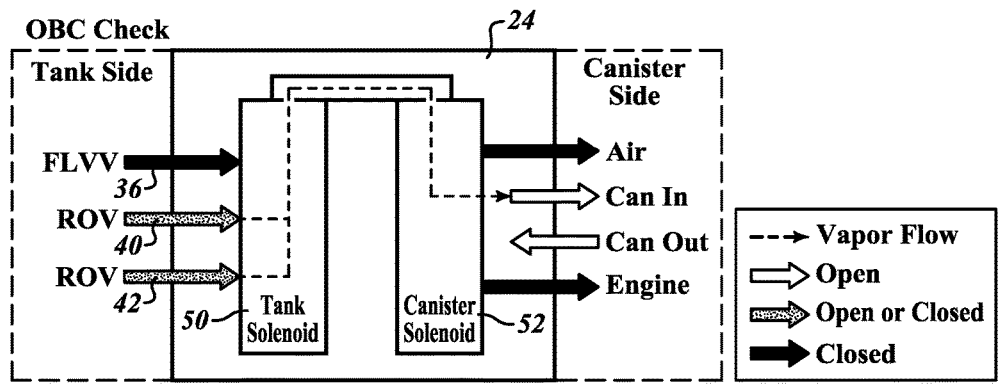
FIG. 11 is a schematic illustration of the fuel tank system of FIG. 3 and shown during an on-board diagnostics leak check.

With reference to FIG. 11, a system schematic is shown during an on-board diagnostics (OBD) leak check. During an OBD leak check, the canister air and engine ports are closed. A pressure drop is monitored across the system. The ROV pick-up tubes 40, 42 are opened or closed depending on the grade and fuel level. At least one ROV pick-up tube 40, 42 is open.

Figure 12:
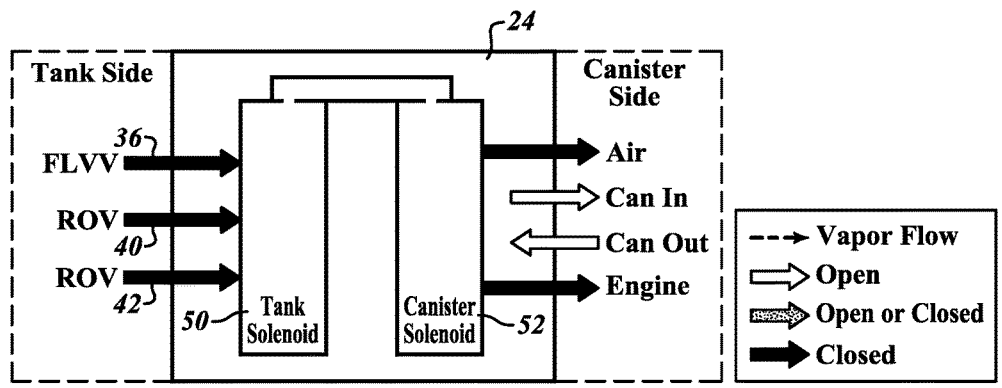
FIG. 12 is a schematic illustration of the fuel tank system of FIG. 3 and shown during a roll-over or crash condition.

FIG. 12 shows a system schematic during a roll-over or crash event. The first and second solenoids 50 and 52 are shut if power is available. If no power is available, the mechanical shut off valve 60 is triggered to close to seal the system.

Figure 13:
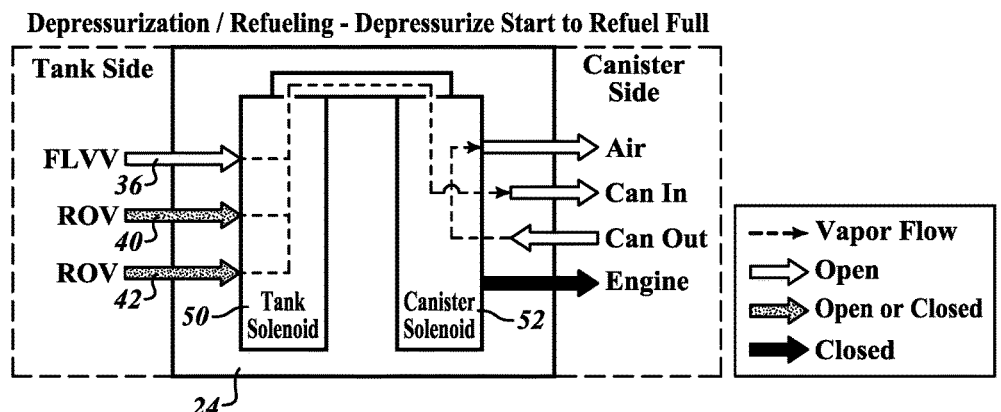
FIG. 13 is a schematic illustration of a pressurized fuel tank system according to another example of the present disclosure and shown during the onset of a depressurization or refueling event.
Figure 14:
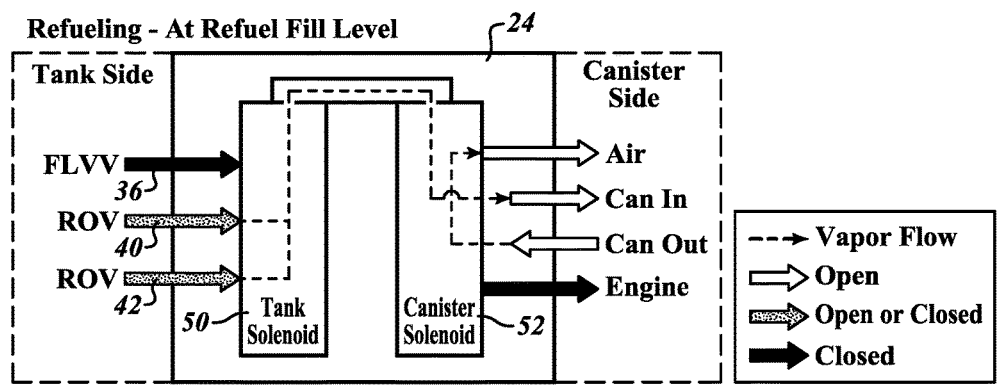
FIG. 14 is a schematic illustration of the pressurized fuel tank system of FIG. 13 and shown with the fuel tank at fill level during a refueling event.

FIGS. 13 and 14 show a system schematic during a depressurization or refueling event for a pressurized system. FIG. 13 is a system schematic during initial refueling. FIG. 14 is a system schematic during refueling when a full fill level is attained. A fuel level sensor signal (such as from the level sensor assembly 48, FIG. 1) can trigger closure to stop fueling.

Figure 15:
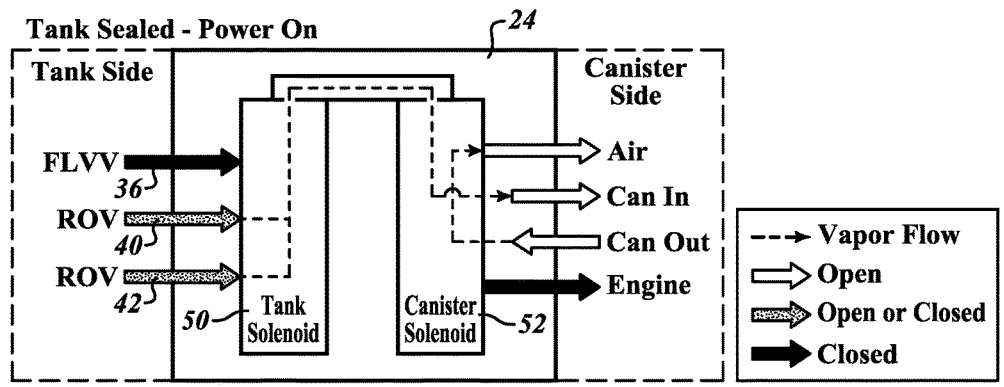
FIG. 15 is a schematic illustration of the pressurized fuel tank of FIG. 13 and shown with the fuel tank sealed and the canister open during a "power on" state.
Figure 16:
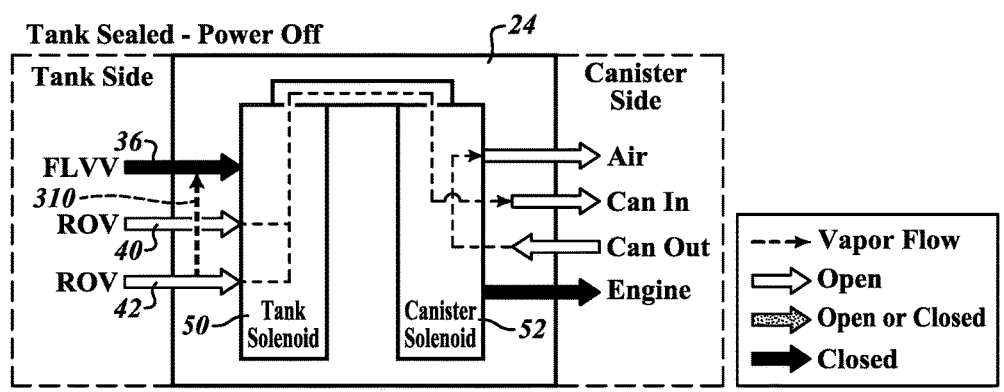
FIG. 16 is a schematic illustration of the pressurized fuel tank of FIG. 15 and shown with the fuel tank sealed and the canister open during a "power off" state.
Figure 17:
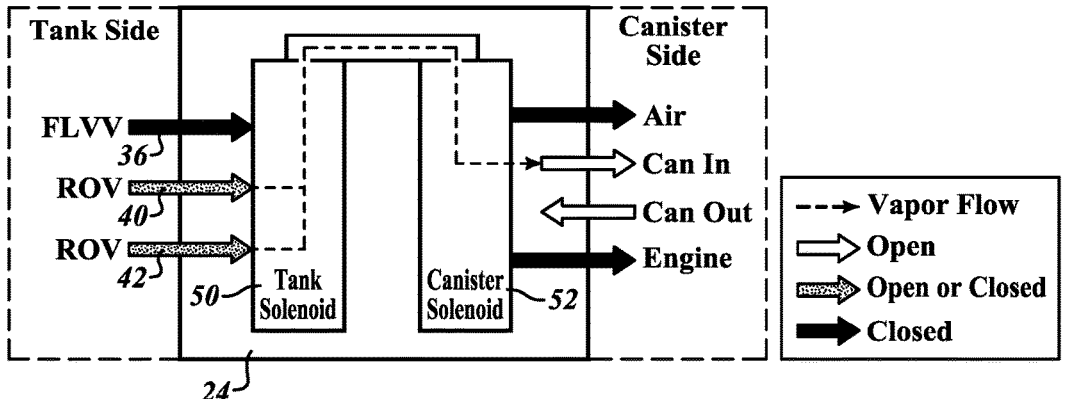
FIG. 17 is a schematic illustration of the fuel tank of FIG. 13 and shown with the fuel tank and the canister both sealed.
Figure 18:
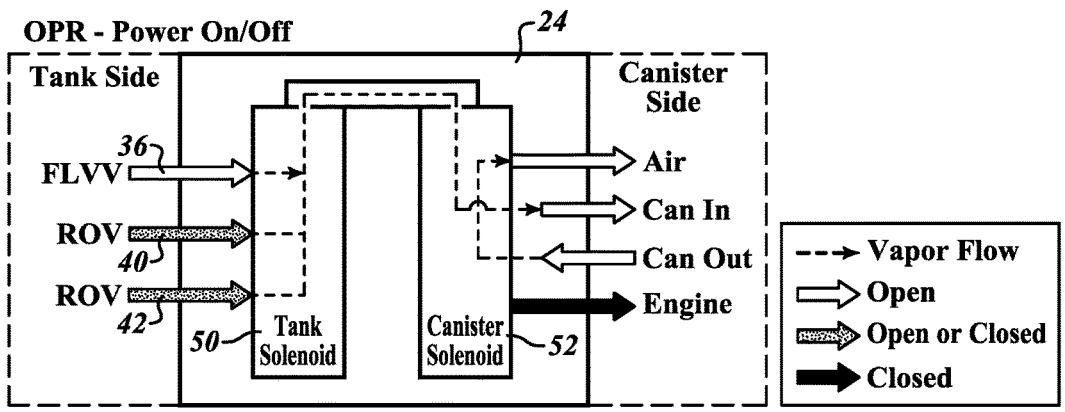
FIG. 18 is a schematic illustration of a fuel tank system having an over pressure release valve according to another example of the present disclosure.
Figure 19:
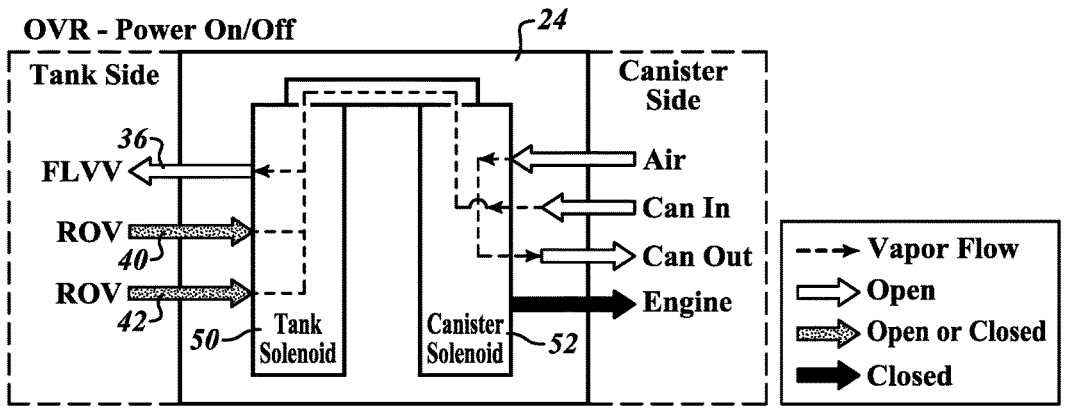
FIG. 19 is a schematic illustration of a fuel tank system having an onboard vapor recovery valve according to another example of the present disclosure.

FIGS. 15 and 16 show a system schematic during a tank sealed state. FIG. 15 shows a power on state. FIG. 16 shows a power off state. FIG. 17 is a system schematic showing the tank and canister sealed. FIG. 18 is a system schematic showing the OPR with the power on/off. FIG. 19 is a system schematic showing the OVR with the power on/off.

Figure 20:
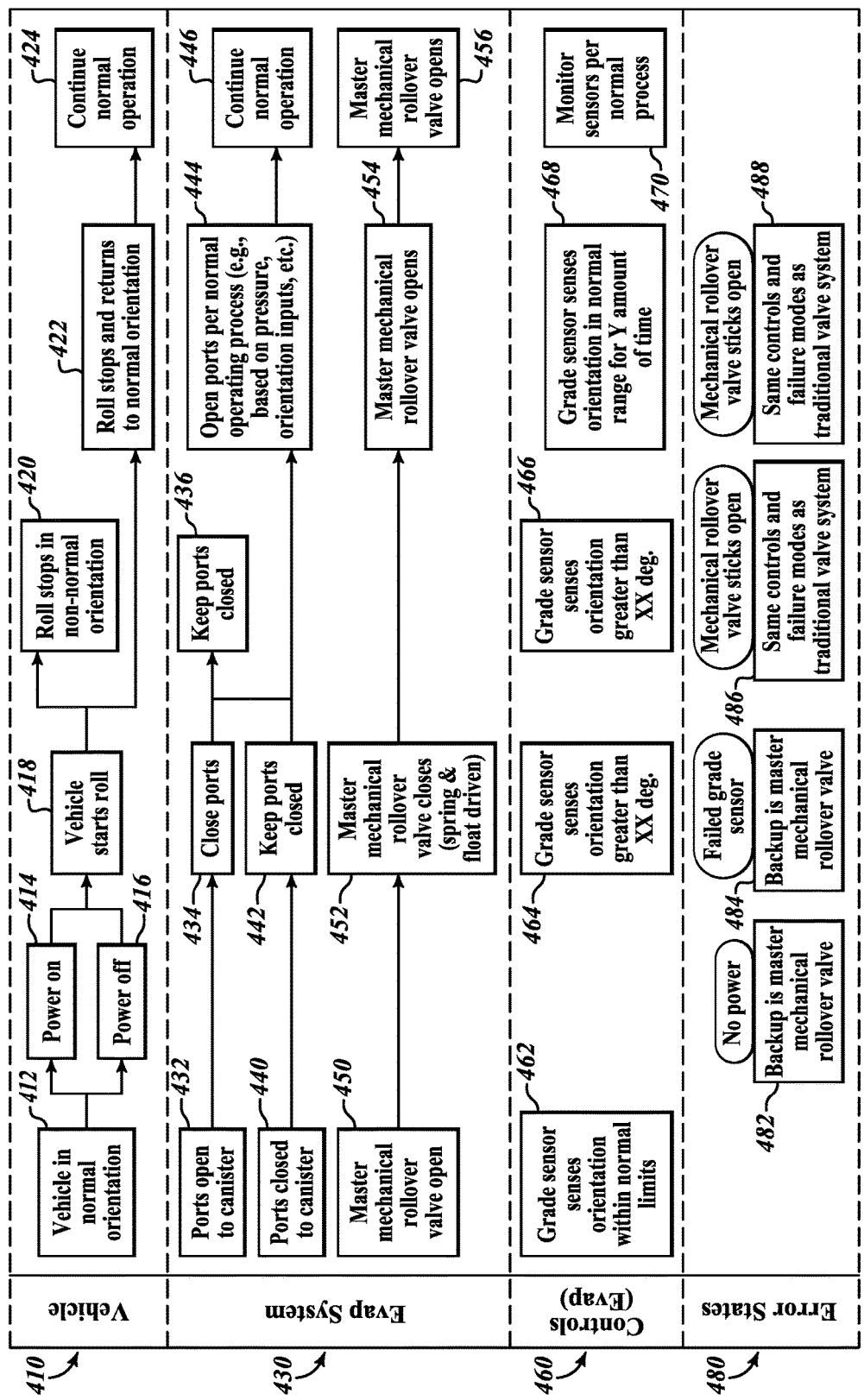
FIG. 20 are exemplary block diagrams for the fuel tank system according to the present disclosure during a vehicle rollover according to various examples of the present disclosure.

FIG. 20 illustrates exemplary flow charts for a vehicle rollover event. The sequence of events is aligned vertically between the vehicle, the evaporative emission system, vehicle controls, the fuel tank and error states. A vehicle flow chart is shown at 410. At 412, the vehicle is in normal orientation. At 414, power is on. At 416, power is off. At 418, the vehicle starts to roll. At 420, the vehicle roll stops in a non-normal orientation. At 422, the roll stops and returns to normal operation. At 424 the vehicle starts normal operation.

An evaporative emission system flow chart is shown at 430. At 432, the ports are open to the canister. At 434, the ports are closed. At 436, the ports are kept closed. At 440, the ports are closed to the canister. At 442, the ports are closed. At 444, the ports are opened according to normal operating processes (e.g. based on pressure, orientation inputs, etc.). At 446, normal operation is continued. At 450, the master mechanical rollover valve is opened. At 452, the master mechanical rollover valve is closed. The valve can be spring and float driven. At 454, the master mechanical rollover valve is opened. At 456 the master mechanical rollover valve is opened.

An evaporative controls flow chart is shown at 460. The grade sensor senses an orientation within normal limits at 462. The grade sensor senses an orientation greater than a threshold degree at 464. The grade sensor senses an orientation greater than a threshold degree at 466. At 468, the grade sensor senses an orientation in a normal range for a threshold amount of time. At 470, the sensors are monitored per normal process.

Various error states are shown at 480. At 482, with no power, a backup is the master mechanical rollover valve. At 484, with a failed grade sensor, a backup is the master mechanical rollover valve. At 486, with the mechanical rollover valve stuck open, the same controls and failure modes are followed from a traditional valve system. At 488, with the mechanical rollover valve stuck closed, the same controls and failure modes are followed from a traditional valve system.

Figure 21A:
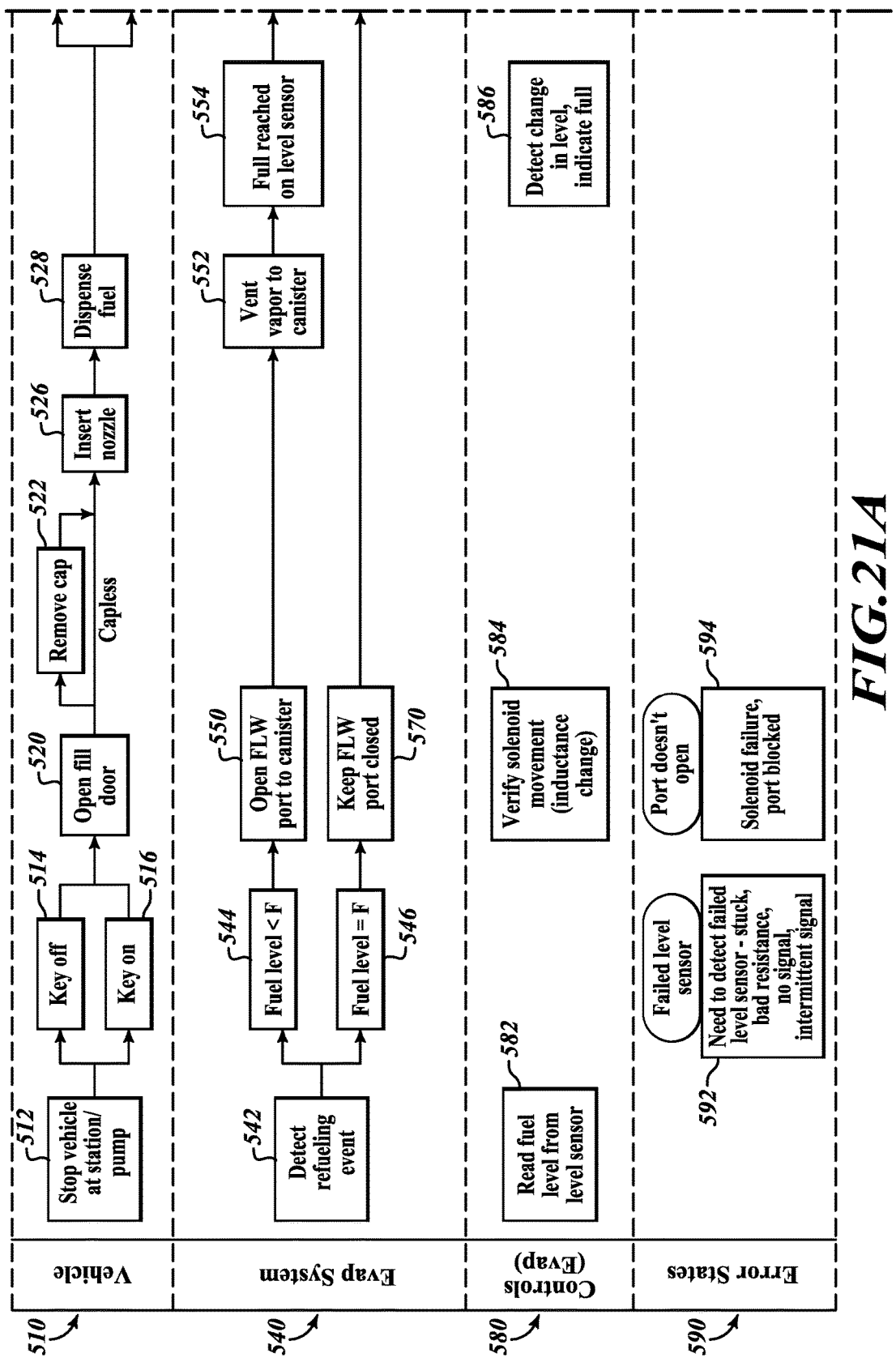
FIGS. 21A and 21B are exemplary block diagrams for the fuel tank system according to the present disclosure during vehicle refueling according to various examples of the present disclosure.
Figure 21B:
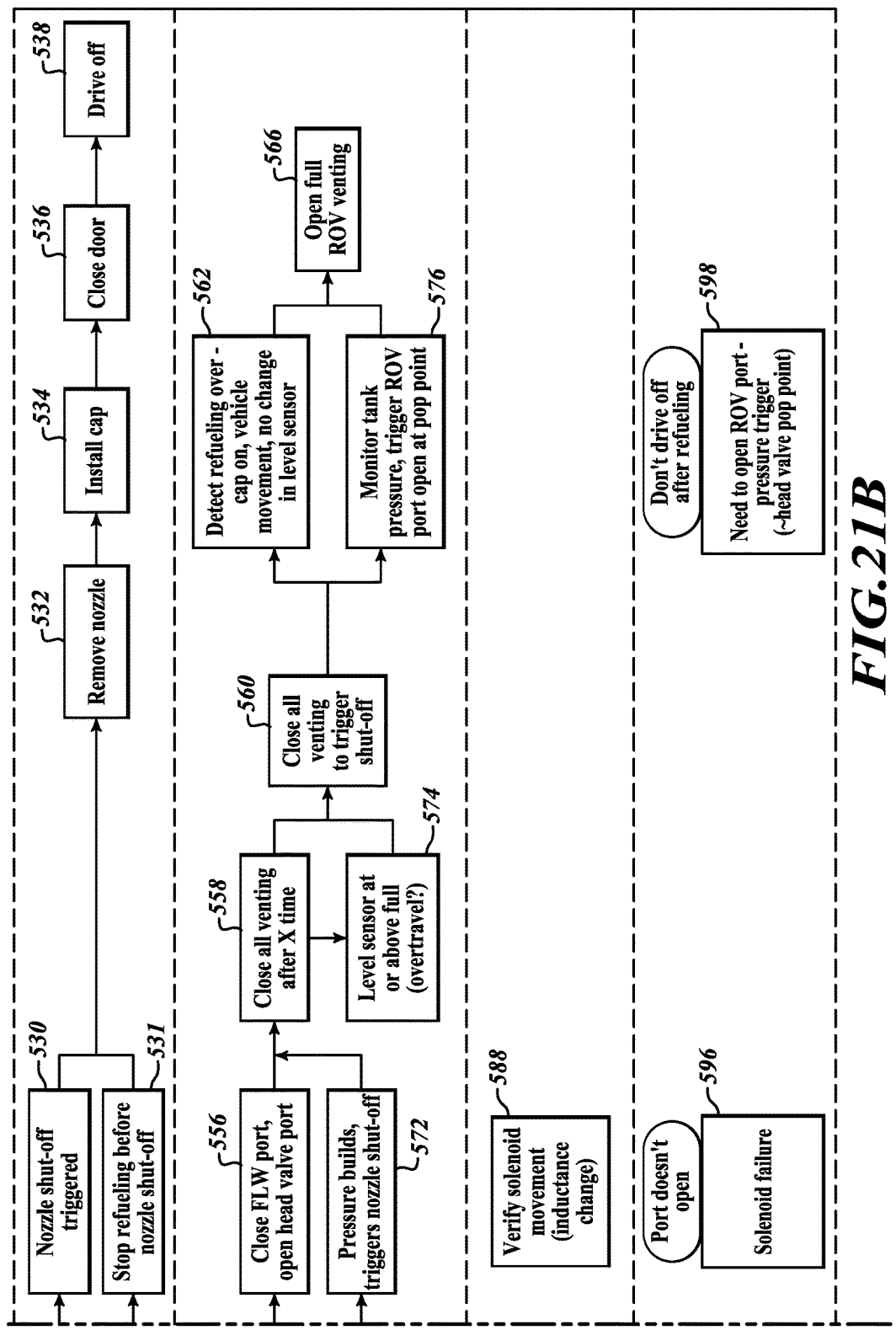

FIG. 21 illustrates exemplary flow charts for a vehicle rollover event. The sequence of events is aligned vertically between the vehicle, the evaporative emission system, vehicle controls, the fuel tank and error states. A vehicle flow chart is shown at 510. At 512, the vehicle is stopped at a gas station. At 514, the vehicle is keyed off. At 516, the vehicle is keyed on. At 520, the fuel fill door is opened. At 522, the fuel cap is removed. 522 may also represent a cap-less fuel tank vehicle. At 526, the nozzle is inserted. At 528, fuel is dispensed. At 530, a nozzle shut-off is triggered. At 532, the nozzle is removed. At 534, the fuel cap is installed. At 536 the fuel door is closed. At 538, the vehicle drives off.

An evaporative emission system flow chart is shown at 540. At 542 a refueling event is detected. At 544, the fuel level detected is less than full. At 546, the fuel level is full. At 550, the FLVV port is opened to the canister. At 552, vapor is vented to the canister. At 554, full fuel level is reached on with the fuel level sensor. At 556 the FLVV port is closed and the head valve port is opened. At 558 all venting is closed after a predetermined time. At 560, all venting is closed to trigger a shut-off. At 562 refueling completion is detected. Detection can be satisfied with the fuel cap on, vehicle movement or a change in the fuel level sensor. At 566, full ROV venting is opened. At 570, the FLVV port is kept closed. At 572, pressure builds in the fuel tank and triggers a nozzle shut-off. At 574, the fuel level sensor is at or above full. At 576, the tank pressure is monitored and the ROV port is triggered open at a pop point.

An evaporative controls flow chart is shown at 580. At 582, the fuel level is read from the level sensor. At 584, solenoid movement is verified. In one example an inductive charge can be used. At 586, a fuel level change is detected indicating a full fuel level. At 588, solenoid movement is verified. Again, in one example, an inductive charge can be used.

Various error states are shown at 590. At 592, a failed level sensor is detected. The failed level sensor may be detected by satisfying a status of stuck, bad resistance, no signal, or an intermittent signal. At 594, a solenoid failure may cause a port not to open. At 596, a solenoid failure may cause a port not to close. At 598, the ROV port is opened with a pressure trigger or head valve pop point. The vehicle is not to drive off after refueling.

Figure 22:
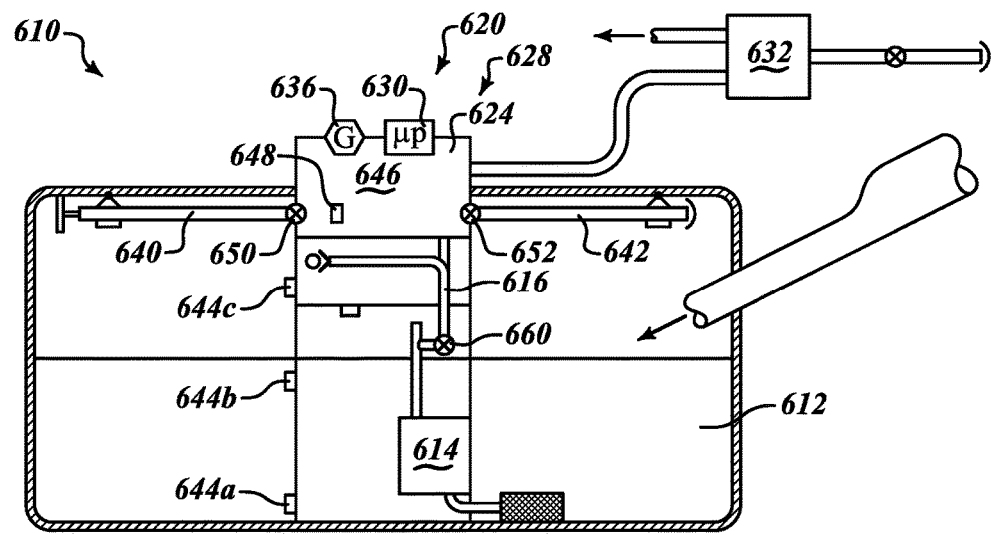
FIG. 22 is a schematic illustration of a fuel tank system having an evaporative emissions control system in accordance to one example of the present disclosure.

Turning now to FIG. 22, a fuel tank system constructed in accordance to another example of the present disclosure is shown and generally identified at reference number 610. The fuel tank system 610 can generally include a fuel tank 612 configured as a reservoir for holding fuel to be supplied to an internal combustion engine via a fuel delivery system, which includes a fuel pump 614. The fuel pump 614 can be configured to deliver fuel through a fuel supply line 616 to a vehicle engine. An evaporative emissions control system 620 can be configured to recapture and recycle the emitted fuel vapor. As will become appreciated from the following discussion, the evaporative emissions control system 620 provides an electronically controlled module that manages the complete evaporative system for a vehicle.

The evaporative control system 620 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 620 may also be compatible with pressurized systems including those associated with hybrid powertrain vehicles.

The evaporative emissions control system 620 includes a manifold assembly 624, a fuel delivery module 628 having a control module 630, a purge canister 632, a G-sensor 636, a first roll-over valve (ROV) pick-up tube or vent 640, a second ROV pick up tube or vent 642, a first fuel level sensor 644A, a second fuel level sensor 644B, a third fuel level sensor 644C, a liquid trap 646, a liquid level sensor 648, a large vent solenoid 650 and a small vent solenoid 652.

The control module 630 can be adapted to regulate the operation of first and second solenoids 650, 652 to selectively open and close pathways in liquid trap 646, in order to provide over-pressure and vacuum relief for the fuel tank 612.

The fuel delivery module 628 has an integral accelerometer or G-sensor 636 and a control module 630 that close any number of vent lines most likely two. One larger (to manage refueling vapor flow) and one smaller (to manage grade venting). The larger can also manage grade venting. The fuel delivery module 628 houses a liquid trap 646 with a jet pump 660 driven by the main fuel pump 614 and turned off and on via a solenoid valve.

During operation such as a refueling event, fuel is dispensed and rises toward fuel level sensor 644c. When the sensor 644c indicates fuel level has reached this point the large solenoid 650 closes and the small solenoid 652 also closes. Pressure builds in the fuel tank 612 causing fuel to back up the fill pipe and turn off the dispensing nozzle. The smaller solenoid can be used to adjust the rate of pressure rise by opening and closing as needed. This activity will ensure a good fill without spit back at the filler neck. Various pressure profiles are easily produced for system variations.

Running loss and liquid carry-over prevention will now be described. The vehicle is quite dynamic and the liquid trap must not allow liquid fuel to pass into the charcoal canister 632. The liquid trap 646 signals the control module 630 to actuate the jet pump solenoid 660 to turn on the jet pump 616 when the liquid trap 646 fills to a predetermined point and run for a specific period of time, such as long enough to drain the liquid trap 646.

The control module 630 continuously monitors the bulk fuel level, the G-sensor 636, the vent solenoids 650, 652, the fuel tank pressure and the liquid trap level sensor 648. The G-sensor can communicate a signal to the control module 630 based on a measured acceleration. As the vehicle is driven this monitoring process is used to optimize the vent process. The goal is to selectively open and close the vent solenoids 650, 652 and the jet pump solenoid 660 to maintain an acceptable fuel tank pressure, ensure no liquid leave the liquid trap, and minimize the jet pump on time.

Grade venting will now be described. When the vehicle is stopped and the engine is turned off, the fuel delivery module, G-sensor 636 and fuel level determine which vent line is above fluid level and closes the solenoids 650, 652 including the jet pump solenoid 660. This will allow the fuel tank 612 to vent. The solenoids are latching so no power is required to keep them closed or open. During engine off, a watch dog supervisory control will monitor the G-sensor 636. Should the vehicle attitude change, the system will wake and adjust for proper venting and then go to sleep again. Consider complete power failure or crash. The system has a main floated valve in the fuel delivery module which floats closed when the liquid trap is over filled in any vehicle orientation. Pressure build at this time will be released by the filler cap over pressure relief.

Figure 23A:
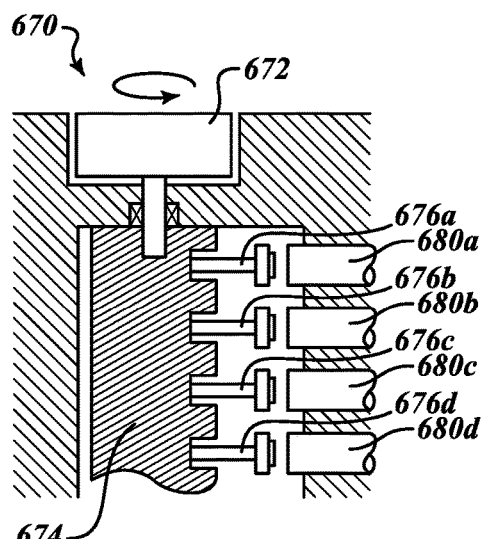
FIG. 23A is a schematic illustration of a cam driven tank venting control assembly constructed in accordance to one example of the present disclosure and shown with the cam in a first position where all valves are in an open position.
Figure 23B:
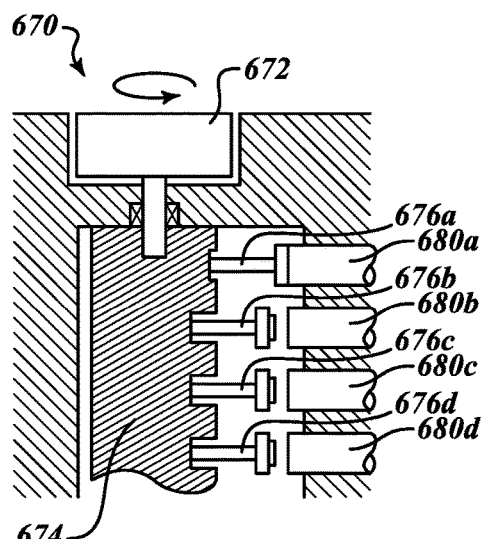
FIG. 23B is a schematic illustration of the cam driven tank venting control assembly of FIG. 23A and shown with the cam in a second position where one of the valves is closed and the remaining three valves are open.

With reference now to FIGS. 23A and 23B a cam driven tank venting control assembly 670 constructed in accordance to another example of the present disclosure will be described. The cam driven tank venting control assembly 670 includes one rotary actuator 672 and a cam 674 to selectively open valves 676a, 676b, 676c and 676d. The valves 676a, 676b, 676c and 676d can be poppet valves that are configured to open and close respective vents 680a, 680b, 680c and 680d located at discrete positions in the fuel tank. The cam 674 can be rotated to a prescribed position where the required valves 676a, 676b, 676c and 676d are open or closed. When the power is off, the rotary actuator 672 and cam 674 remain in position so latching is inherent in the design. The cam driven tank venting control assembly 670 can be used in the evaporative emissions control systems described above when it may be desired to provide multiple vents while avoiding multiple latching solenoids. The rotary actuator is rotates to a desired position based on an input from the controller based on operating conditions.

Figure 24:
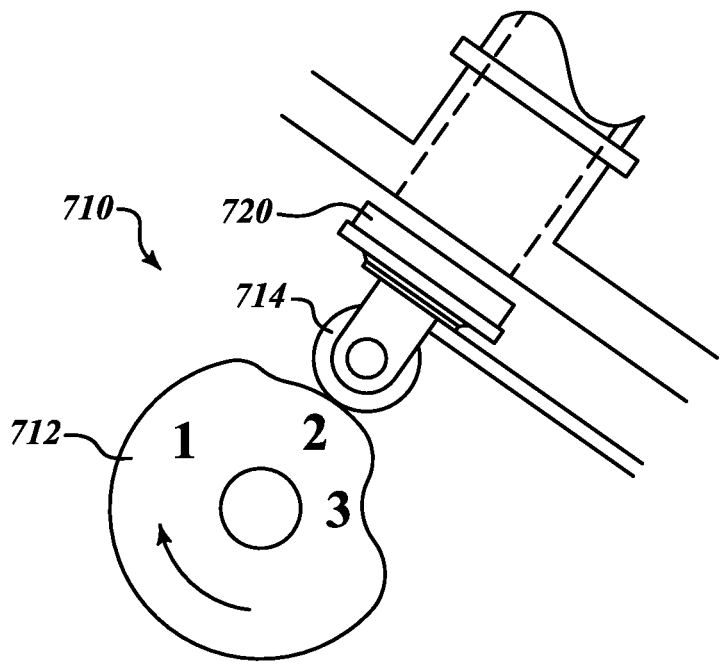
FIG. 24 is a schematic illustration of a cam driven tank venting control assembly constructed in accordance to another example of the present disclosure.

Turning now to FIG. 24, a cam driven tank venting control assembly 710 constructed in accordance to another example will be described. While the configuration shown above with respect to FIGS. 23A and 23B discuss a cam and valve arrangement that move valves between fully open and fully closed positions, other configurations are contemplated. For example, the tank venting control configuration 710 includes a cam 712 that rotates a roller 714 resulting in a valve 720 moving between a fully open position, a fully closed position and a partially open position. In this regard, the cam 712 includes a first cam profile 1 that results in an orifice size being closed (or the valve 720 being fully closed), a second cam profile 2 that results in an orifice size being small (or the valve 720 being partially open), and a third cam profile 3 that results in an orifice size being large (or the valve 720 being fully open).

While three discreet positions are described, including two levels of "open" and one closed position, more positions may be provided. For example it is possible to rotate the cam 712 to a position between the cam profiles 1, 2 and 3 to offer a truly variable orifice size. The cam driven tank venting control configuration 710 can be configured such that during refueling the valve 720 is on the third cam profile 3 or the valve 720 being fully open. The valves can be configured for various combinations during vehicle operation. An additional benefit to this configuration is that the piece costs and complexity of multiple solenoids opening and closing multiple vents can be avoided in favor of the cam arrangement that opens valves to various levels of open. It will be appreciated that the cam 674 described above with respect to FIGS. 23A and 23B can be configured to have four distinct cams like cam 712 for selectively opening and closing valves constructed similar to valve 720. In this regard, the configuration shown in FIGS. 23A and 23B can attain valve positions of fully open, fully closed or intermediate positions between fully open and fully closed.

Figure 25A:
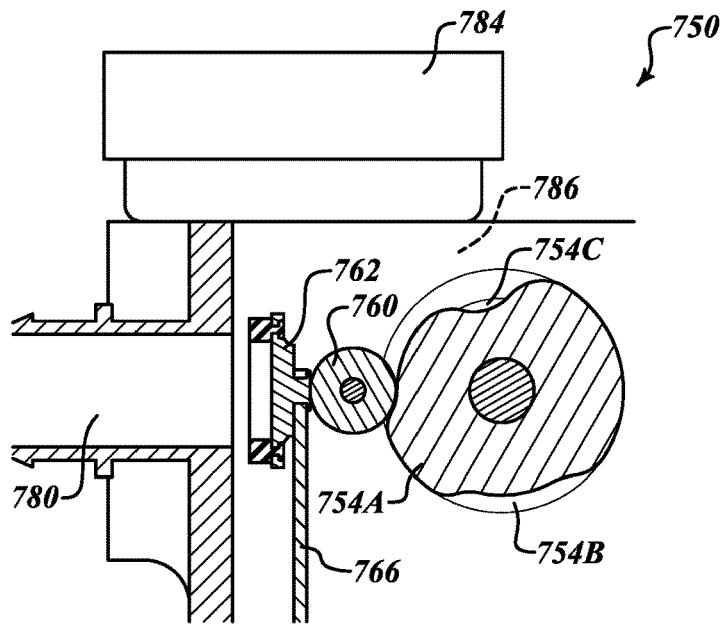
FIG. 25A is a schematic illustration of a cam driven tank venting control assembly constructed in accordance to another example of the present disclosure and shown with a valve in a partially open position.
Figure 25B:
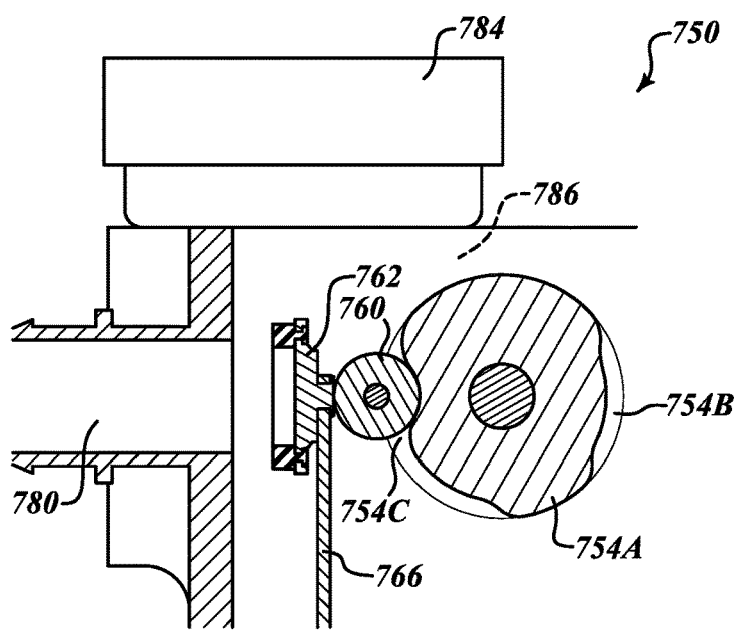
FIG. 25B is a schematic illustration of the cam driven tank venting control assembly of FIG. 25A and shown with the valve in a fully open position.
Figure 26:
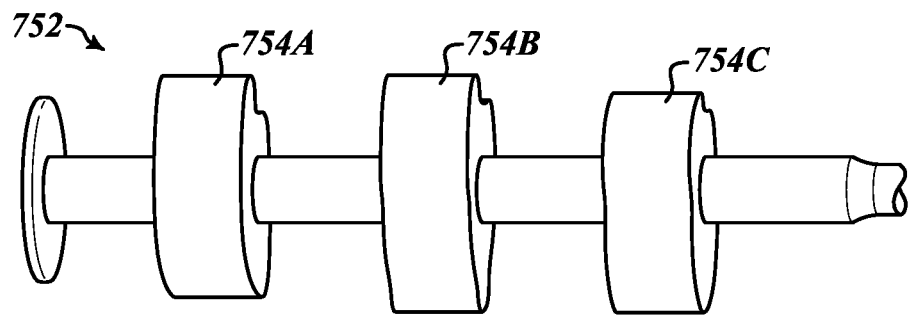
FIG. 26 is a perspective view of a cam assembly of the cam driven tank venting control assembly of FIGS. 25A and 25B and illustrating a table of exemplary open and close sequences.

With reference now to FIGS. 25A, 25B and 26, a tank venting control assembly 750 constructed in accordance to additional features of the present disclosure will be described. The tank venting control assembly 750 includes a cam assembly 752 that includes cams 754A, 754B and 754C. The cams 754A, 754B and 754C independently rotate a roller (only one roller 760 shown in FIGS. 25A and 25B) resulting in a valve (only one valve 762 shown) moving between a fully open position, a fully closed position and a partially open position based on the cam profile. In this regard, each cam 754A, 754B and 754C includes a specific cam profile that results in an orifice size leading to a respective vent tube (780 shown) being closed (or the valve 762 being fully closed), or various states of open.

Again, depending on the cam profile, the valve can be moved to many degrees or levels of open. An arm 766 can be provided on each valve that is configured to deflect toward and away from the valve opening. In the configuration shown, all of the three valves (672) are achieved at an angle of 170 degrees. A fully open condition (OL) provides 4.88 mm of clearance at the valve opening. An open position (O) provides 2.13 mm of clearance at the valve opening. It is appreciated however that these values are merely exemplary and may be changed within the scope of this disclosure. In the configuration shown a DC motor 784 is used to drive a worm gear 786 which in turn rotates the cam assembly 752 on a common axle. As the cam assembly 752 rotates, a rotary potentiometer can be used to monitor position. With three valve elements, there are eight positions to accommodate the eight states possible for vent valves. The valves ensure that all three vent tubes can be opened or closed as the fuel tank vent controller determines. As the DC motor 784 rotates, the potentiometer indicates angular position and thus the cam positions and subsequently which valve is open and which is closed.

Figure 27:
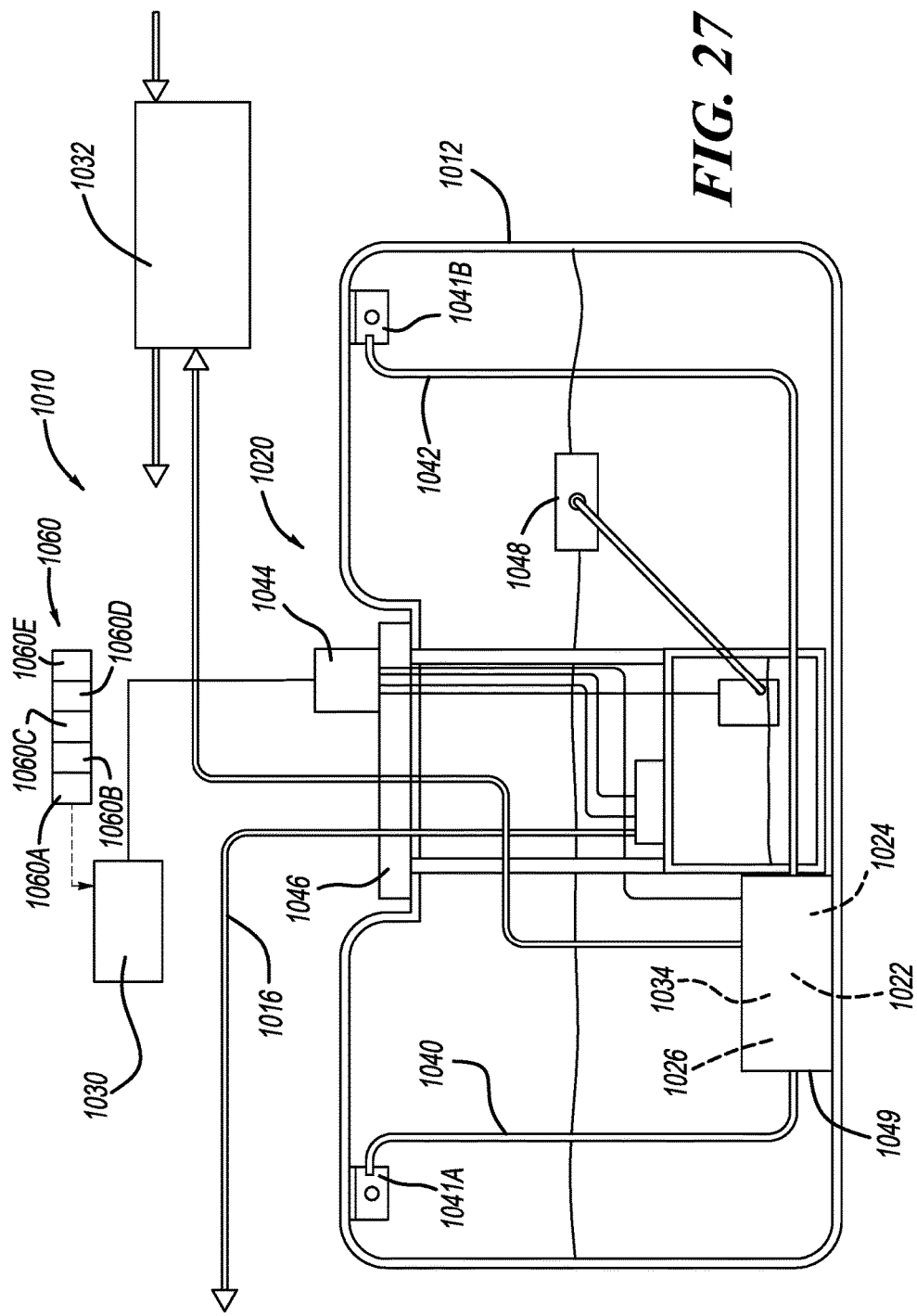
FIG. 27 is a schematic illustration of a fuel tank system having an evaporative emissions control system including a vent shut-off assembly, a controller, an electrical connector and associated wiring in accordance to one example of the present disclosure.

Turning now to FIG. 27, a fuel tank system constructed in accordance to one example of the present disclosure is shown and generally identified at reference number 1010. The fuel tank system 1010 can generally include a fuel tank 1012 configured as a reservoir for holding fuel to be supplied to an internal combustion engine via a fuel delivery system, which includes a fuel pump 1014. The fuel pump 1014 can be configured to deliver fuel through a fuel supply line 1016 to a vehicle engine. An evaporative emissions control system 1020 can be configured to recapture and recycle the emitted fuel vapor. As will become appreciated from the following discussion, the evaporative emissions control system 1020 provides an electronically controlled module that manages the complete evaporative system for a vehicle.

The evaporative control system 1020 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 1020 may also be compatible with pressurized systems including those associated with hybrid powertrain vehicles.

The evaporative emissions control system 1020 includes a vent shut-off assembly 1022, a manifold assembly 1024, a liquid trap 1026, a control module 1030, a purge canister 1032, an energy storage device 1034, a first vapor tube 1040, a second vapor tube 1042, an electrical connector 1044, a fuel delivery module (FDM) flange 1046 and a float level sensor assembly 1048. The first vapor tube 1040 can terminate at a vent opening 1041A that may include a baffle arranged at a top corner of the fuel tank 1012. Similarly, the second vapor tube 1042 can terminate at a vent opening 1041B that may include a baffle arranged at a top corner of the fuel tank 1012.

In one example, the manifold assembly 1024 can include a manifold body 1049 (FIG. 29) that routes venting to an appropriate vent tube 1040 and 1042 (or other vent tubes) based on operating conditions. As will become appreciated from the following discussion, the vent shut-off assembly 1022 can take may forms such as electrical systems including solenoids and mechanical systems including DC motor actuated cam systems.

Figure 28:
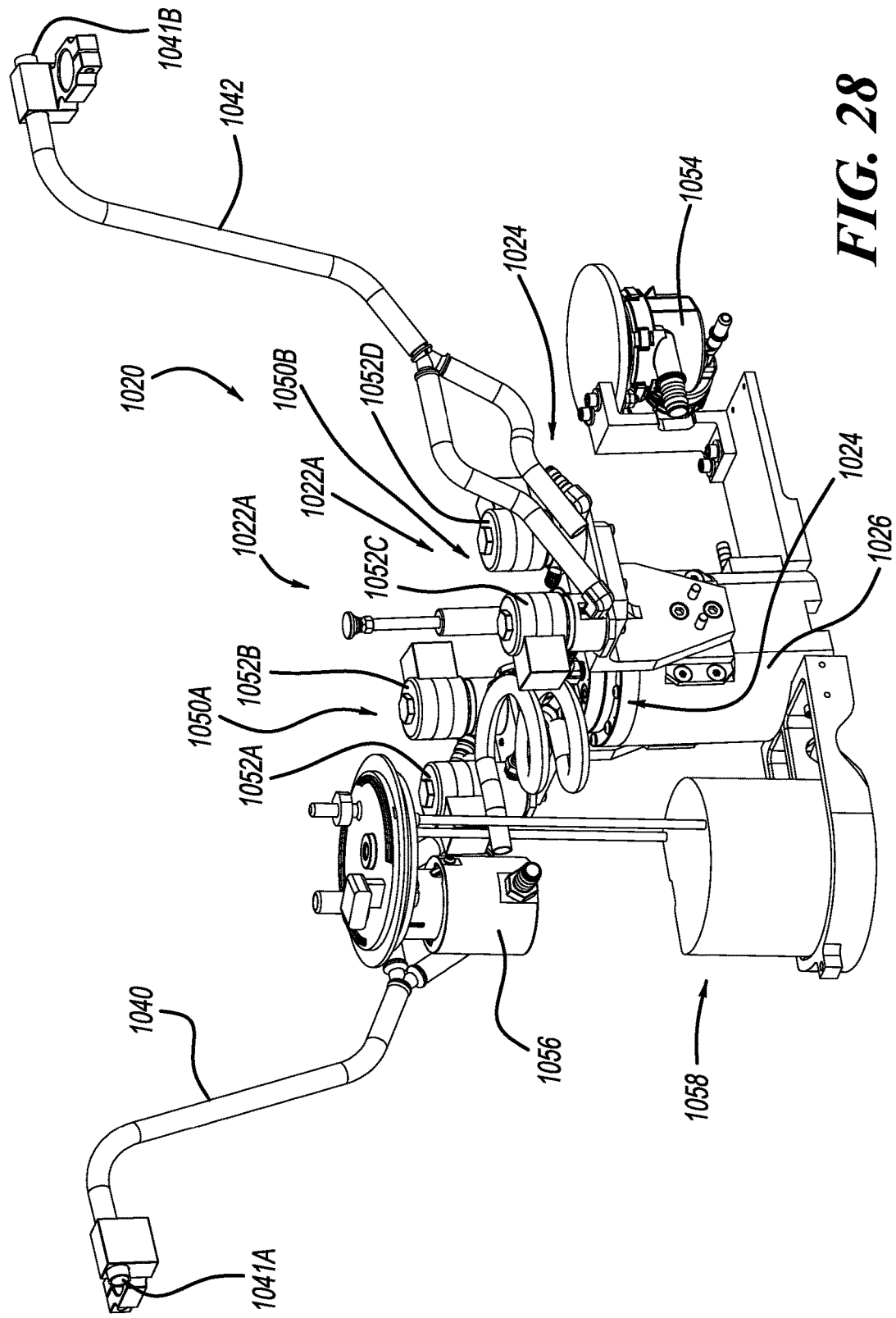
FIG. 28 is a front perspective view of an evaporative emissions control system including a vent shut-off assembly configured with solenoids according to one example of the present disclosure.
Figure 29:
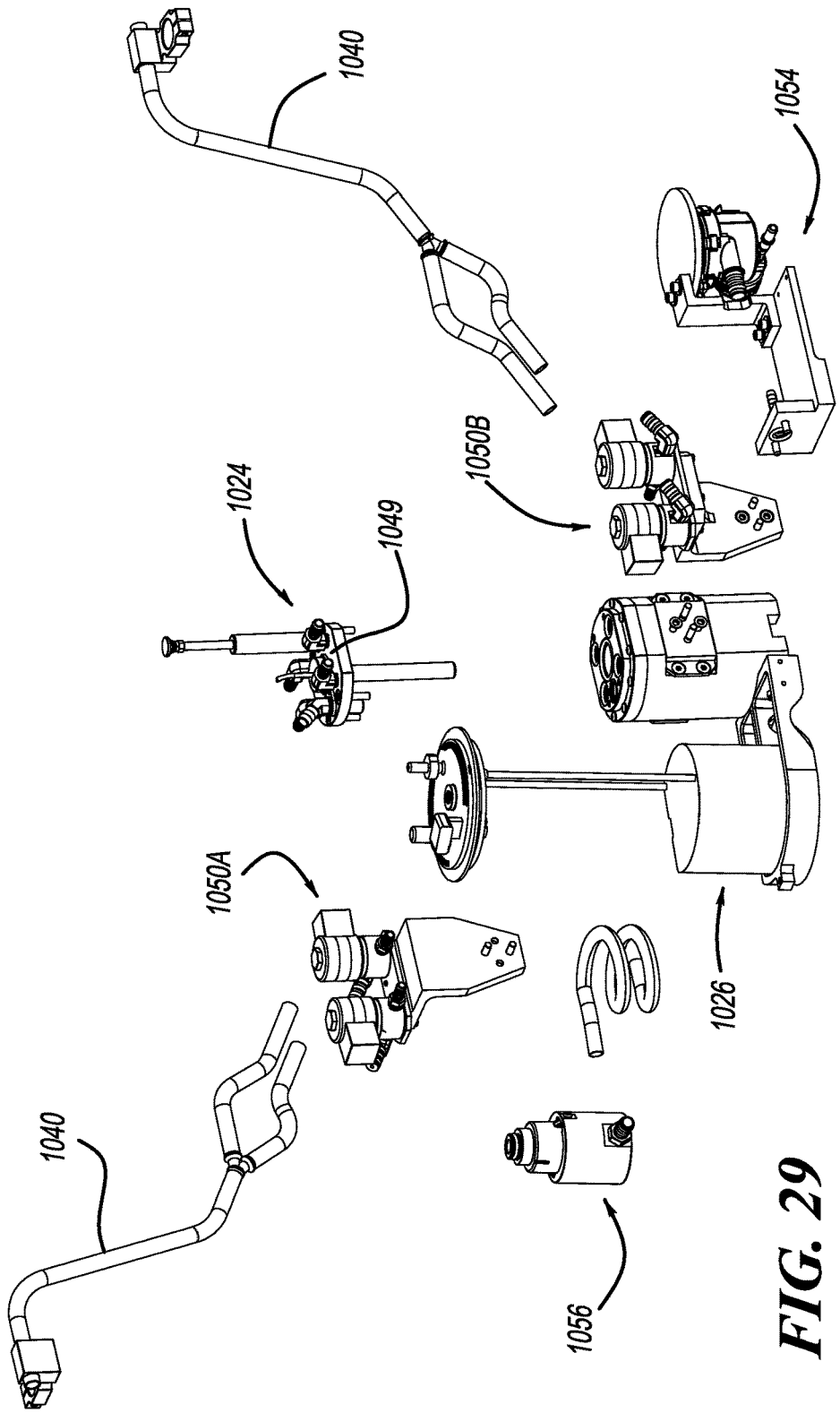
FIG. 29 is an exploded view of the evaporative emissions control system of FIG. 28.

Turning now to FIGS. 28 and 29, a vent shut-off assembly 1022A constructed in accordance to one example of the present disclosure is shown. As can be appreciated, the vent shut-off assembly 1022A can be used as part of an evaporative emissions control system 1020 in the fuel tank system 1010 described above with respect to FIG. 27. The vent shut-off assembly 1022A includes two pair of solenoid banks 1050A and 1050B. The first solenoid bank 1050A includes first and second solenoids 1052A and 1052B. The second solenoid bank 1050B includes third and fourth solenoids 1052C and 1052D.

The first and second solenoids 1052A and 1052B can be fluidly connected to the vapor tube 1040. The third and fourth solenoids 1052C and 1052D can be fluidly connected to the vapor tube 1042. The control module 1030 can be adapted to regulate the operation of the first, second, third and fourth solenoids 1052A, 1052B, 1052C and 1052D to selectively open and close pathways in the manifold assembly 1024, in order to provide over-pressure and vacuum relief for the fuel tank 1012. The evaporative emissions control assembly 1020 can additionally comprise a pump 1054, such as a venturi pump and a safety rollover valve 1056. A conventional sending unit 1058 is also shown.

The control module 1030 can further include or receive inputs from system sensors, collectively referred to at reference 1060. The system sensors 1060 can include a tank pressure sensor 1060A that senses a pressure of the fuel tank 1012, a canister pressure sensor 1060B that senses a pressure of the canister 1032, a temperature sensor 1060C that senses a temperature within the fuel tank 1012, a tank pressure sensor 1060D that senses a pressure in the fuel tank 1012 and a vehicle grade sensor and or vehicle accelerometer 1060E that measures a grade and/or acceleration of the vehicle. It will be appreciated that while the system sensors 1060 are shown as a group, that they may be located all around the fuel tank system 1010.

The control module 1030 can additionally include fill level signal reading processing, fuel pressure driver module functionality and be compatible for two-way communications with a vehicle electronic control module (not specifically shown). The vent shut-off assembly 1022 and manifold assembly 1024 can be configured to control a flow of fuel vapor between the fuel tank 1012 and the purge canister 1032. The purge canister 1032 adapted to collect fuel vapor emitted by the fuel tank 1012 and to subsequently release the fuel vapor to the engine. The control module 1030 can also be configured to regulate the operation of evaporative emissions control system 1020 in order to recapture and recycle the emitted fuel vapor. The float level sensor assembly 1048 can provide fill level indications to the control module 1030.

When the evaporative emissions control system 1020 is configured with the vent shut-off assembly 1022A, the control module 1030 can close individual solenoids 1052A-

1052D or any combination of solenoids 1052A-1052D to vent the fuel tank system 1010. For example, the solenoid 1052A can be actuated to close the vent 1040 when the float level sensor assembly 1048 provides a signal indicative of a full fuel level state. While the control module 1030 is shown in the figures generally remotely located relative to the solenoid banks 1050A and 1050B, the control module 1030 may be located elsewhere in the evaporative emissions control system 1020 such as adjacent the canister 1032 for example.

With continued reference to FIGS. 27-29, additional features of the evaporative emissions control system 1020 will be described. In one configuration, the vent tubes 1040 and 1042 can be secured to the fuel tank 1012 with clips. The inner diameter of the vent tubes 1040 and 1042 can be 3-4 mm. The vent tubes 1040 and 1042 can be routed to high points of the fuel tank 1012. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 1020 can replace conventional fuel tank systems that require mechanical components including in-tank valves with an electronically controlled module that manages the complete evaporative system for a vehicle. In this regard, some components that may be eliminated using the evaporative emissions control system 1020 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 1030, vent shut-off assembly 1022, manifold 1024, solenoid banks 1050A, 1050B and associated electrical connector 1044. Various other components may be modified to accommodate the evaporative emissions control system 1020 including the fuel tank 1012. For example, the fuel tank 1012 may be modified to eliminate valves and internal lines to pick-up points. The flange of the FDM 1046 may be modified to accommodate other components such as the control module 1030 and/or the electrical connector 1044. In other configurations, the fresh air line of the canister 1032 and a dust box may be modified. In one example, the fresh air line of the canister 1032 and the dust box may be connected to the control module 1030.

Figure 30:
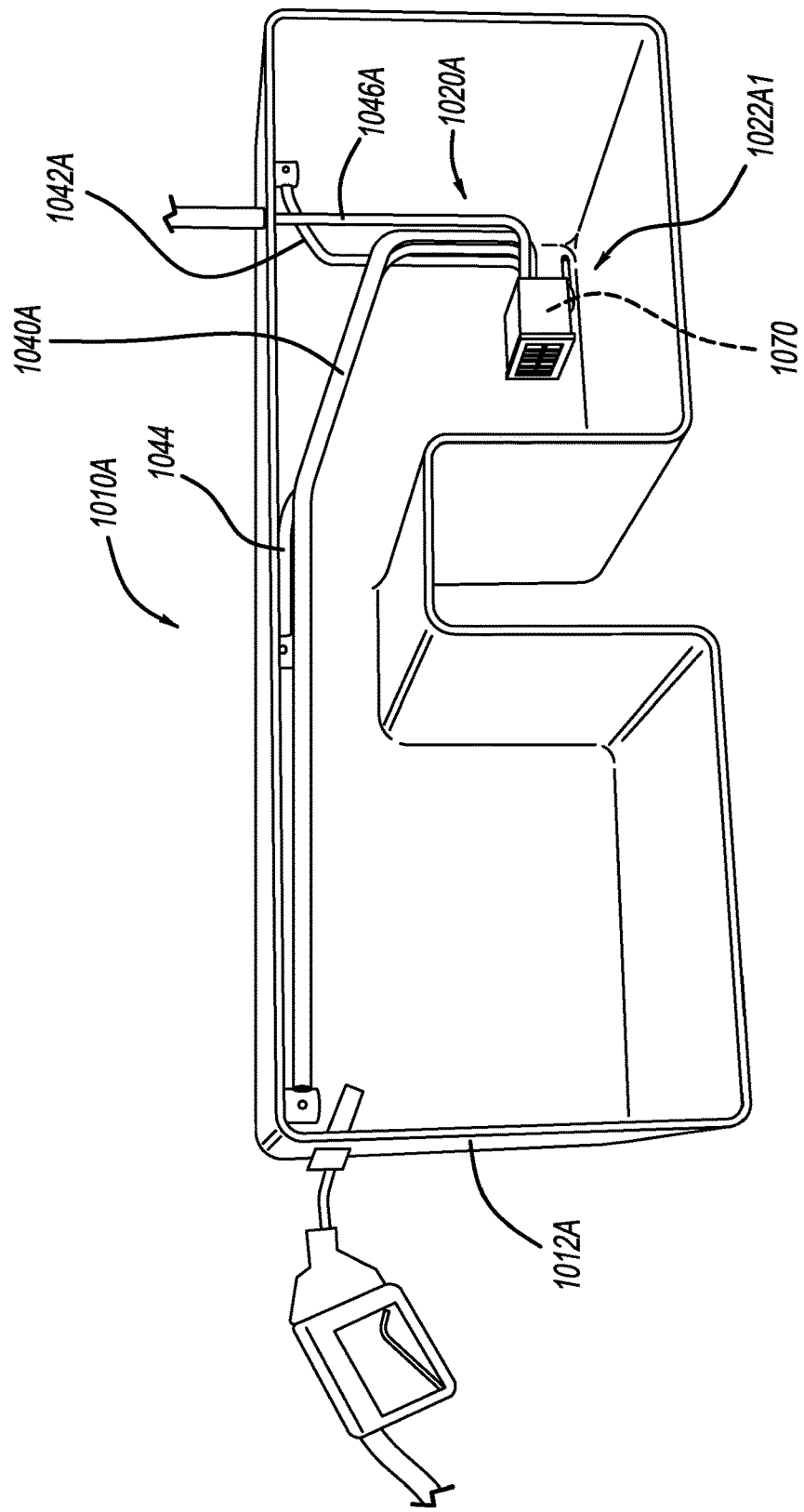
FIG. 30 is a perspective view of a fuel tank system having a vent shut-off assembly and configured for use on a saddle fuel tank according to another example of the present disclosure and shown with the fuel tank in section view.
Figure 31:
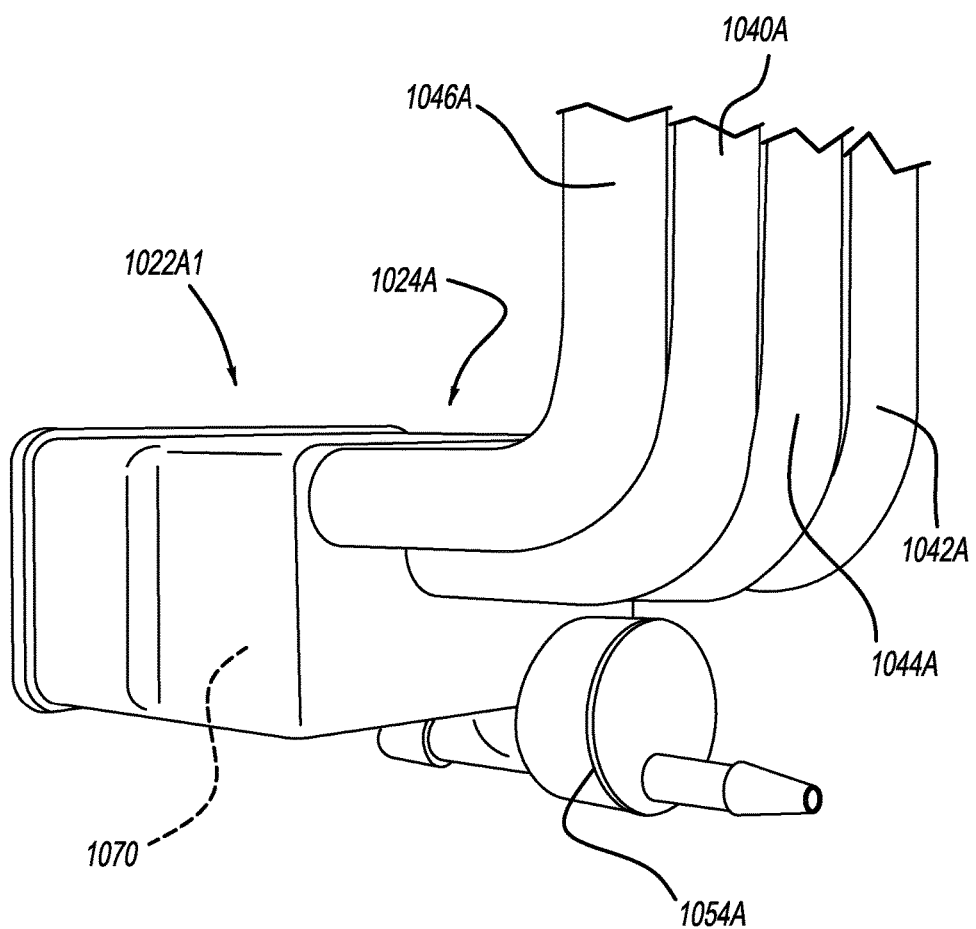
FIG. 31 is a perspective view of the vent shut-off assembly of the fuel tank system of FIG. 30.
Figure 32:
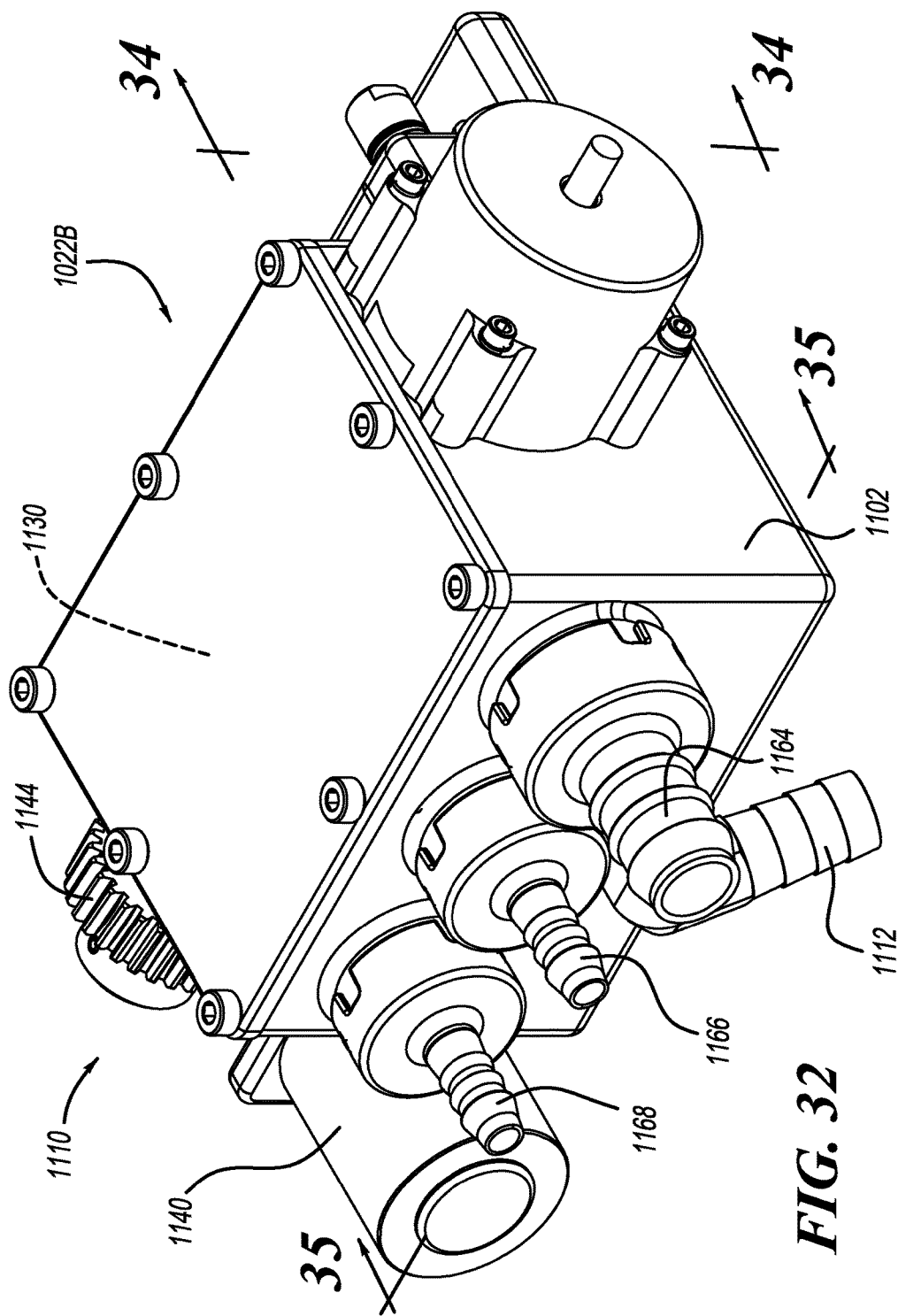
FIG. 32 is a top perspective view of a vent shut-off assembly constructed in accordance to additional features of the present disclosure.
Figure 33:
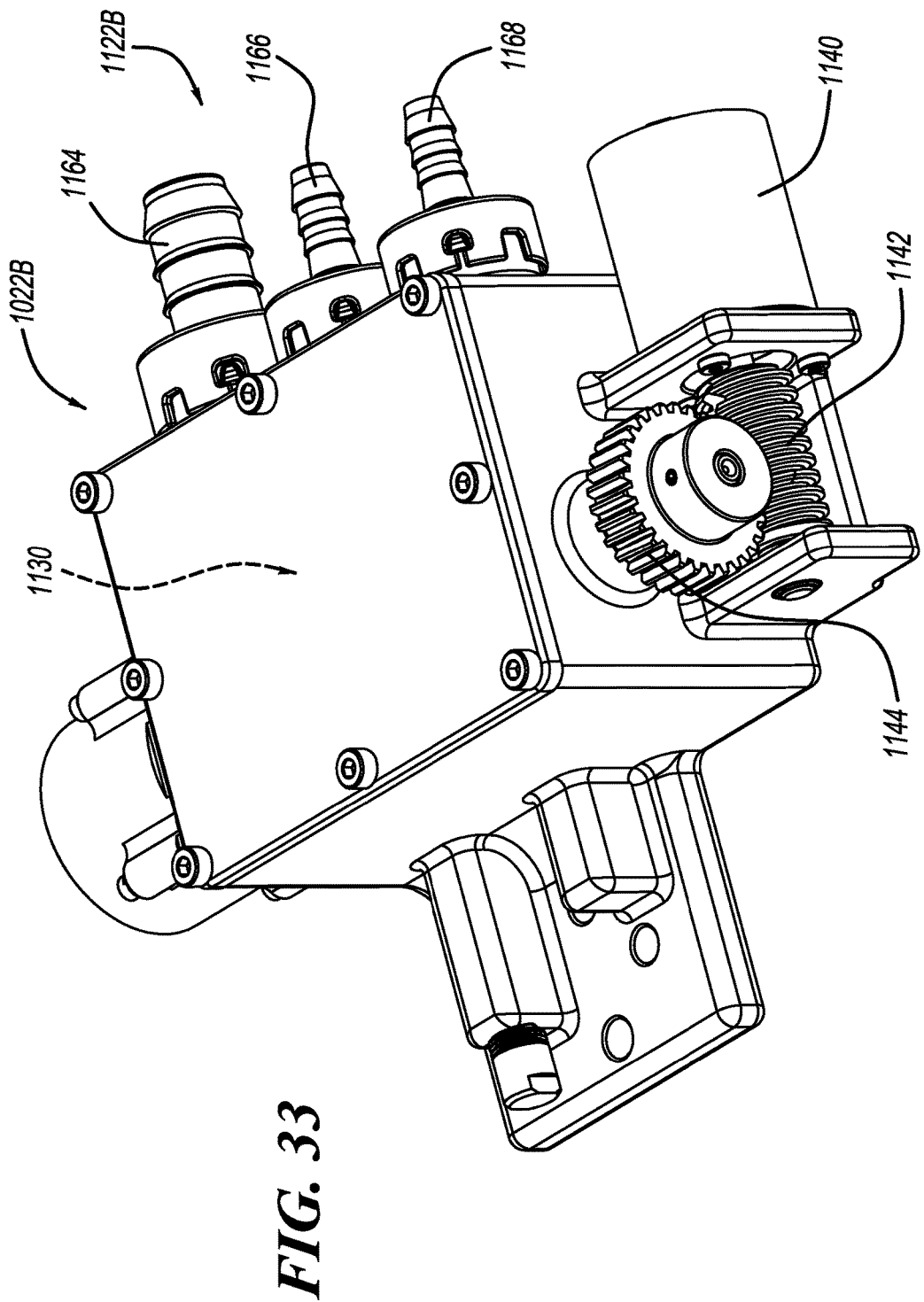
FIG. 33 is a bottom perspective view of the vent shut-off assembly of FIG. 32.
Figure 34:
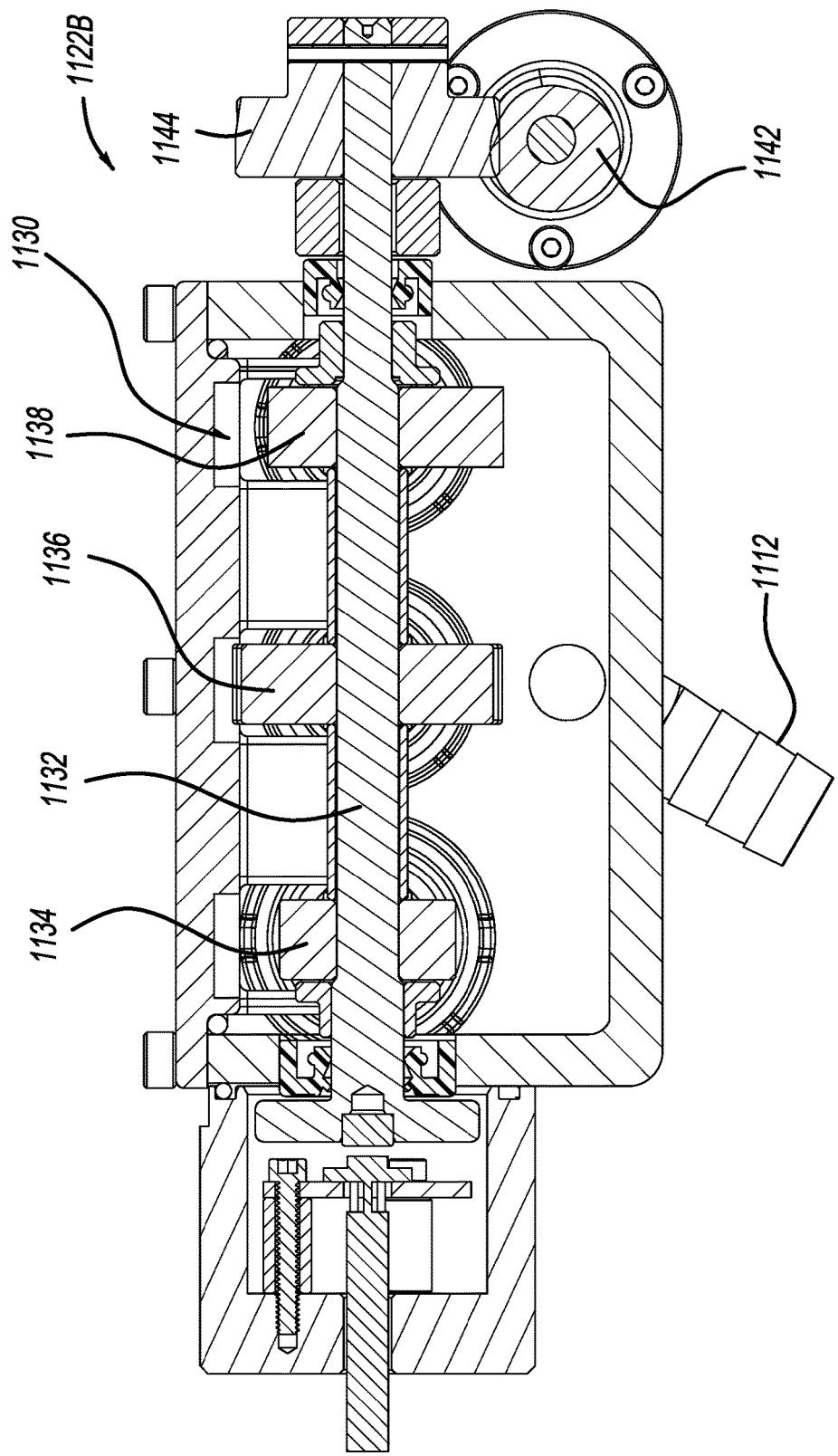
FIG. 34 is a sectional view of the vent shut-off assembly of FIG. 32 taken along lines 34-34.
Figure 35:
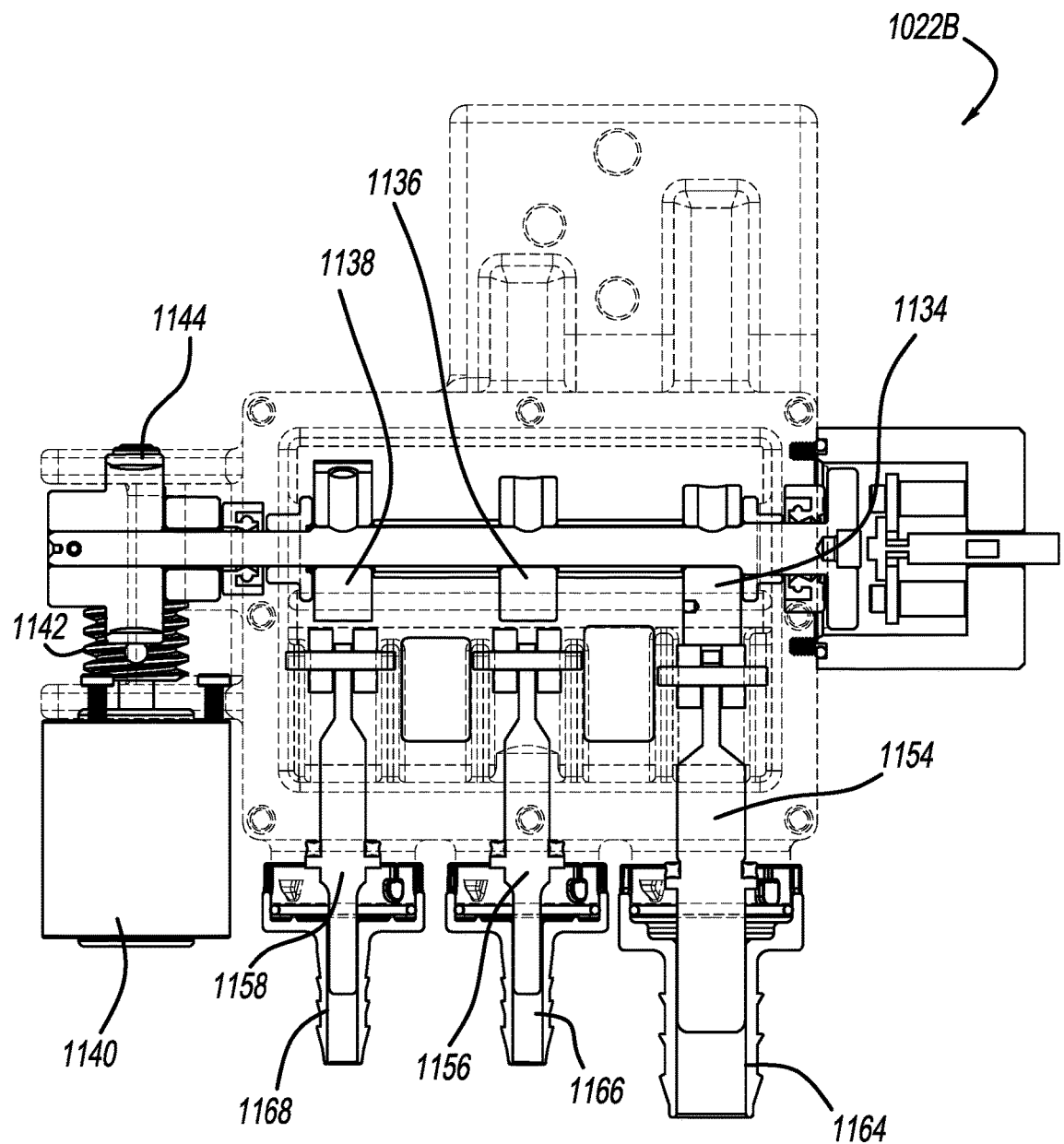
FIG. 35 is a sectional view of the vent shut-off assembly of FIG. 32 taken along lines 35-35.
Figure 36:
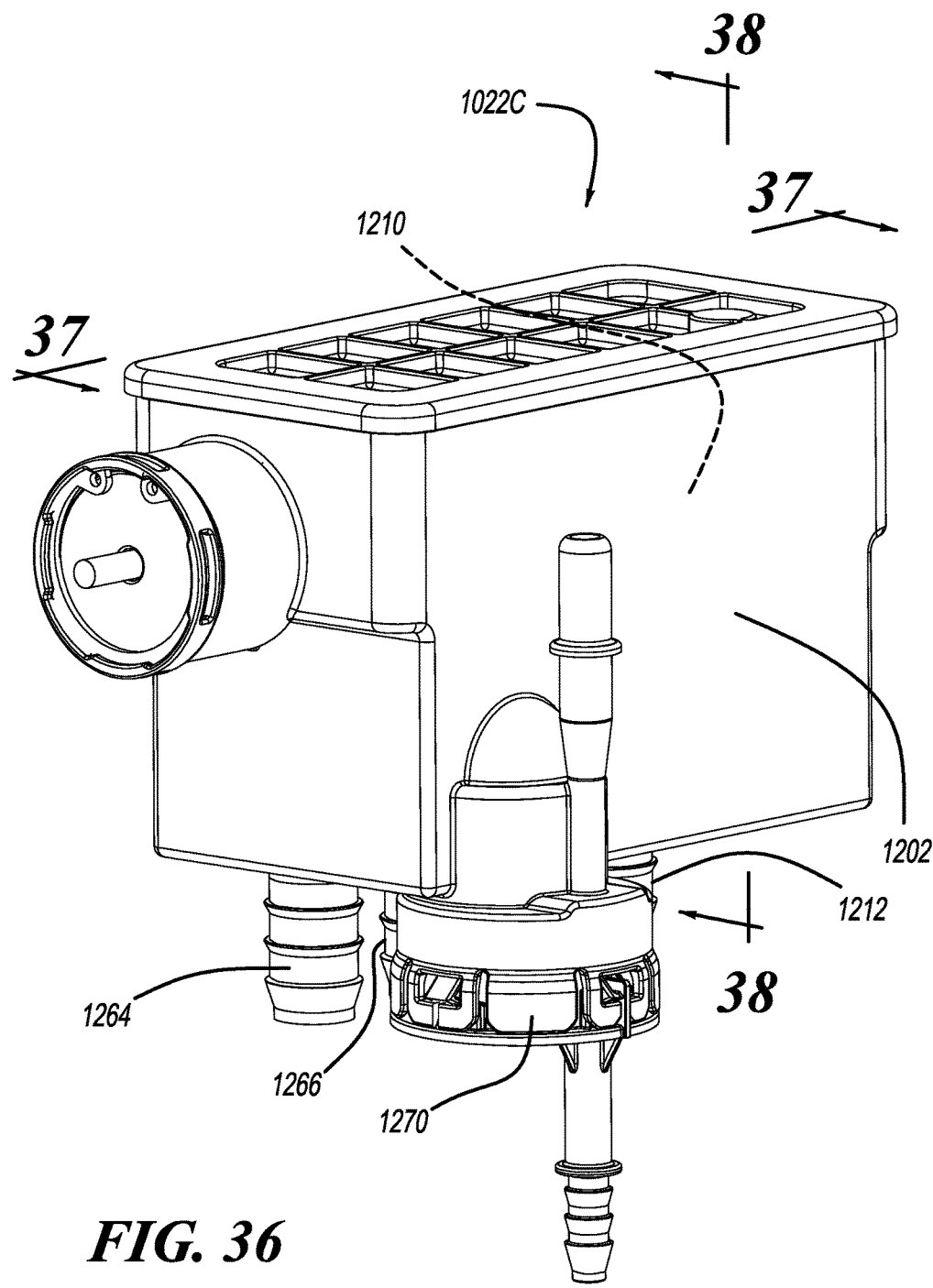
FIG. 36 is a front perspective view of a vent shut-off assembly constructed in accordance to another example of the present disclosure.
Figure 37:
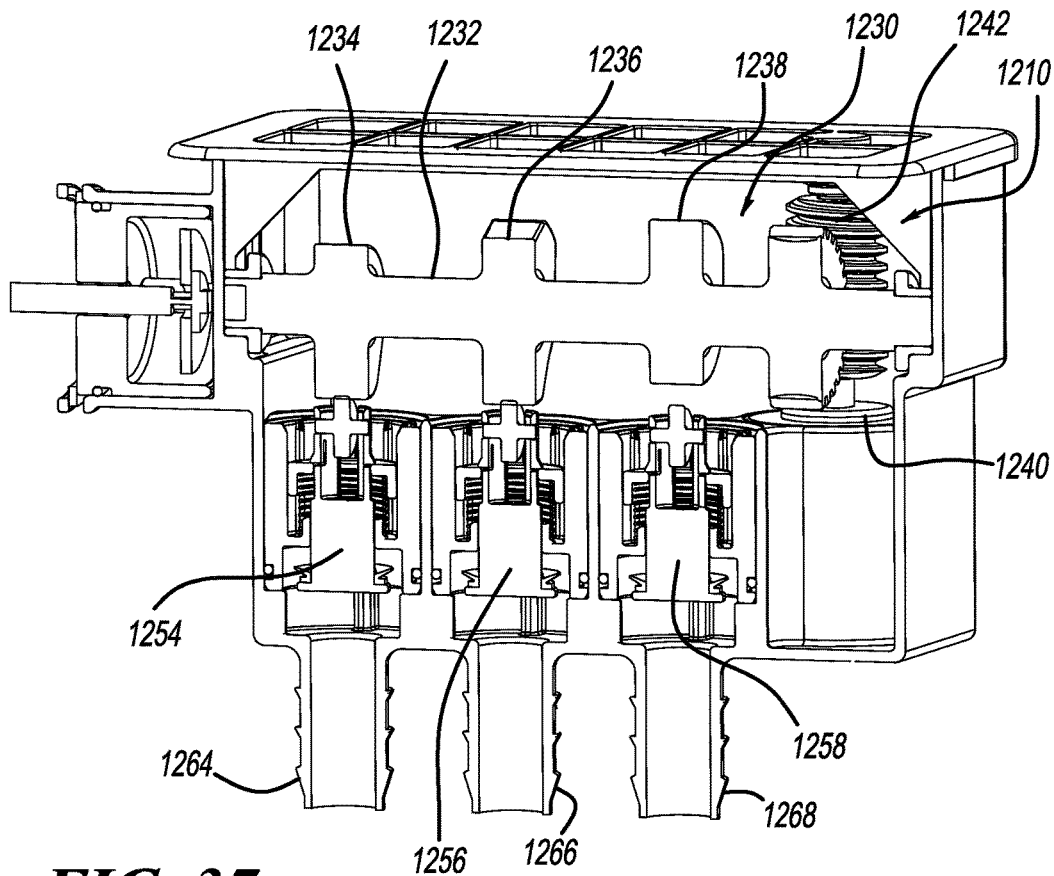
FIG. 37 is a sectional view of the vent shut-off assembly of FIG. 36 taken along lines 37-37.
Figure 38:
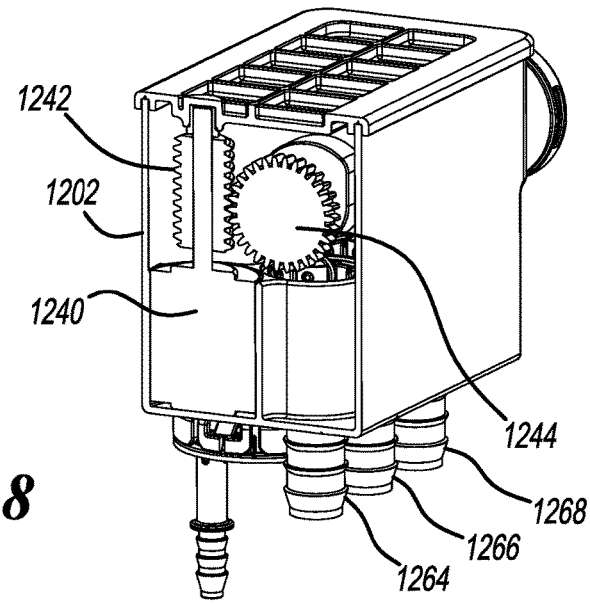
FIG. 38 is a sectional view of the vent shut-off assembly of FIG. 36 taken along lines 38-38.
Figure 39:
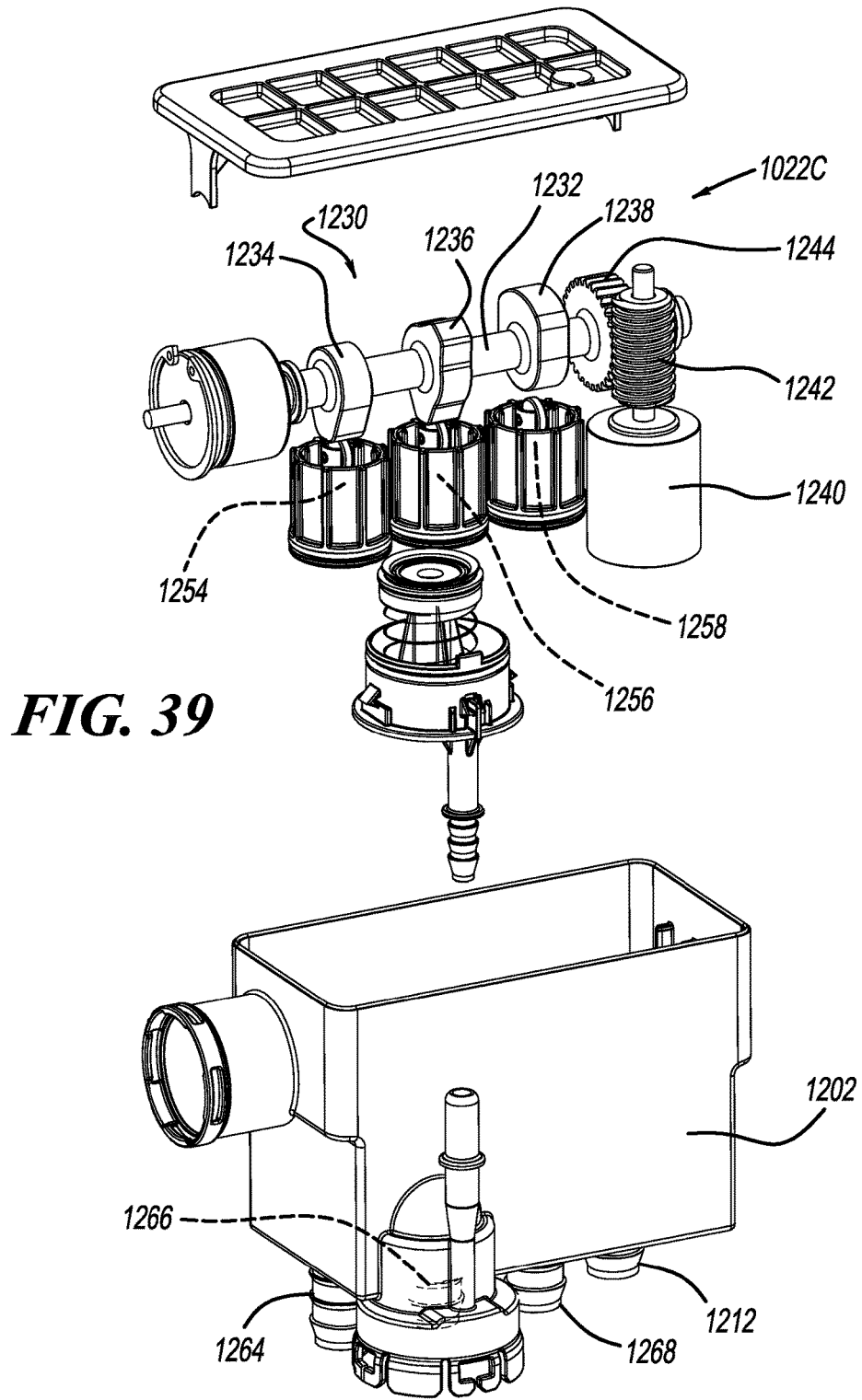
FIG. 39 is an exploded view of the vent shut-off assembly of FIG. 36.

Turning now to FIGS. 30 and 31, a fuel tank system 1010A constructed in accordance to another example of the present disclosure will be described. Unless otherwise described, the fuel tank system 1010A can include an evaporative emissions control system 1020A that incorporate features described above with respect to the fuel tank system 1010. The fuel tank system 1010A is incorporated on a saddle type fuel tank 1012A. A vent shut-off assembly 1022A1 can include a single actuator 1070 that communicates with a manifold 1024A to control opening and closing of three or more vent point inlets. In the example shown, the manifold assembly 1024A routes to a first vent 1040A, a second vent line 1042A and a third vent line 1044A. A vent 1046A routs to the canister (see canister 1032, FIG. 27). A liquid trap 1052A and a drain 1054A are incorporated on the manifold assembly 1024A. The fuel tank system 1010A can perform fuel tank isolation for high pressure hybrid applications without requiring a fuel tank isolation valve (FTIV). Further, the evaporative emissions control system 1020A can achieve the highest possible shut-off at the vent points. The system is not inhibited by conventional mechanical valve shut-off or reopening configurations. Vapor space and overall tank height may be reduced.

Turning now to FIGS. 32-35, a vent shut-off assembly 1022B constructed in accordance to another example of the present disclosure will be described. The vent shut-off assembly 1022B includes a main housing 1102 that at least partially houses an actuator assembly 1110. A canister vent line 1112 routs to the canister (see canister 1032, FIG. 27). The actuator assembly 1110 can generally be used in place of the solenoids described above to open and close selected vent lines. The vent shut-off assembly 1022B includes a cam assembly 1130. The cam assembly 1130 includes a cam shaft 1132 that includes cams 1134, 1136 and 1138. The cam shaft 1132 is rotatably driven by a motor 1140. In the example shown the motor 1140 is a direct current motor that rotates a worm gear 1142 that in turn drives a drive gear 1144. The motor 1140 is mounted outboard of the main housing 1102. Other configurations are contemplated. The cams 1134, 1136 and 1138 rotate to open and close valves 1154, 1156 and 1158, respectively. The valves 1154, 1156 and 1158 open and close to selectively deliver vapor through ports 1164, 1166 and 1168, respectively. In one example the motor 1140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat.

In one configuration the ports 1164 and 1166 can be routed to the front and back of the fuel tank 1012. The port 1164 can be configured solely as a refueling port. In operation, if the vehicle is parked on a grade where the port 1166 is routed to a low position in the fuel tank 1012, the cam 1136 is rotated to a position to close the port 1164. During refueling, the valve 1154 associated with port 1164 is opened by the cam 1134. Once the fuel level sensor 1048 reaches a predetermined level corresponding to a "Fill" position, the controller 1030 will close the valve 1154. In other configurations, the cam 1134, valve 1154 and port 1162 can be eliminated leaving two cams 1136 and 1138 that open and close valves 1156 and 1158. In such an example, the two ports 1164 and 1166 can be 7.5 mm orifices. If both ports 1164 and 1166 are open, refueling can occur. If less flow is required, a cam position can be attained where one of the valves 1156 and 1158 are not opened all the way.

Turning now to FIGS. 36-39, a vent shut-off assembly 1022C constructed in accordance to another example of the present disclosure will be described. The vent shut-off assembly 1022C includes a main housing 1202 that at least partially houses an actuator assembly 1210. A canister vent line 1212 routs to the canister (see canister 1032, FIG. 27). The actuator assembly 1210 can generally be used in place of the solenoids described above to open and close selected vent lines. The vent shut-off assembly 1022C includes a cam assembly 1230. The cam assembly 1230 includes a cam shaft 1232 that includes cams 1234, 1236 and 1238. The cam shaft 1232 is rotatably driven by a motor 1240. In the example shown the motor 1240 is received in the housing 1202. The motor 1240 is a direct current motor that rotates a worm gear 1242 that in turn drives a drive gear 1244. Other configurations are contemplated. The cams 1234, 1236 and 1238 rotate to open and close valves 1254, 1256 and 1258, respectively. The valves 1254, 1256 and 1258 open and close to selectively deliver vapor through ports 1264, 1266 and 1268, respectively. In one example the motor 1240 can alternately be a stepper motor. A drain 1270 can be provided on the housing 1202.

In one configuration the ports 1264 and 1266 can be routed to the front and back of the fuel tank 1012. The port 1264 can be configured solely as a refueling port. In operation, if the vehicle is parked on a grade where the port 1266 is routed to a low position in the fuel tank 1012, the cam 1236 is rotated to a position to close the port 1264. During refueling, the valve 1254 associated with port 1264 is opened by the cam 1234. Once the fuel level sensor 1048 reaches a predetermined level corresponding to a "Fill" position, the controller 1030 will close the valve 1254. In other configurations, the cam 1234, valve 1254 and port 1262 can be eliminated leaving two cams 1236 and 1238 that open and close valves 1256 and 1258. In such an example, the two ports 1264 and 1266 can be 7.5 mm orifices. If both ports 1264 and 1266 are open, refueling can occur. If less flow is required, a cam position can be attained where one of the valves 1256 and 1258 are not opened all the way.

Turning now to FIGS. 40-43, a vent shut-off assembly constructed in accordance to another example of the present disclosure is shown and generally identified at reference 1300. The vent shut-off assembly 1300 can be incorporated for use with any of the evaporative emissions control systems described herein. The vent shut-off assembly 1300 generally comprises a first cam shaft 1302 and a second cam shaft 1304. The first and second cam shafts 1302 and 1304 are coaxial and configured for relative rotation. The first cam shaft 1302 includes a first cam 1312 and a second cam 1314. The second cam shaft 1304 includes a third cam 1316. A first vent 1322 is actuated based on rotation of the first cam 1312. A second vent 1324 is actuated based on rotation of the second cam 1314. A third vent 1326 is actuated based on rotation of the third cam 1316. The first cam shaft 1302 has a first tab 1330. The second cam shaft 1304 has a second tab 1332. The first cam shaft 1302 controls the venting of the first and second vents 1322 and 1324. The second cam shaft 1304 rotates on the first cam shaft 1302. The second cam shaft 1304 is driven by the engagement of the first and second tabs 1330, 1332.

In one exemplary configuration, the third vent 1326 can be associated with a refueling vent. Under normal driving conditions, the first cam shaft 1302 may rotate to open and close the first and second vents 1322, 1324. The second cam shaft 1304 may move while the first cam shaft 1302 is moving but insufficiently to cause actuation of the third vent 1326. The third vent 1326 is actuated by rotation of the tab 1332 to an open position. The third vent 1326 is closed by further pushing the tab 1332 past the open position. In this regard, actuation of the first and second vents 1322 and 1324 can be accomplished discretely from actuation of the third vent 1326.

Turning now to FIGS. 44-47, a vent shut-off assembly constructed in accordance to another example of the present disclosure is shown and generally identified at reference 1400. The vent shut-off assembly 1400 can be incorporated for use with any of the evaporative emissions control systems described herein. The vent shut-off assembly 1400 generally provides solenoid controlled linear actuation of two vent points. The vent shut-off assembly 1400 generally includes a solenoid 1402 that actuates a valve member assembly 1404 relative to a valve body 1410. The valve body 1410 generally includes a first inlet 1420, a second inlet 1422 and an outlet 1424. By way of example, the first and second inlets 1420 and 1422 can be fluidly coupled to first and second vent tubes as disclosed herein.

Figures 44, 45:
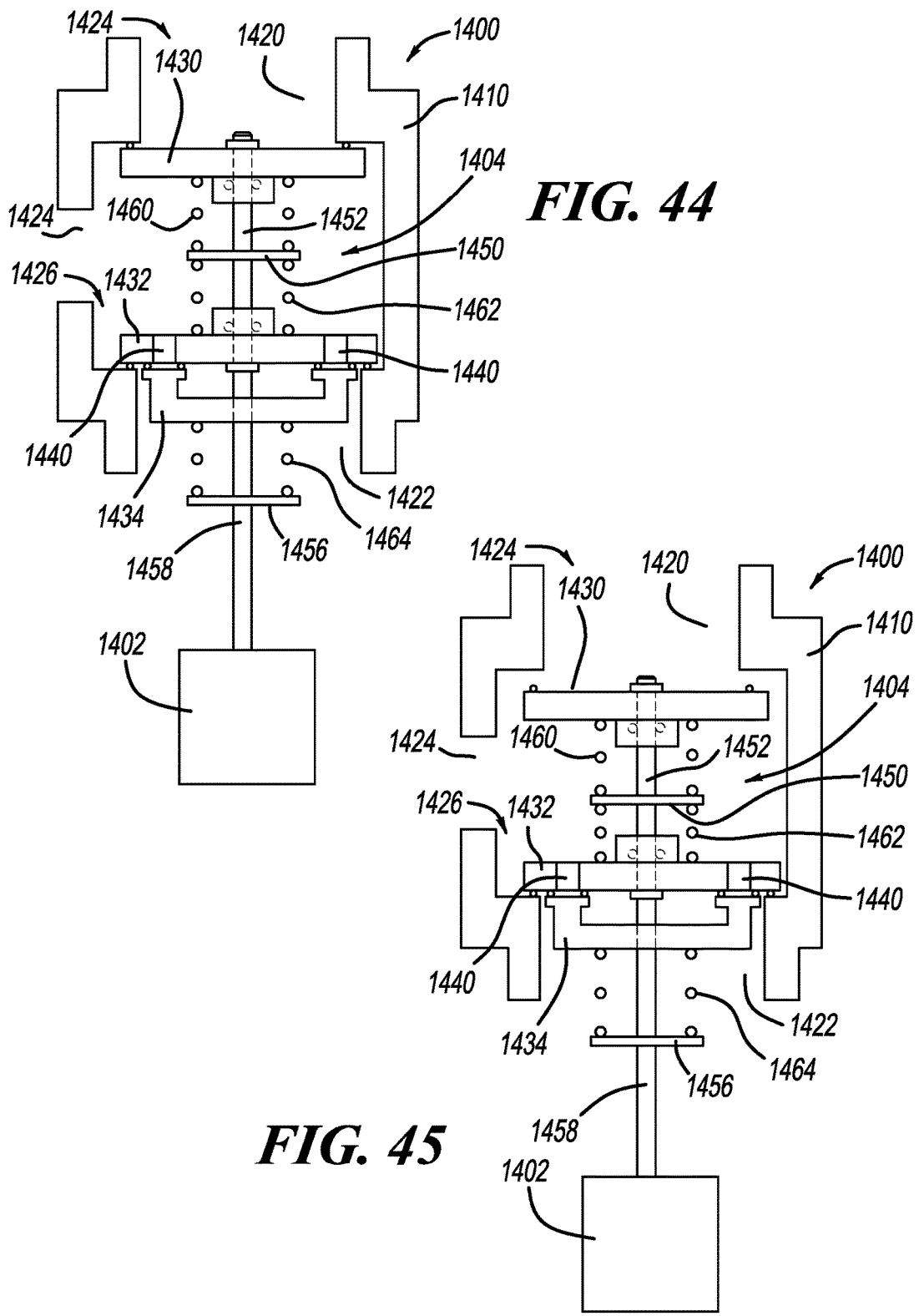
FIG. 44 is a sectional view of a vent shut-off assembly constructed in accordance to additional features of the present disclosure and shown with the valve member assembly in a first position wherein first and second inlets are closed.
FIG. 45 is a sectional view of the vent shut-off assembly of FIG. 44 and shown with the valve member assembly in a second position wherein the first inlet is open and the second inlet is closed.

The valve member assembly 1404 collectively comprises a first vent valve 1424 and a second vent valve 1426. The first vent valve 1424 includes a first valve closing element or disk 1430. The second vent valve 1426 collectively comprises a second valve closing element or disk 1432 and a third closing element or disk 1434. The second disk 1432 defines apertures 1440 therethrough. A first spring support 1450 is disposed on a distal shaft 1452. A second spring support 1456 is disposed on a proximal shaft 1458. A first biasing member 1460 is arranged between the first spring support 1450 and first disk 1430 for biasing the first disk 1430 toward a closed position (FIG. 44). A second biasing member 1462 is arranged between the first spring support 1450 and the second disk 1432 for biasing the second disk 1432 toward a closed position (FIG. 44). A third biasing member 1464 is arranged between the second spring support 1456 and the third disk 1434 for biasing the third disk 1434 toward the second disk 1432. A first seal member 1470 is disposed on the first disk 1430. A second seal member 1472 and third seal member 1474 is disposed on the second disk 1432.

Operation of the vent shut-off assembly 1400 will now be described. In FIG. 44, the first and second inlets 1420 and 1422 and the outlet 1424 are all closed relative to each other. The first disk 1430 is closed, closing the first inlet 1420. The first disk 1430 is sealingly engaged to the valve body 1410. The second disk 1432 is closed and the third disk 1434 is closed. The second disk 1432 is sealingly engaged to the valve body 1410 closing the outlet 1424. The third disk 1434 is sealingly engaged to the second disk 1432 closing the second inlet 1422.

Figure 46:
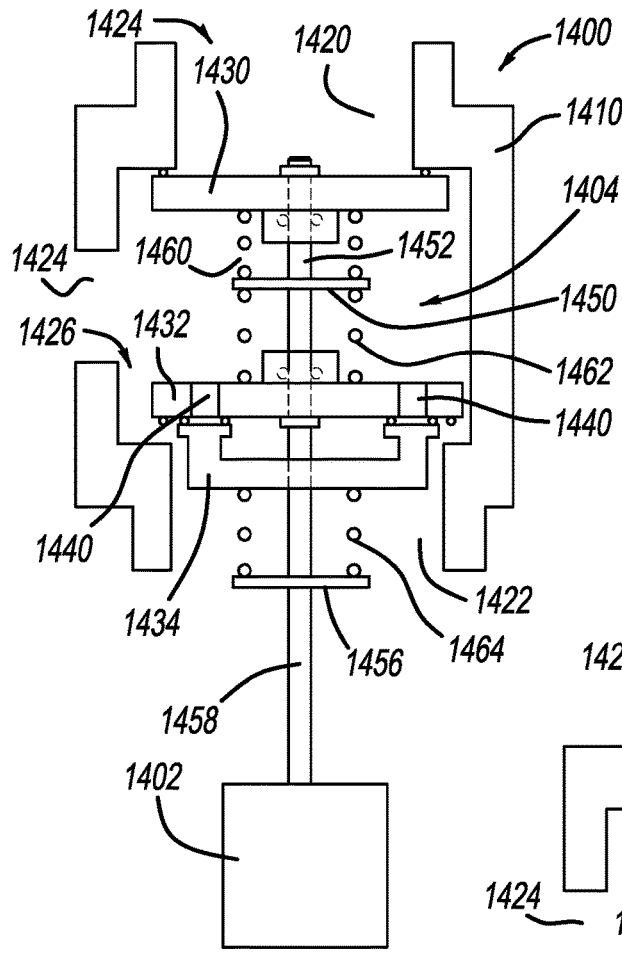
FIG. 46 is a sectional view of the vent shut-off assembly of FIG. 44 and shown with the valve member assembly in a third position wherein the first inlet is closed and the second inlet is open.
Figure 47:
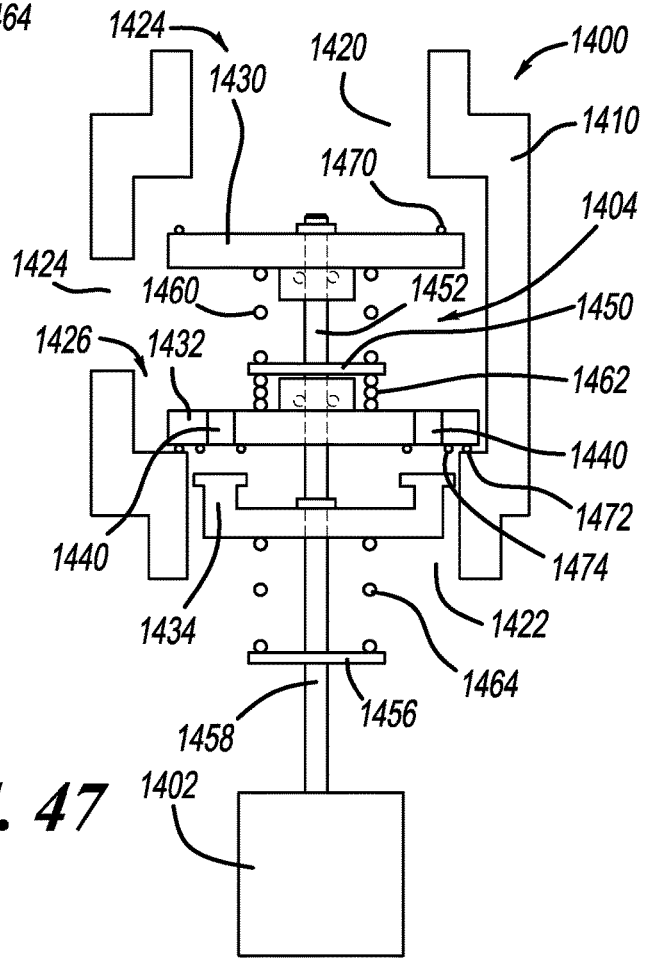
FIG. 47 is a sectional view of the vent shut-off assembly of FIG. 44 and shown with the valve member assembly in a fourth position wherein the first and second inlets are open.

In FIG. 45, the first inlet 1420 is open to the outlet 1424. The second inlet 1422 is closed. The solenoid 1402 urges the first disk 1430 away from seating on the valve body 1410. In FIG. 46, the second inlet 1422 is open to the outlet 1424. The first inlet 1420 is closed. The solenoid 1402 urges the third disk 1434 and therefore the second disk 1432 upward. In FIG. 47, the first inlet 1420 is open to the outlet 1424. The second inlet 1422 is also open to the outlet 1424.

With additional reference now to FIGS. 48-52, a vent shut-off or control assembly constructed in accordance to one example of the present disclosure is shown and generally identified at reference 1510. The vent control assembly 1510 can be used in a fuel system such as fuel system 1010 and cooperate with evaporative emissions control system 1020 to open and close identified vents. It will be appreciated that the vent control assembly 1510 can be used in other fuel systems or systems in general to regulate fluid flow.

The vent control assembly 1510 generally includes shaft assembly 1512, a block 1516, actuation assembly 1520 and an input source 1522. The shaft assembly 1512 can include a split shaft having a first shaft portion 1530 and a second shaft portion 1532. The actuation assembly 1520 includes a cam assembly 1534. As will be explained herein, the first and second shaft portions 1530 and 1532 can move relative to each other based on rotation of the cam assembly 1534. The shaft assembly 1512 (split shaft) can have internal and external splines between the respective first and second shaft portions 1530 and 1532. The second shaft portion 1532 can be formed of externally molded rubber. The block 1516 can be formed of metal. The second shaft portion 1532 has a first shaft passage 1536. The block 1516 has first and second block passages 1540, 1542. The cam assembly 1534 generally includes a cam plate 1544 and a plurality of protrusions 1546. The second shaft 1532 can include a spring loaded probe assembly 1550 thereon. The spring loaded probe assembly 1550 generally includes cam followers 1552 that are biased by respective biasing members 1554. The input source 1522 can include a servo motor. Other actuation sources are contemplated.

During operation, the actuation source 1522 rotates the first shaft 1530 causing the protrusions 1546 on the cam plate to urge the cam followers 1546 on the spring loaded probe assembly 1550 to move rightward ultimately causing the second shaft 1532 to translate rightward. In this regard, in the unactuated position (FIG. 48), the first shaft passage 1536 is not aligned with the first and second block passages 1540, 1542. In the actuated position (FIG. 49), the first shaft passage 1536 is aligned with the first and second block passages 1540, 1542. A biasing member 1556 can urge the second shaft 1532 back toward the unactuated position. The biasing members 1554 and 1556 can be used to return the second shaft 1532 to be available for subsequent indexing.

Figure 48:
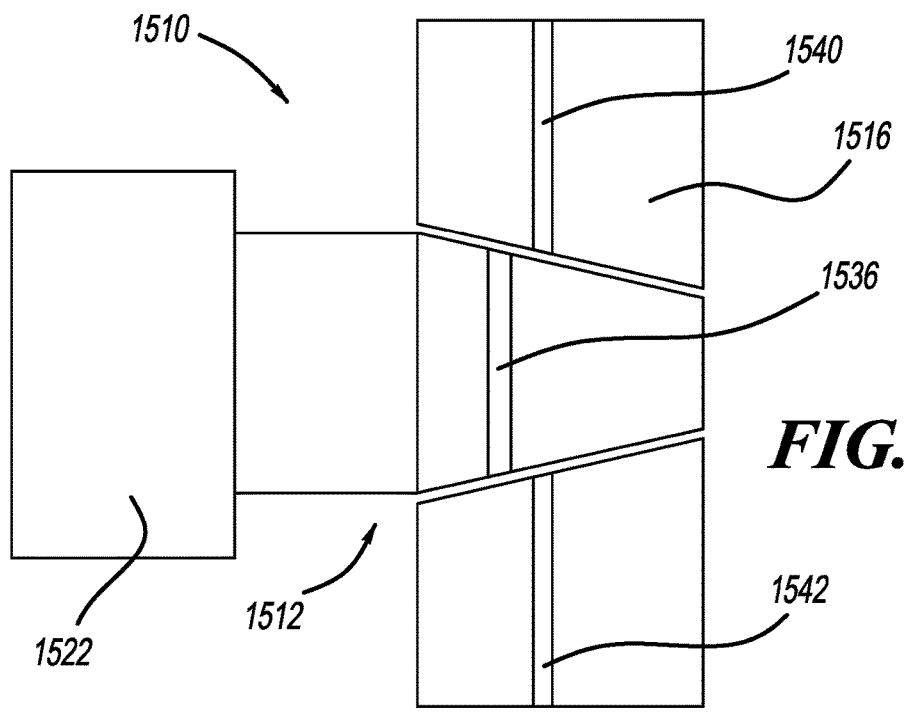
FIG. 48 is a schematic illustration of a valve control assembly for use on a fuel tank system having an evaporative emissions control system in accordance to one example of the present disclosure and show prior to actuation.
Figure 49:
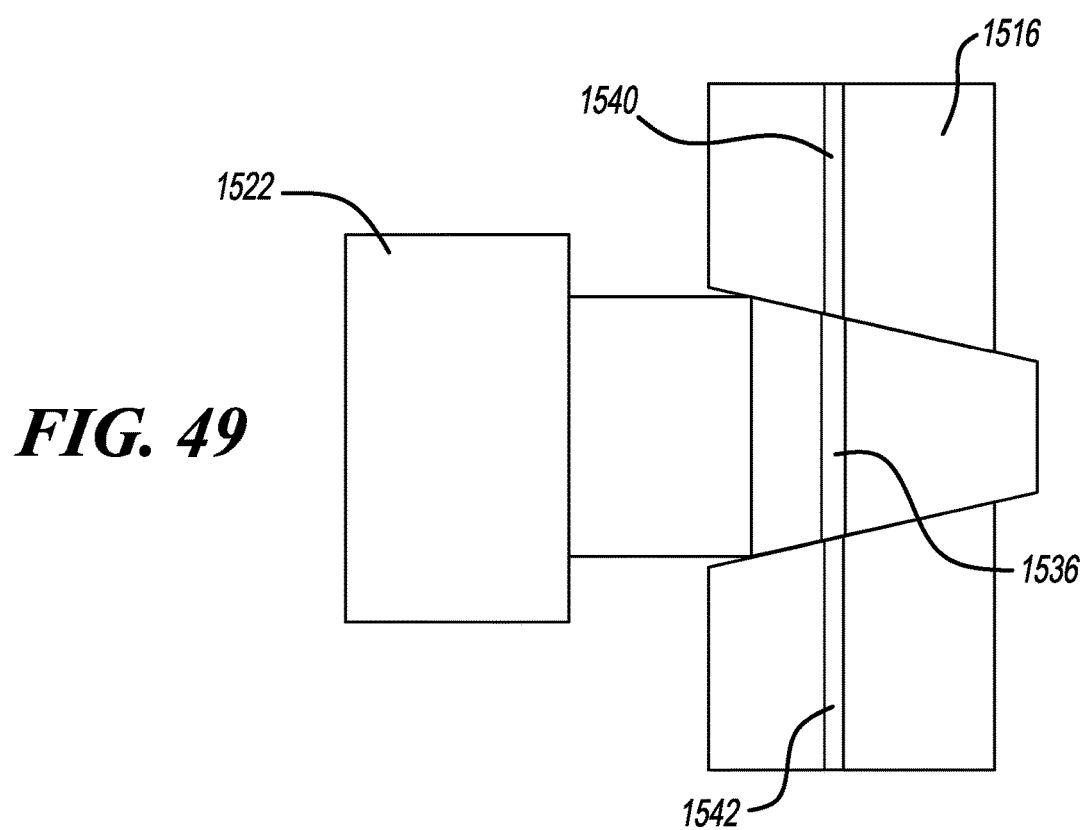
FIG. 49 is a schematic illustration of the valve control assembly of FIG. 48 and shown subsequent to valve actuation.
Figure 50:
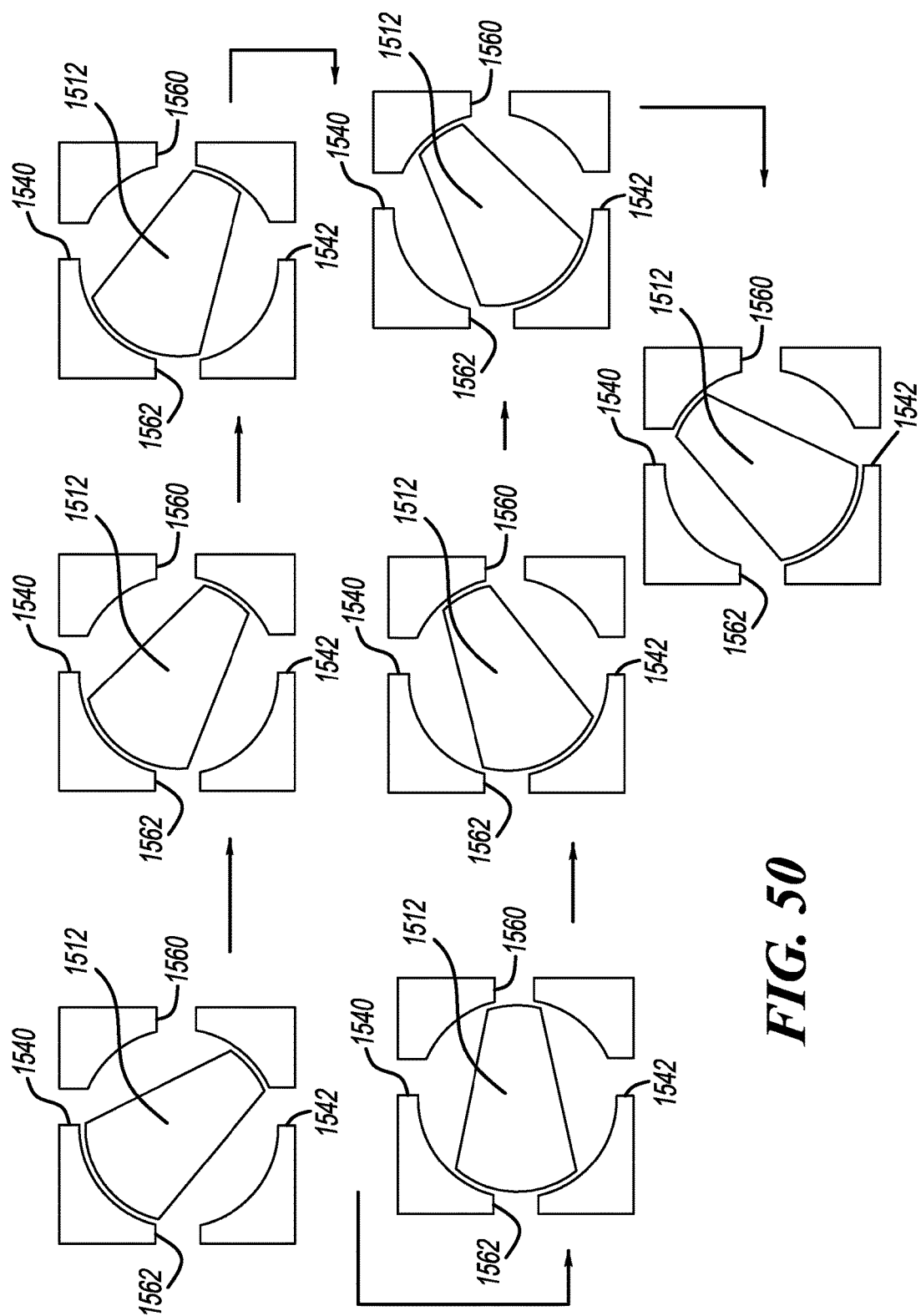
FIG. 50 is a sectional sequential view of the valve control assembly of FIG. 48.
Figure 51:
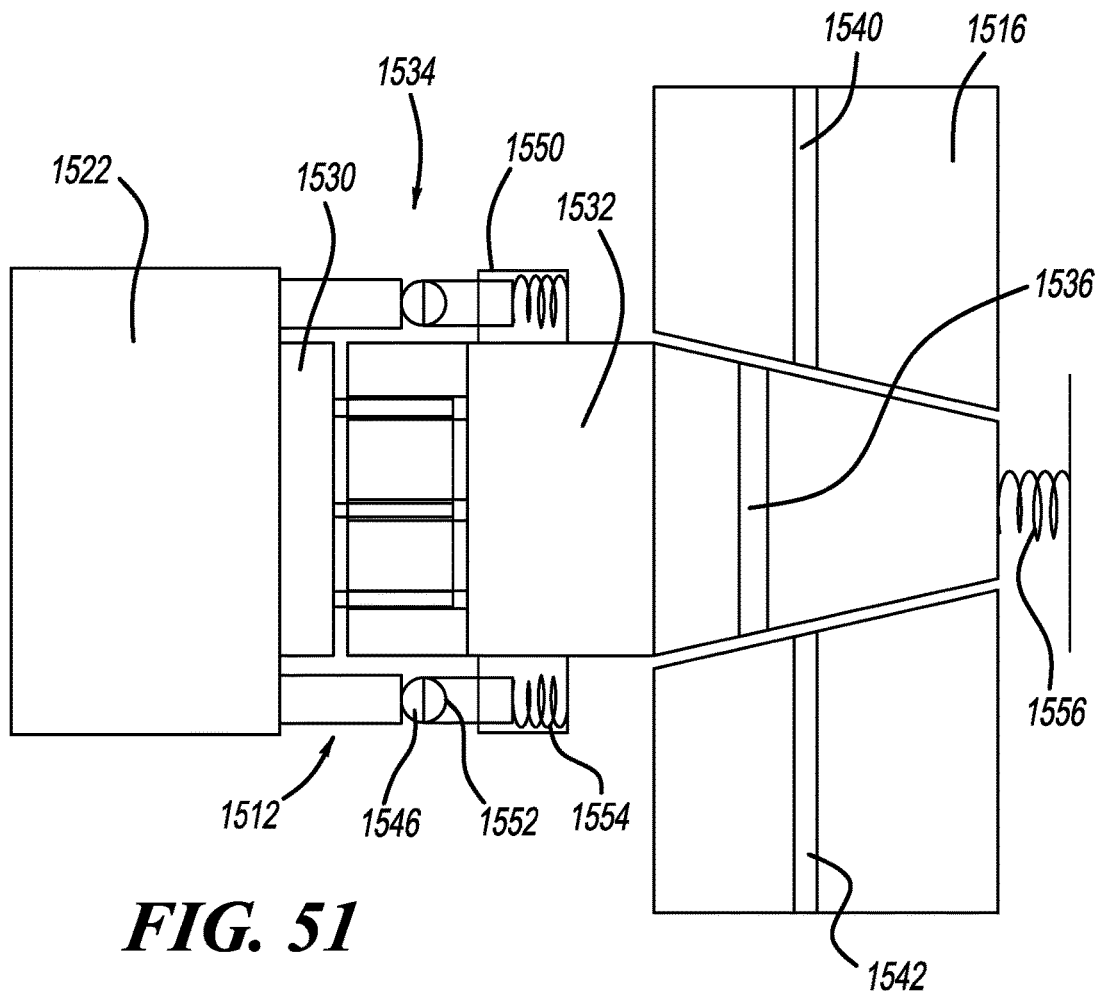
FIG. 51 is another schematic illustration of the valve control assembly of FIGS. 48 and 49.
Figure 52:
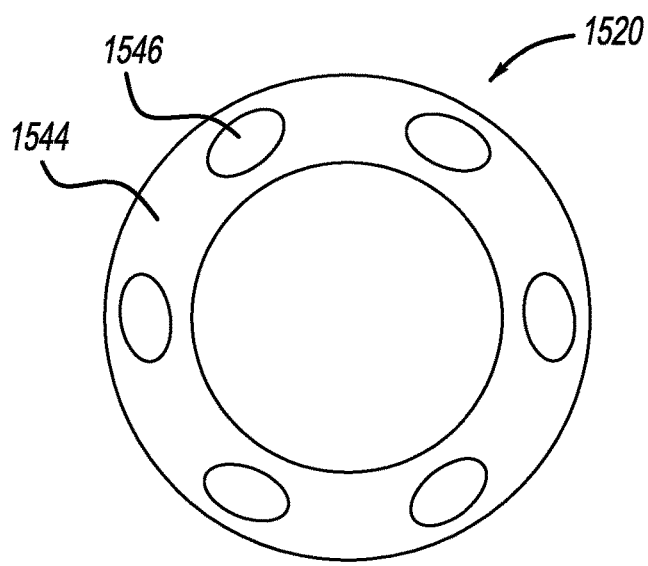
FIG. 52 is a top view of a cam mechanism of the valve control assembly of FIG. 51.
Figure 54:
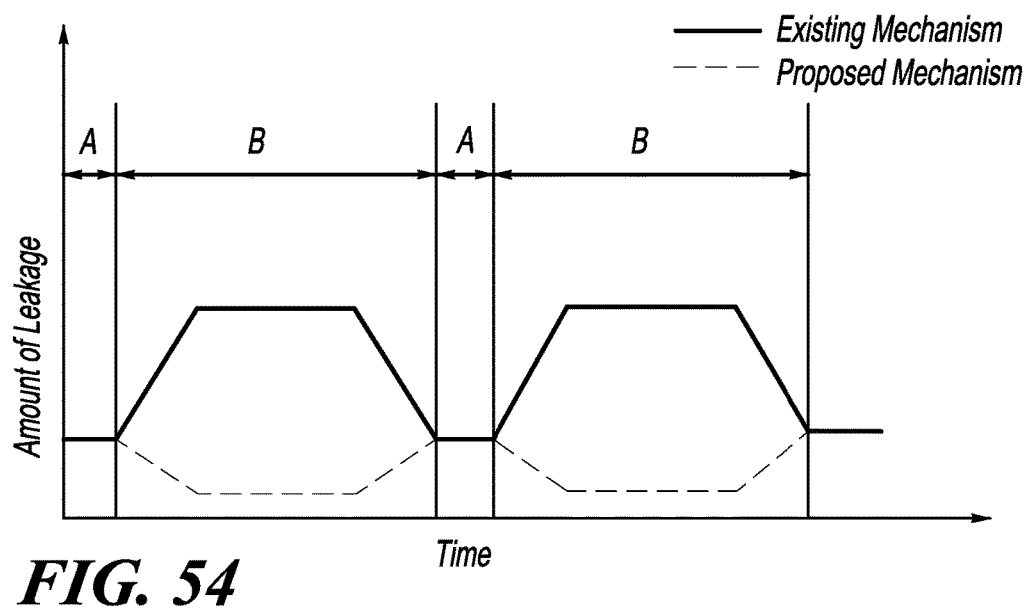
FIG. 54 is a plot of leakage versus time for the valve control assemblies of the present disclosure.

In the example shown in FIGS. 48 and 49, the block 1516 has first and second block passages 1540, 1542. As shown in FIG. 50 however the block 1516 may incorporate additional passages such as third and fourth block passages 1560, 1562. In one example it is contemplated that the passages 1540, 1542, 1560, 1562 can be fluidly connected to vent lines in the fuel tank. The second shaft portion 1532 is generally wedge shaped. The valve control assembly 1510 can be used for a dynamic state and a steady state, as shown in FIG. 54. In the dynamic state, the second shaft 1532 is in dynamic state. Leakage is not critical and will not be significant due to low fluid pressure and short transition times. In steady state, the second shaft 1532 is in steady state for significant operation time. Leakage is not desired. During steady state, the proposed leakage control is most effective.

Figure 53:
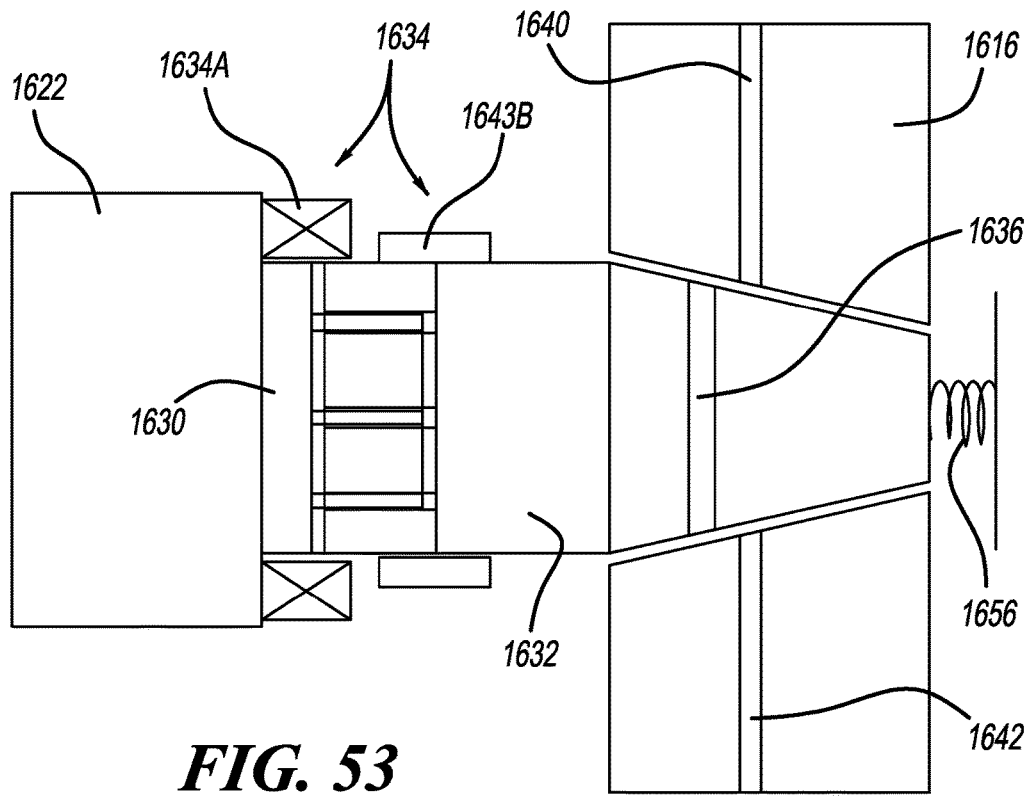
FIG. 53 is a schematic illustration of a valve control assembly constructed in accordance to another example of the present disclosure.

With additional reference now to FIG. 53, a vent control assembly constructed in accordance to one example of the present disclosure is shown and generally identified at reference 1610. The vent control assembly 1610 can be used in a fuel system such as fuel system 1010 and cooperate with evaporative emissions control system 1020 to open and close identified vents. It will be appreciated that the vent control assembly 1610 can be used in other fuel systems or systems in general to regulate fluid flow.

The vent control assembly 1610 generally includes shaft assembly 1612, a block 1616, actuation assembly 1620 and an input source 1622. The shaft assembly 1612 can include a split shaft having a first shaft portion 1630 and a second shaft portion 1632. The actuation assembly 1620 includes an electromagnetic assembly 1634. The electromagnetic assembly 1634 includes electromagnetic coils 1634A and a magnet portion 1634B. As will be explained herein, the first and second shaft portions 1630 and 1632 can move relative to each other when the electromagnetic assembly 1634 is energized. When the electromagnetic coils 1634A are energized, the magnet portion 1634B moves toward the electromagnetic coils 1634A.

The second shaft portion 1632 can be formed of externally molded rubber. The block 1616 can be formed of metal. The second shaft portion 1632 has a first shaft passage 1636. The block 1616 has first and second block passages 1640, 1642. The input source 1622 can include a servo motor. Other actuation sources are contemplated.

During operation, the second shaft 1632 occupies a first position where the first shaft passage 1636 is not aligned with the first and second block passages 1640, 1642. In a second position, the first shaft passage 1636 is aligned with the first and second block passages 1640, 1642. A biasing member 1656 can urge the second shaft 1632 back toward the unactuated position to be available for subsequent indexing.

Figure 55:
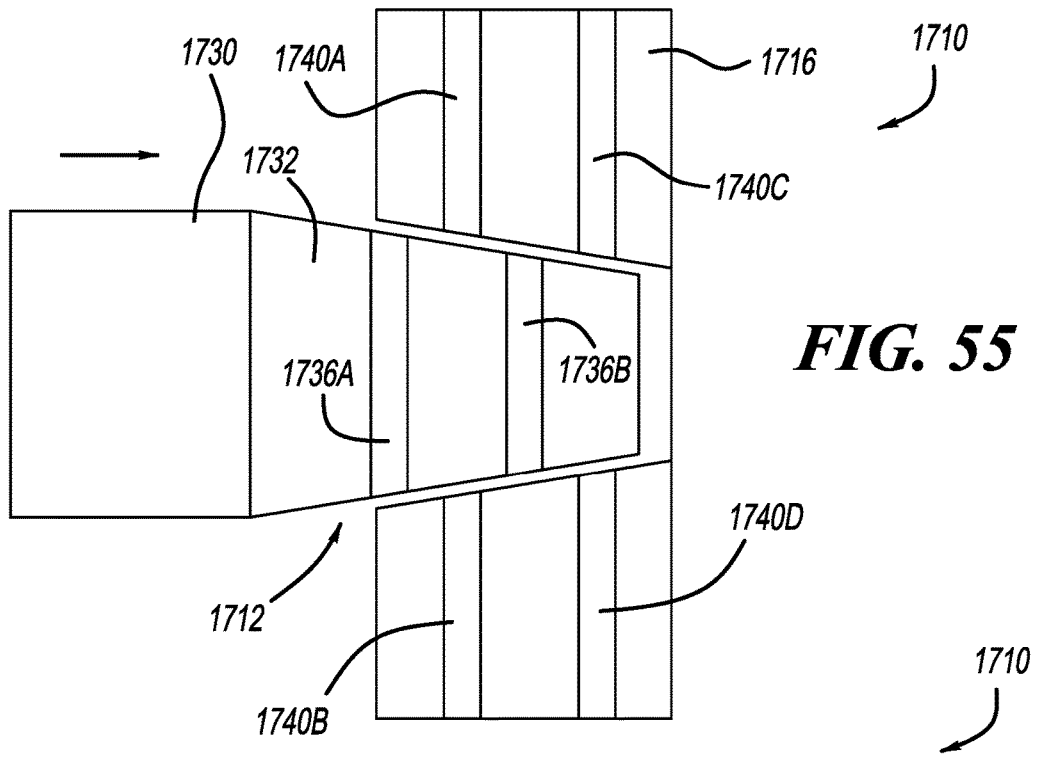
FIG. 55 is a schematic illustration of a valve control assembly constructed in accordance to another example of the present disclosure and shown prior to actuation.
Figure 56:
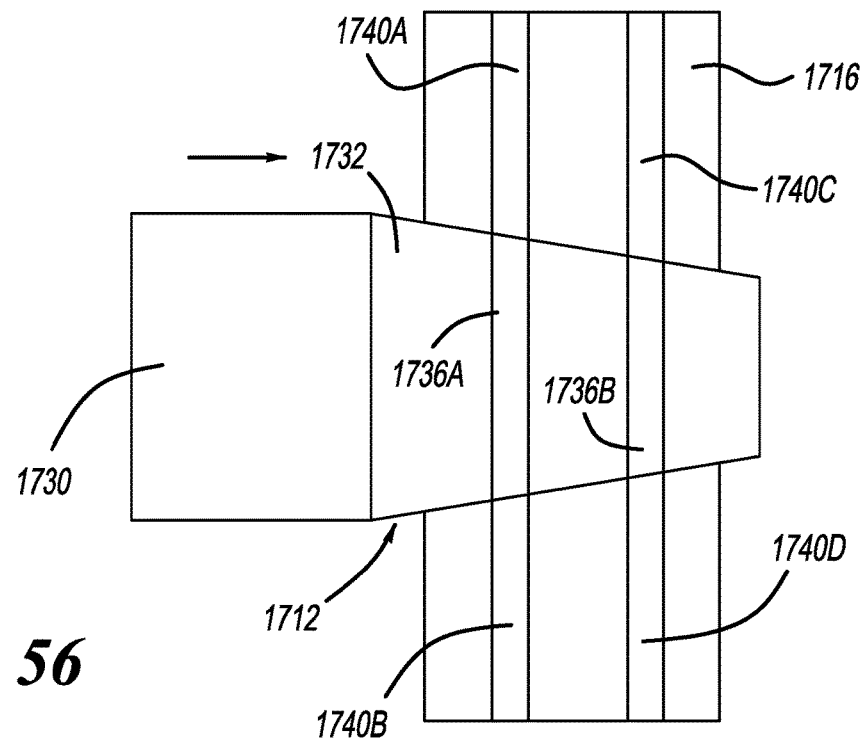
FIG. 56 is a schematic illustration of the valve control assembly of FIG. 55 and shown subsequent to actuation.

Turning now to FIGS. 55 and 56, a vent shut-off or control assembly constructed in accordance to one example of the present disclosure is shown and generally identified at reference 1710. The vent control assembly 1710 can be used in a fuel system such as fuel system 1010 and cooperate with evaporative emissions control system 1020 to open and close identified vents. It will be appreciated that the vent control assembly 1710 can be used in other fuel systems or systems in general to regulate fluid flow.

The vent control assembly 1710 generally includes shaft assembly 1712 and a block 1716. The vent control assembly 1710 can be configured for use with any of the actuation assemblies described above. The shaft assembly 1712 can include a split shaft having a first shaft portion 1730 and a second shaft portion 1732. In this example, the second shaft has first and second shaft passages 1736A, 1736B. The block has first, second, third and fourth block passages 1740A, 1740B, 1740C and 1740D. Based on this configuration, the second shaft 1732 can be translated from the position shown in FIG. 55 to a position shown in FIG. 56. As can be appreciated, multiple passages may be connected at a time. In the example shown in FIG. 56, the first shaft passage 1736A is aligned with the first and second block passages 1740A, 1740B. The second shaft passage 1736B is also aligned with third and fourth block passages 1740C, 1740D.

Figure 57:
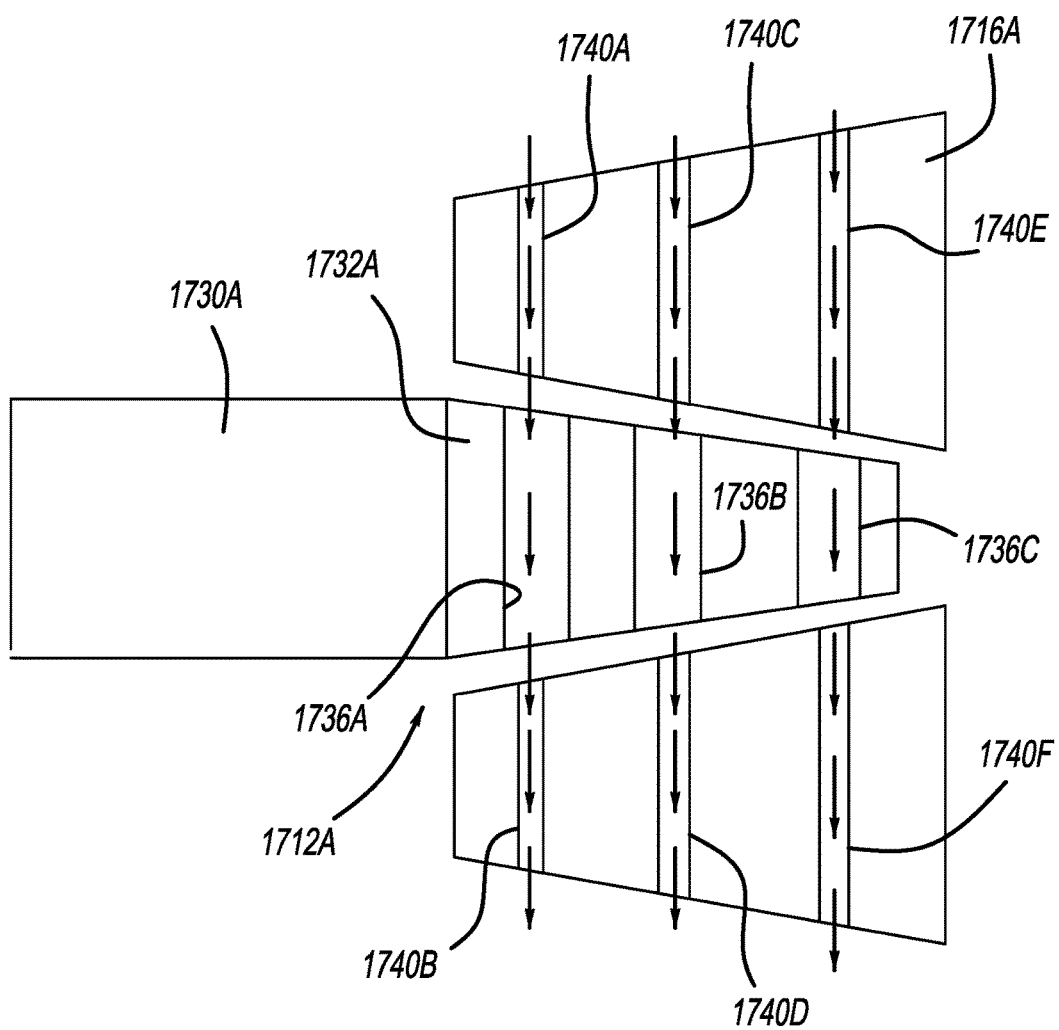
FIG. 57 is a schematic illustration of a valve control assembly constructed in accordance to another example.

FIG. 57 illustrates a shaft assembly 1712A having a first shaft 1730A and a second shaft 1732A. In this example, the second shaft 1732A has a third shaft passage 1736C. The block 1716A includes a fifth and sixth block passage 1740E and 1740F.

Figure 60:
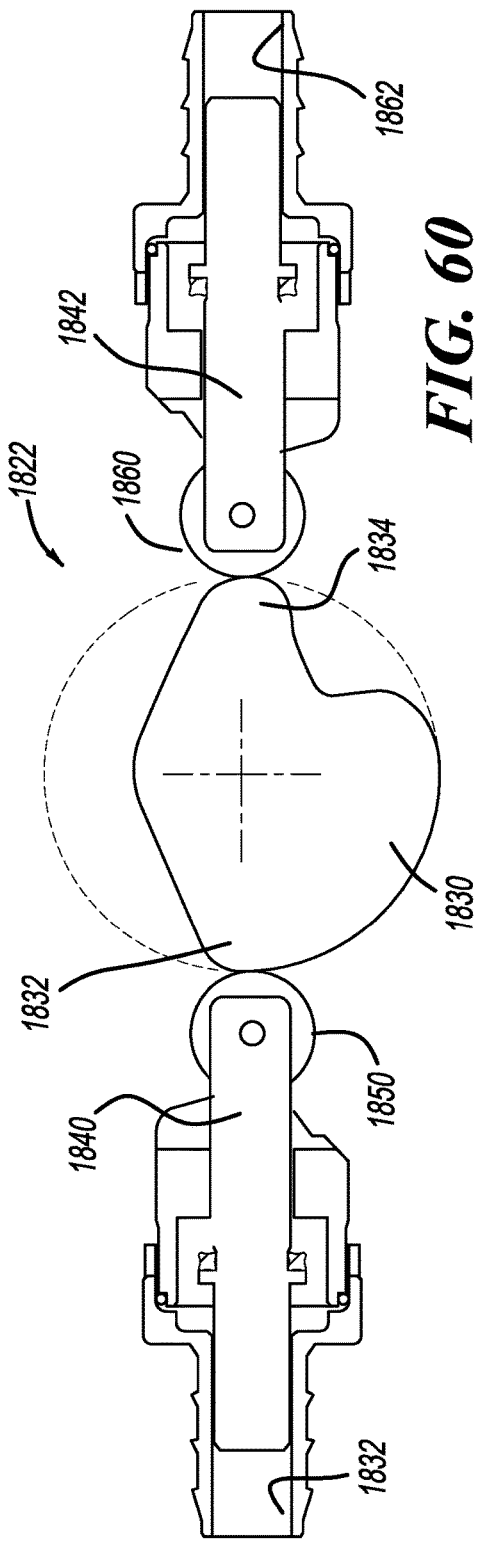
FIG. 60 is a sectional view of the vent shut-off assembly of FIG. 58 and shown with the first and second poppet valves open.
Figure 61:
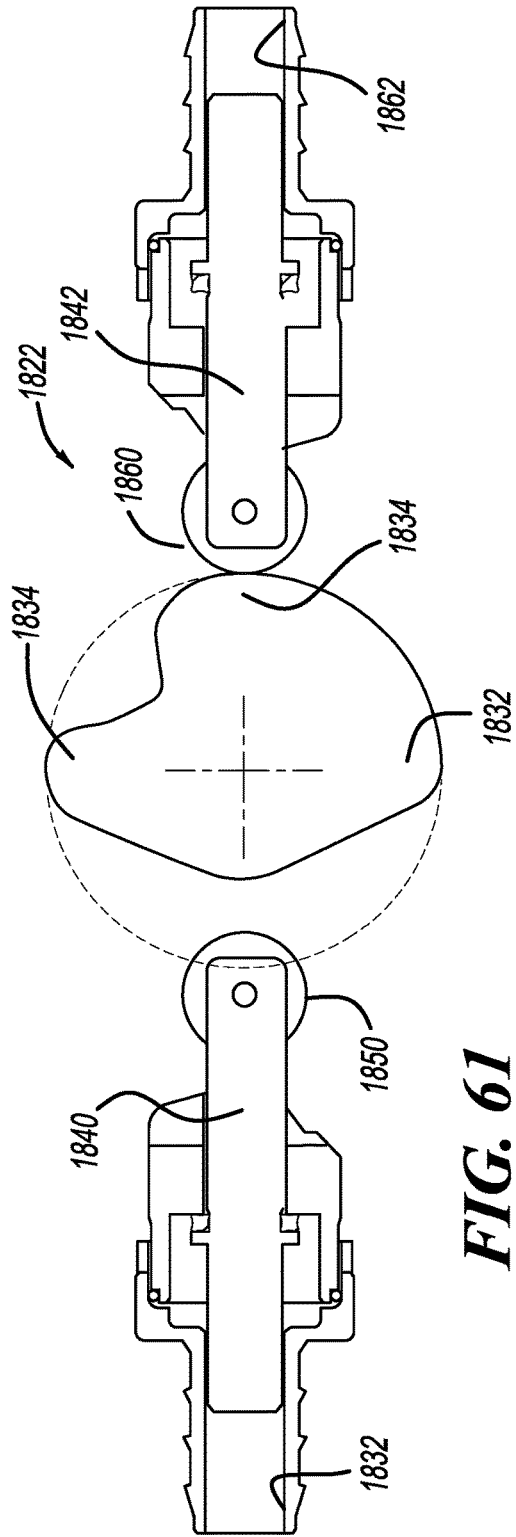
FIG. 61 is a sectional view of the vent shut-off assembly of FIG. 58 and shown with the first poppet valve closed and the second poppet valve open.

With reference now to FIGS. 58-61, a vent shut-off assembly 1822 constructed in accordance to additional features of the present disclosure will be described. The vent shut-off assembly 1822 can be used with any of the actuator assemblies described herein for actuating two vent points (such as a front tank vent and a rear tank vent) with a single cam. The vent shut-off assembly 1822 generally includes a cam 1830 having a first cam lobe 1832 and a second cam lobe 1834. Rotation of the cam 1830 causes selective actuation of a first vent poppet valve 1840 and a second vent poppet valve 1842. In one example, the first vent poppet valve 1840 has a first roller 1850 disposed at a distal end for engaging the cam 1830. The first vent poppet valve 1840 actuates to open and close a first port 1852. The second vent poppet valve 1842 has a second roller 1860 disposed at a distal end for engaging the cam 1830. The second vent poppet valve 1842 actuates to open and close a second port 1862. A first venting state is shown in FIG. 58 where the first and second vent poppet valves 1840 and 1842 are closed. A second venting state is shown in FIG. 59 where first poppet valve 1840 is open and the second poppet valve 1842 is closed. A third venting state is shown in FIG. 60 where the first and second poppet valves 1840 and 1842 are open. A fourth venting state is shown in FIG. 61 where the first poppet valve 1840 is closed and the second poppet valve 1842 is open.

Figure 62:
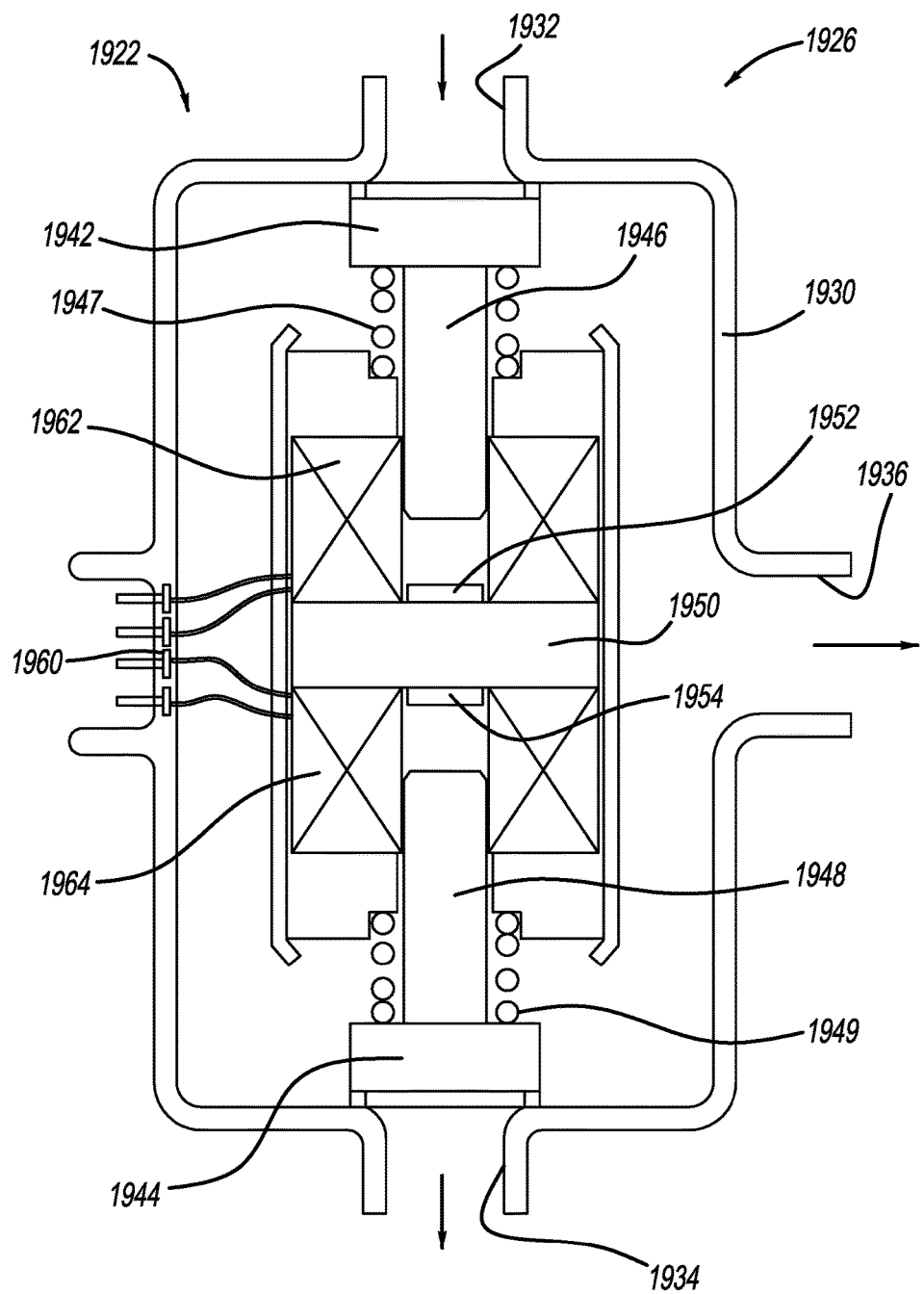
FIG. 62 is a sectional view of a vent shut-off assembly constructed in accordance to another example of the present disclosure.

Turning now to FIG. 62, a vent shut-off assembly 1922 constructed in accordance to another example of the present disclosure will be described. The vent shut-off assembly 1922 can be used with any of the actuator assemblies described herein for opening and closing various vent ports. In the example shown, the vent shut-off assembly 1922 includes a three port, four position latching fuel vapor solenoid valve 1926. The solenoid valve 1926 generally includes a valve body 1930 that defines a first port 1932, a second port 1934 and a third port 1936. A first seal assembly 1942 selectively opens and closes the first port 1932. A second seal assembly 1944 selectively opens and closes the second port 1934. A first armature 1946 extends from the first seal assembly 1942. A first biasing member 1947 biases the first seal assembly 1942 to a closed position. A second armature 1948 extends from the second seal assembly 1944. A second biasing member 1949 biases the second seal assembly 1944 to a closed position.

A pole piece 1950 can be centrally arranged in the solenoid valve 1926. A first and second permanent magnet 1952 and 1954 are disposed on opposite sides of the pole piece 1950. An electrical connector 1960 is electrically coupled to a first encapsulated coil 1962 and a second encapsulated coil 1964. The solenoid valve 1926 can have an electrical termination or connector that plugs into a valve body electrical breakout connector instead of using a pig tail connection. A seal assembly can be assembled to an armature using a variety of retention methods such as, but not limited to over-mold configurations and snap-fit arrangements. The permanent magnets 1952 and 1954 can be overmolded into the first and second coils 1962 and 1964 or assembled into small detents on the pole piece 1950. The first and/or second coils 1962 and 1964 can be energized to move the first and/or second seal assemblies 1942 and 1944 thereby opening or closing the first and second ports 1932, 1934.

Figure 63:
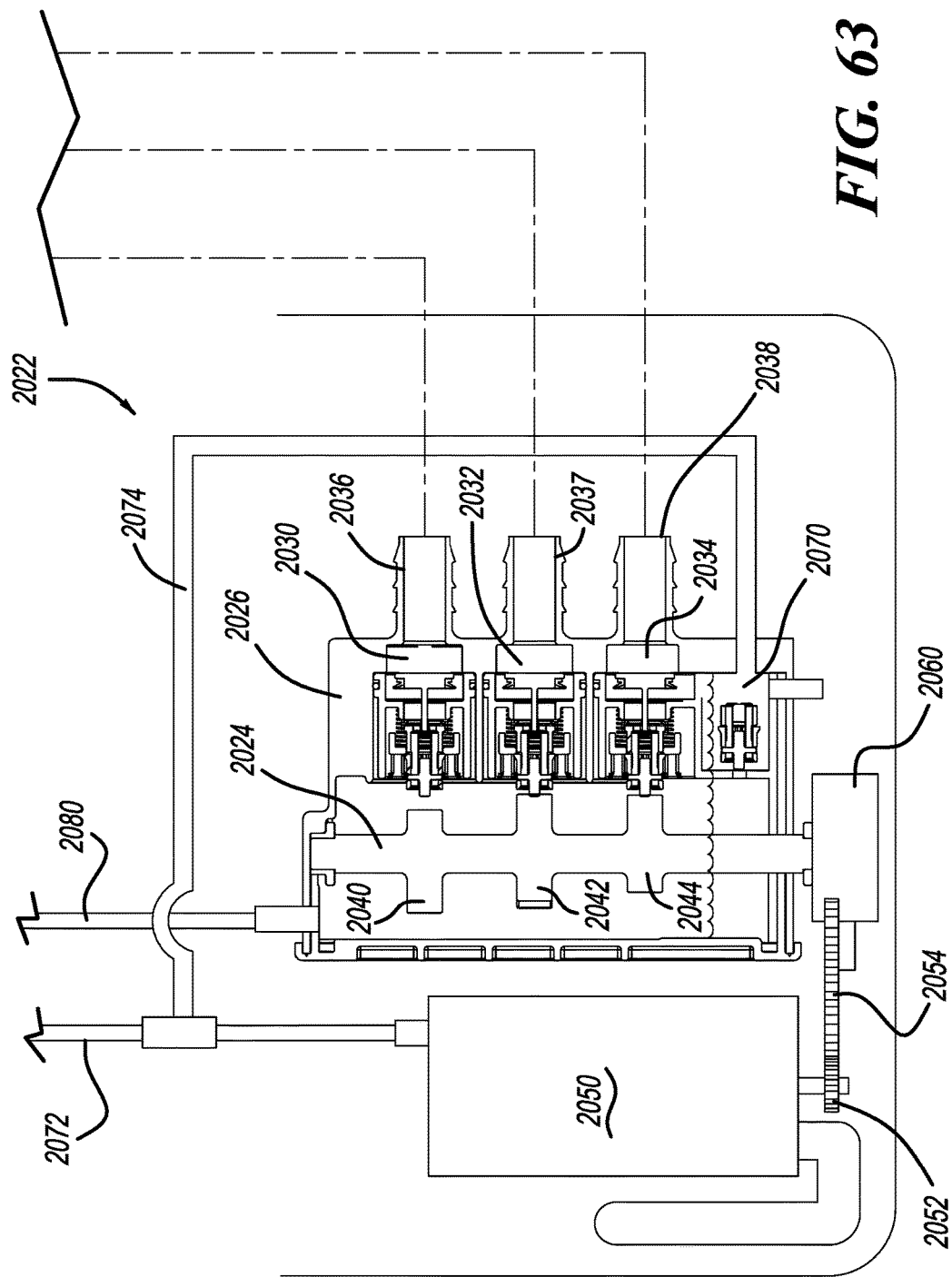
FIG. 63 is a partial sectional view of a vent shut-off assembly constructed in accordance to another example of the present disclosure.

Turning now to FIG. 63, a vent shut-off assembly 2022 constructed in accordance to another example of the present disclosure will be described. The vent shut-off assembly 2022 generally includes a vent box cam 2024 rotatably disposed in a vent box 2026 and that actuates respective first, second and third valves 2030, 2032 and 2034. The first valve 2030 opens and closes a first vapor port 2036. The second valve 2032 opens and closes a second vapor port 2037. The third valve 2034 opens and closes a third vapor port 2038. The first, second and third vapor ports 2036, 2037 and 2038 can be routed to various locations on the fuel tank as disclosed herein. The vent box cam 2024 includes a first cam 2040 that actuates the first valve 2030, a second cam 2042 that actuates the second valve 2032 and a third cam 2044 that actuates the third valve 2034.

The vent box cam 2024 is driven by a fuel pump 2050. Specifically, the fuel pump 2050 drives a first gear 2052 that drives a reduction gear 2054 that in turn drives a clutch mechanism 2060 that rotates the vent box cam 2024. An active drain liquid trap 2070 can be fluidly connected to a fuel feed line 2072 by a connection tube 2074. A vapor vent line 2080 is fluidly connected to the canister (see canister 1032, FIG. 27). A fuel pick up sock 2084 is arranged adjacent to the fuel pump 2050.

Figure 64:
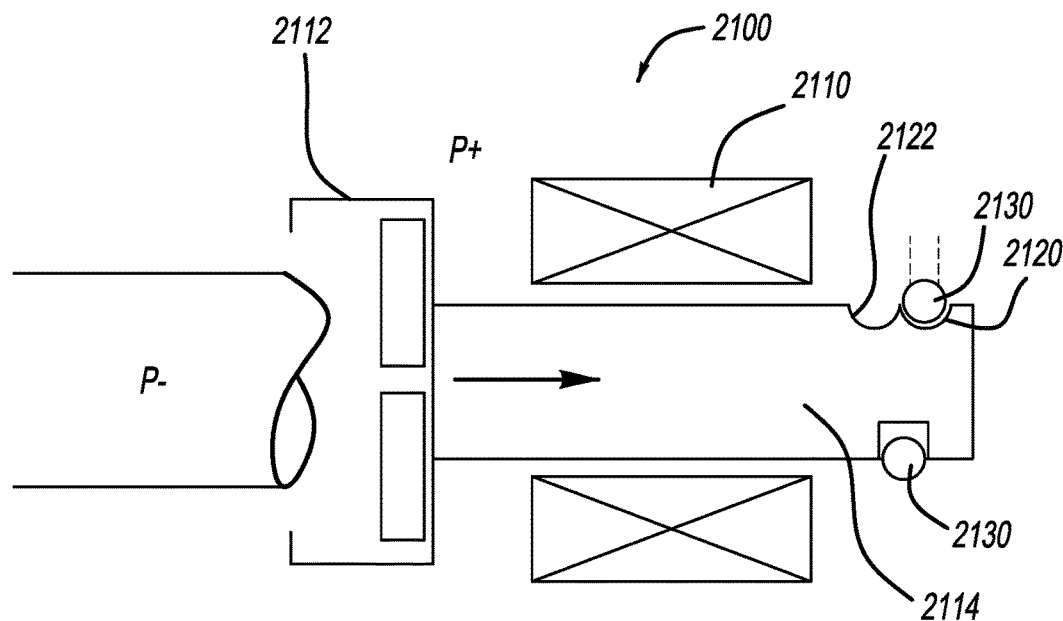
FIG. 64 is a partial sectional view of a valve arrangement configured for use with two-stage actuation, the valve arrangement shown in a first position.
Figure 65:
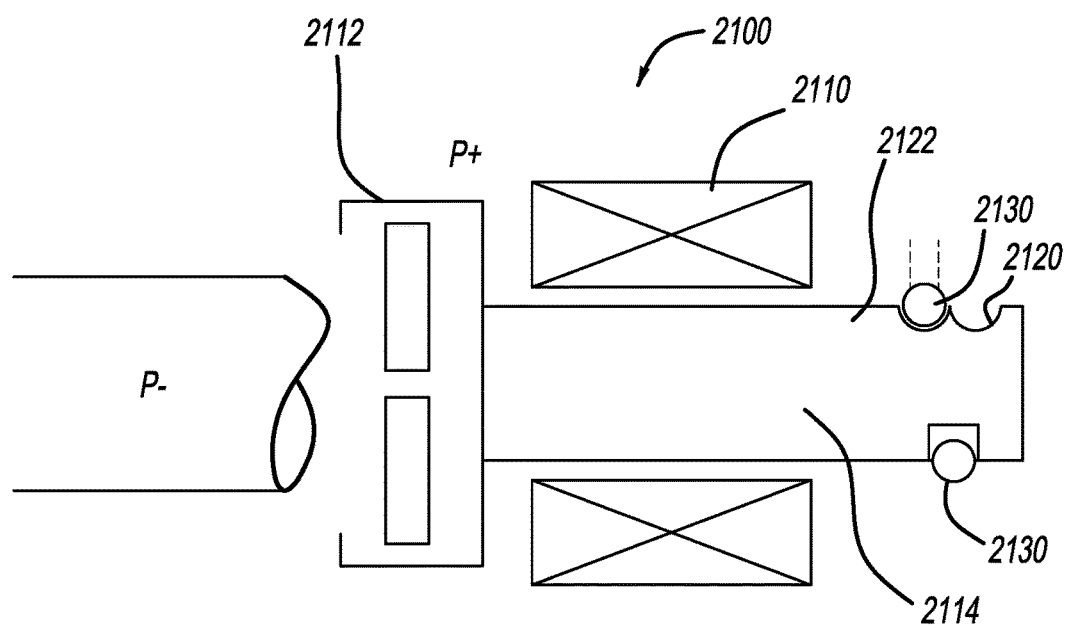
FIG. 65 is a partial sectional view of the valve arrangement of FIG. 64 and shown in a second position.

FIGS. 64 and 65 illustrate a valve arrangement 2100 that can be used in any of the valves disclosed herein. The valve arrangement 2100 is two-staged such that a smaller orifice is first opened to relieve pressure and then less force is required to subsequently open a larger orifice. The valve arrangement 2100 includes a coil 2110 and armature 2112. A shaft 2114 has a first groove 2120 and a second groove 2122. A locating member 2130 locates first into the first groove 2120 and subsequently into the second groove 2122 for sequential, staged opening of the valve.

Figure 66:
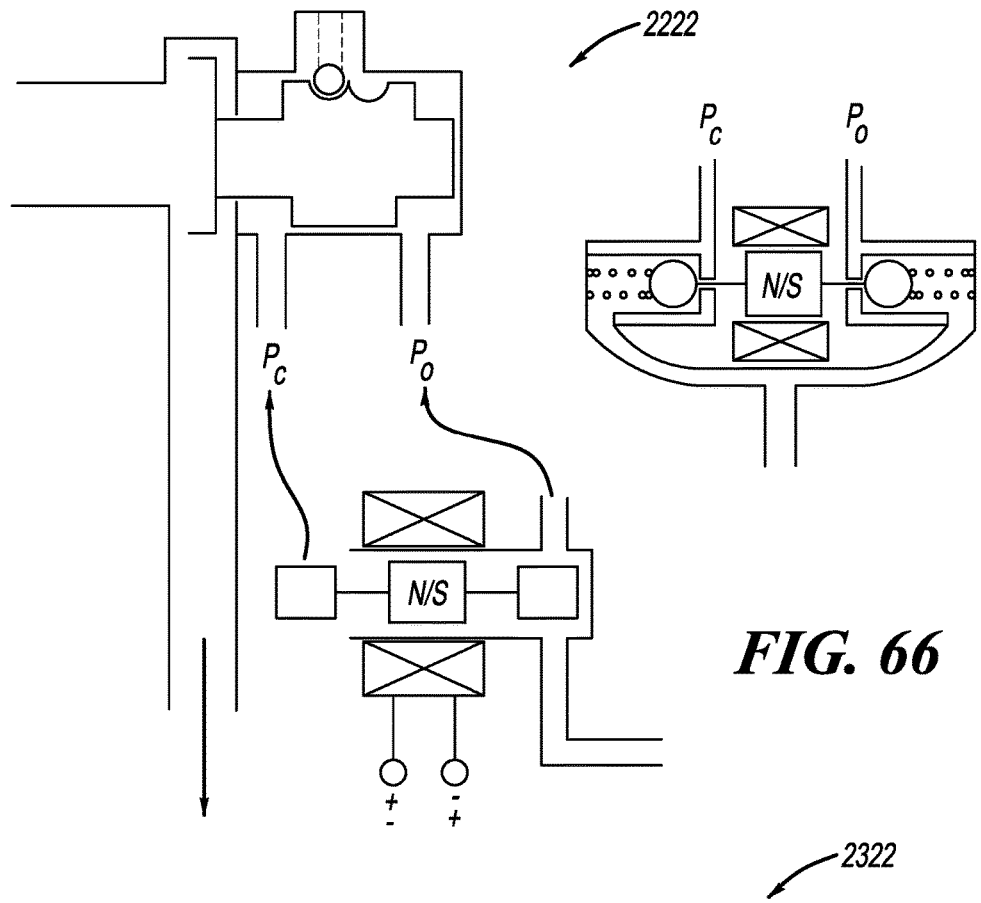
FIG. 66 is a schematic illustration of a vent shut-off assembly constructed in accordance to additional features of the present disclosure.
Figure 67:
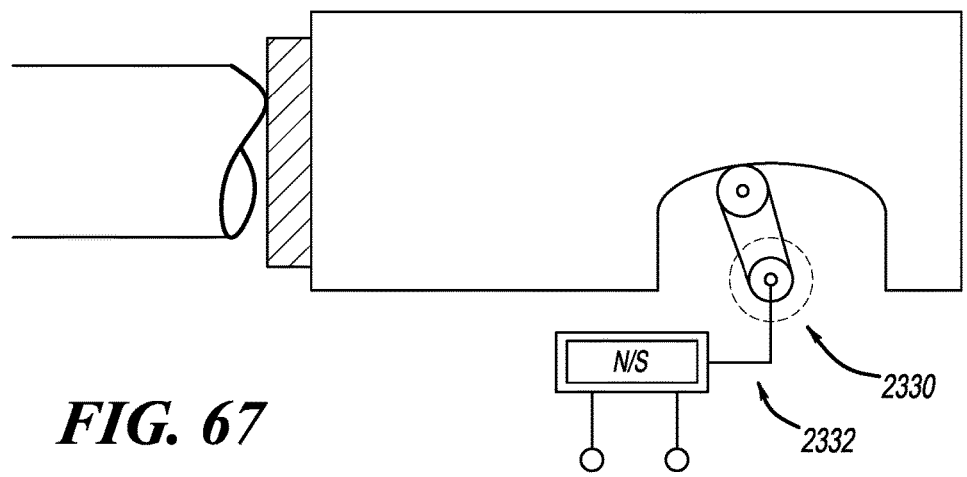
FIG. 67 is a schematic illustration of a vent shut-off assembly constructed in accordance to additional features of the present disclosure.

FIG. 66 illustrates a vent shut-off assembly 2222 constructed in accordance to additional features of the present disclosure. The vent shut-off assembly 2222 can be used in conjunction with any of the systems described herein. The vent shut-off assembly 2222 uses hydraulic force to drive the vent lines open and closed. FIG. 67 illustrates a vent shut-off assembly 2322. The vent shut-off assembly 2322 can be used in conjunction with any of the systems described herein. The vent shut-off assembly 2322 includes a motor 2330 that sends a switch 2332 back and forth to shuttle the vent points open and closed.

Figure 68:
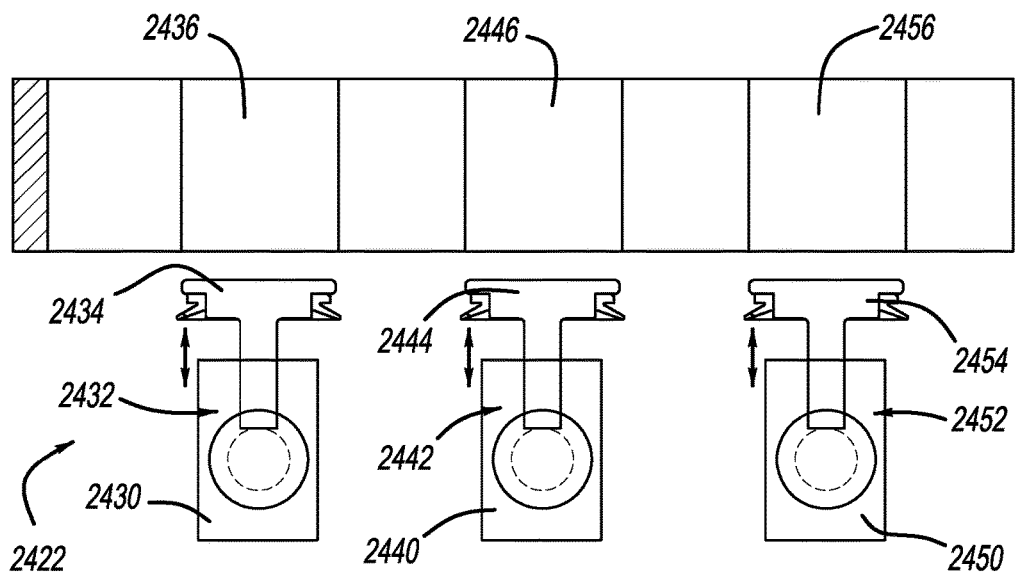
FIG. 68 is a schematic illustration of a vent shut-off assembly constructed in accordance to additional features of the present disclosure and shown having valves in an open position.
Figure 69:
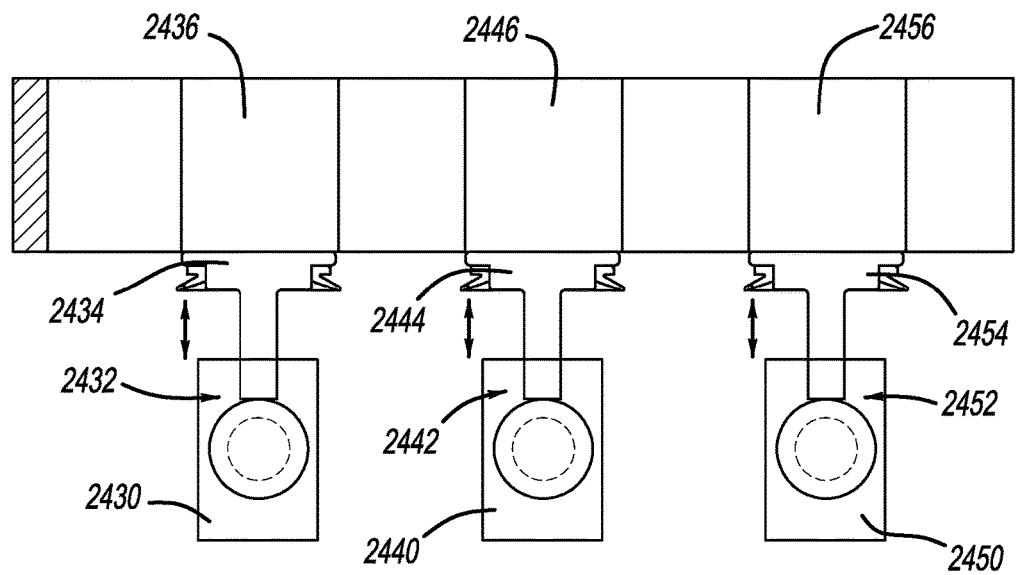
FIG. 69 is a schematic illustration of the vent shut-off assembly of FIG. 68 and shown with the valves in a closed position.
Figure 70:
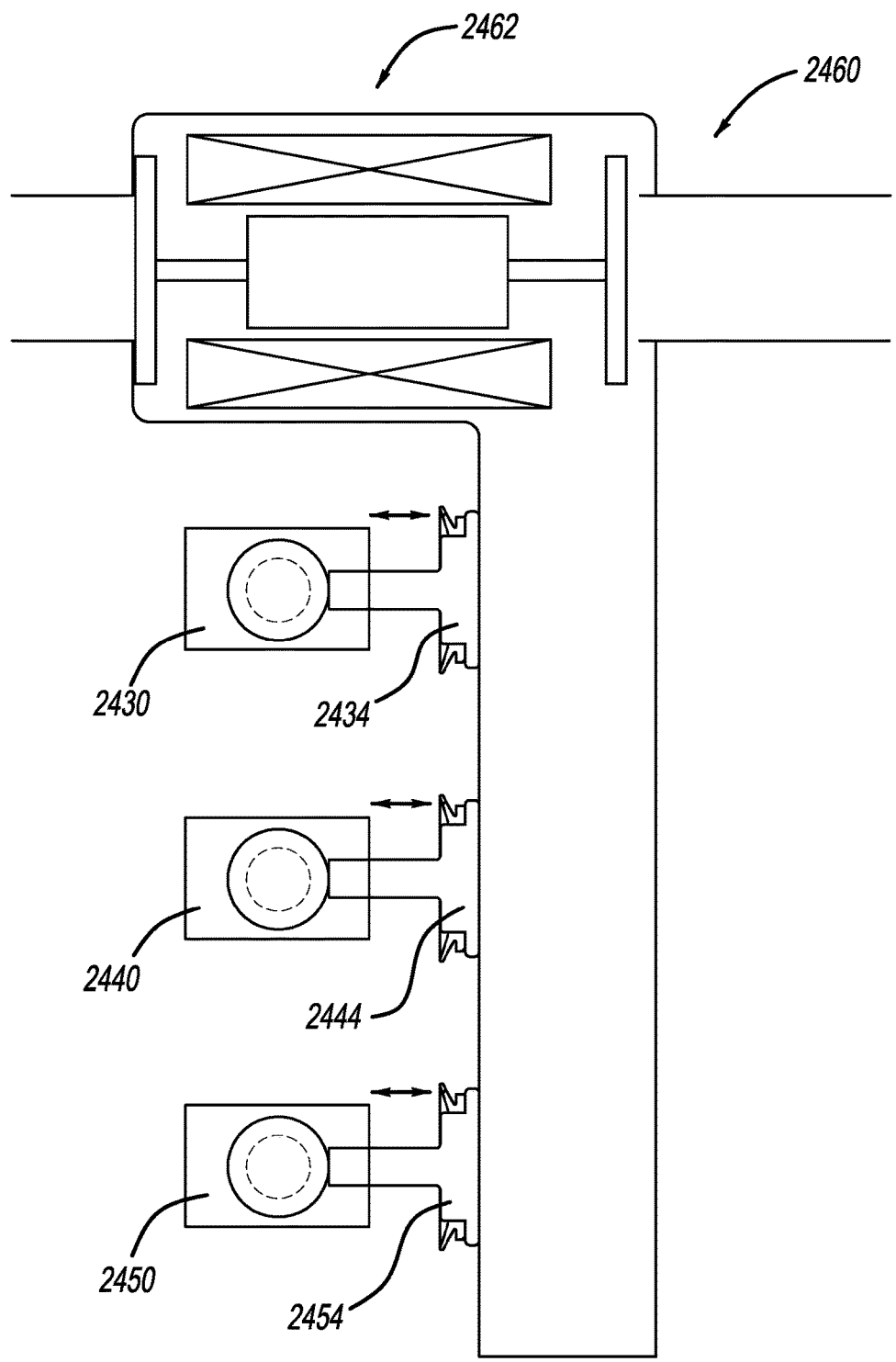
FIG. 70 is a schematic illustration of a vent shut-off assembly constructed in accordance to additional features of the present disclosure.

FIGS. 68-70 illustrate a vent shut-off assembly 2422 constructed in accordance to other features of the present disclosure. The vent shut-off assembly 2422 can be used in conjunction with any of the systems described herein. The vent shut-off assembly 2422 includes a first motor 2430 having a first linear screw drive 2432 that opens (FIG. 68) and closes (FIG. 69) a first vent 2434 associated with a first port 2436. A second motor 2440 has a second linear screw drive 2442 that opens (FIG. 68) and closes (FIG. 69) a second vent 2444 associated with a second port 2446. A third motor 2450 has a third linear screw drive 2452 that opens (FIG. 68) and closes (FIG. 69) a third valve 2454 associated with a third port 2456. FIG. 70 shows a manifold 2460 that can be associated with the vent shut-off assembly 2422. A solenoid 2462 can further open and close vent pathways in the manifold 2460.

Figure 71:
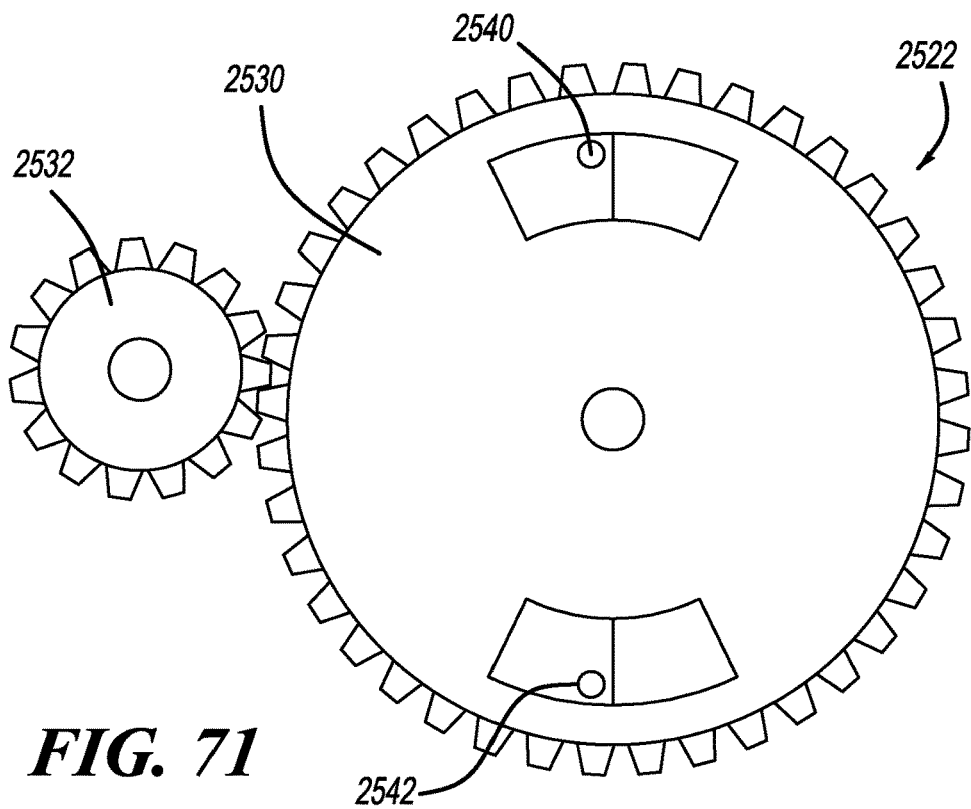
FIG. 71 is a schematic illustration of a vent shut-off assembly constructed in accordance to additional features of the present disclosure and shown with a central disc in a first position.
Figure 72:
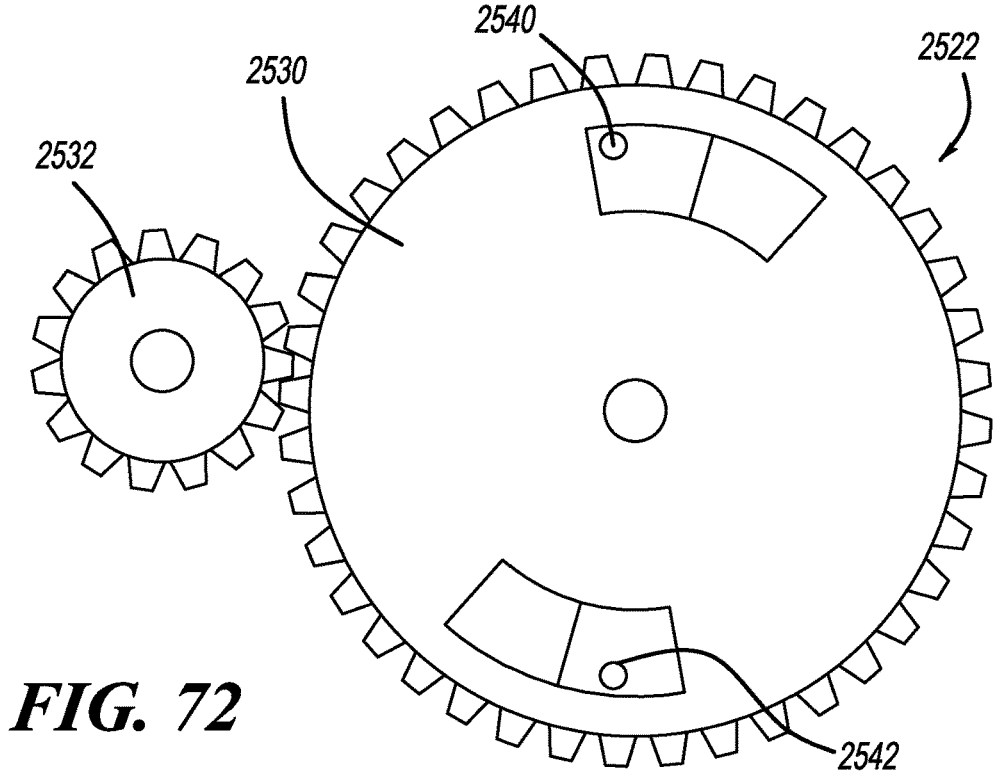
FIG. 72 is a schematic illustration of the vent shut-off assembly of FIG. 71 and shown with the central disc in a second position.

FIGS. 71 and 72 illustrate a vent shut-off assembly 2522 constructed in accordance to additional features of the present disclosure. The vent shut-off assembly 2522 can be used in conjunction with any of the systems described herein. The vent shut-off assembly 2522 can includes a central disc 2530 that is rotated by a motor 2532. Push pins 2540 and 2542 are actuated open and closed as the central disc 2530 is rotated. The actuation can also be done linearly.

Figure 73:
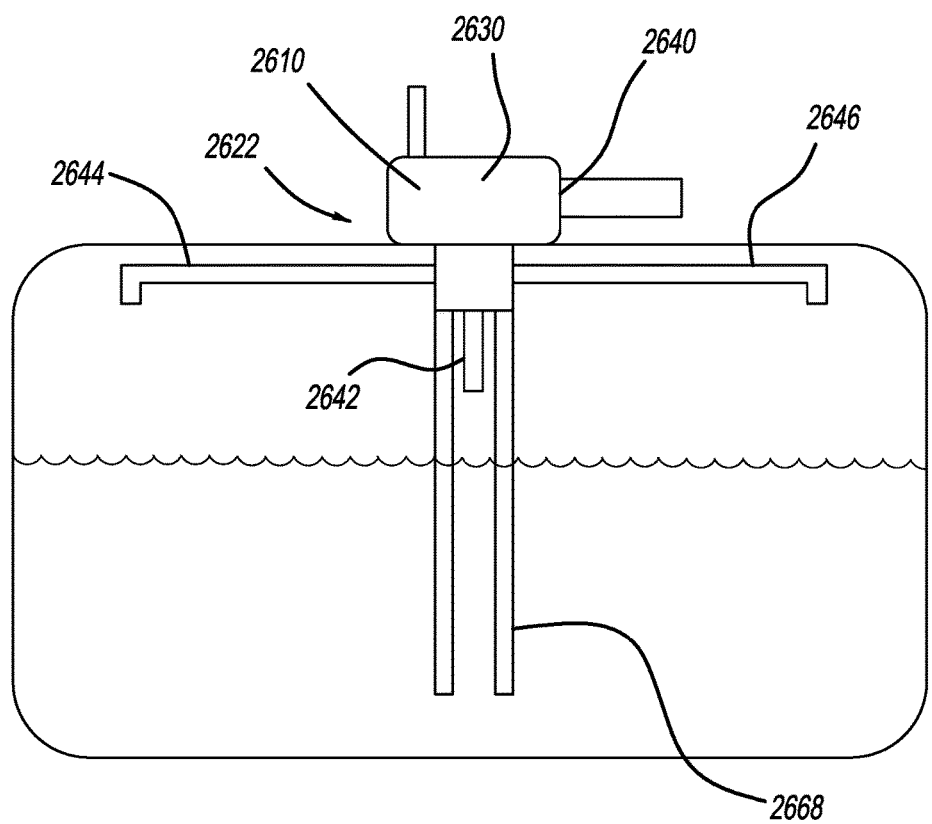
FIG. 73 is a schematic illustration of a valve control assembly constructed in accordance to one example of the present disclosure.
Figure 75:
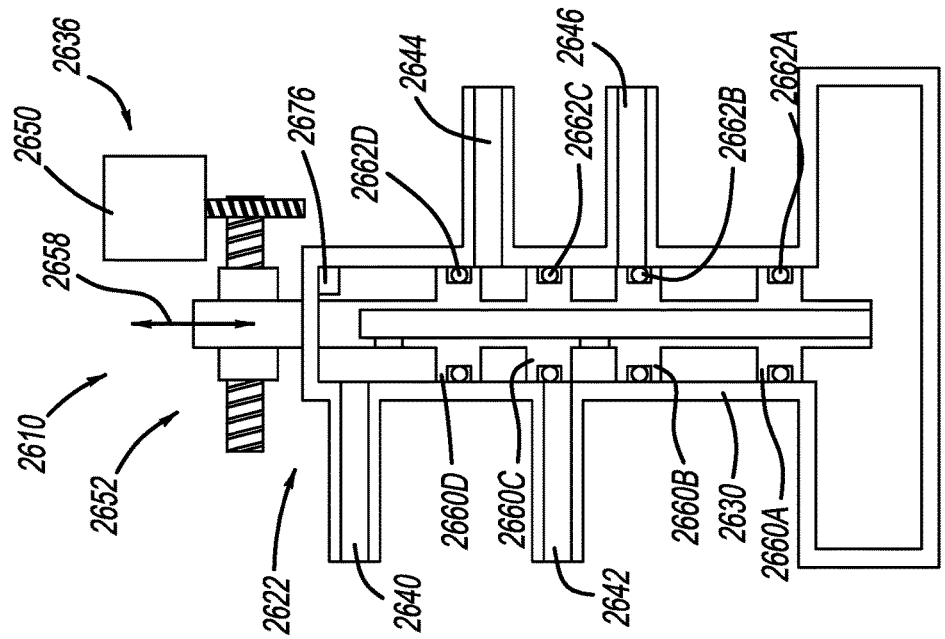
FIG. 75 is a sectional view of the valve shuttle and main housing of FIG. 74 and shown with the valve shuttle in a second position.
Figure 74:
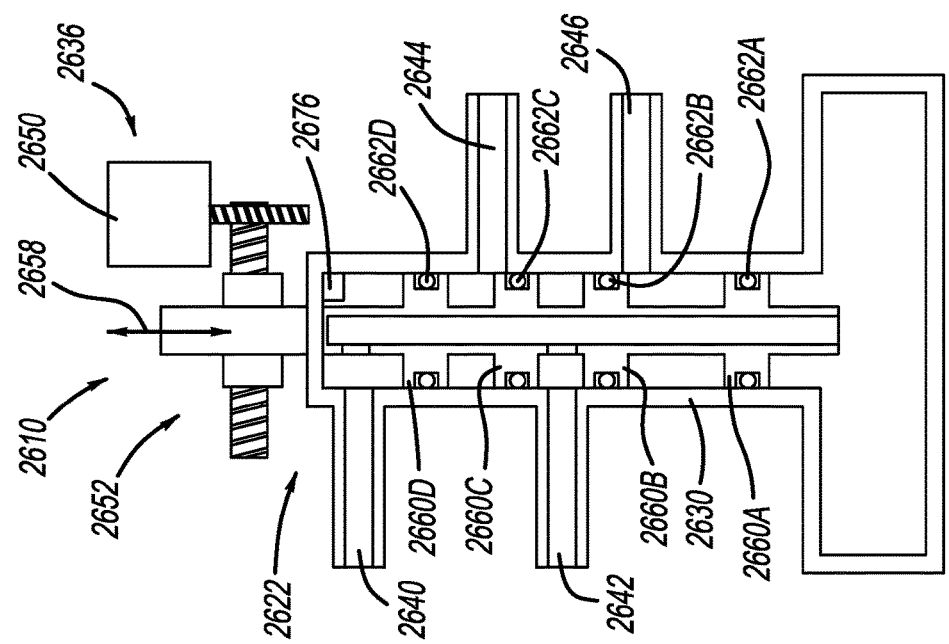
FIG. 74 is a sectional view of a valve shuttle and main housing shown with the valve shuttle in a first position.

With reference now to FIGS. 73-75, a valve control assembly constructed in accordance to yet another example of the present disclosure is shown and generally identified at reference 2610. The valve control assembly 2610 includes a vent shut-off assembly 2622. The vent shut-off assembly 2622 can be used as part of an evaporative emissions control system in a fuel tank system. The vent shut-off assembly 2622 includes a main housing 2630, a valve shuttle 2632 that translates within the main housing 2630, and an actuator assembly 2636. The main housing 2630 can have a first vent port 2640 that is fluidly connected to the canister 1032, a second port 2642 that is fluidly connected to an FLVV, a third port 2644 that is fluidly connected to a first grade vent valve (GVV) and a fourth port 2646 that is fluidly connected to a second grade vent valve (GVV).

The actuator assembly 2636 can include a motor 2650, such as a DC motor that actuates a ball screw mechanism 2652. Actuation of the ball screw mechanism 2652 translates the valve shuttle 2632 in the direction of arrows 2658. In the example shown, the valve shuttle 2632 includes radially extending collars 2660A, 2660B, 2660C and 2660D that receive respective seal members or O-rings 2662A, 2662B, 2662C and 2662D therearound. A capacitor level sensor 2668 is shown in FIG. 46 that senses fuel level.

During driving mode, a first grade vent valve and FLVV can be partially opened in a saddle tank arrangement. During refueling mode, only the FLVV will be opened. The actuator assembly 2636 including ball screw mechanism 2652 can cooperate with a position sensor 2676 to provide precise linear movement response of the valve shuttle 2632. The capacitor 2668 level sensor can be a two capacitor level sensor that is fitted to measure level an also to evaluate pitch and roll angle. Based on fuel level and angle (roll/pitch) sensing, the electronic control unit will give signal to the actuator assembly 2636 to open one of the ports 2640, 2642, 2644 and 2646 through directional control valves. During electric mode on a hybrid vehicle, all ports 2640, 2642, 2644 and 2646 are closed. A liquid trap can be included to trap the fuel which can be drained back through a directional control valve opening.

Figure 76:
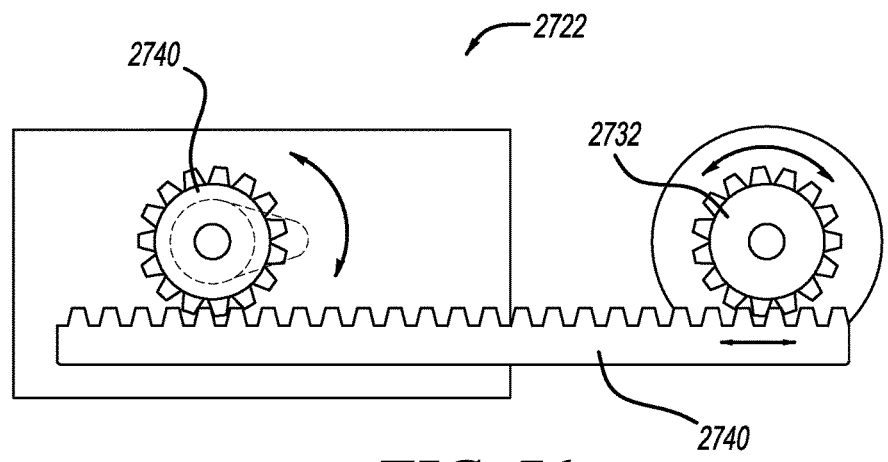
FIG. 76 is a sectional view of a vent shut-off assembly constructed in accordance to another example of the present disclosure and shown with a rack and driven gear in a first position.
Figure 77:
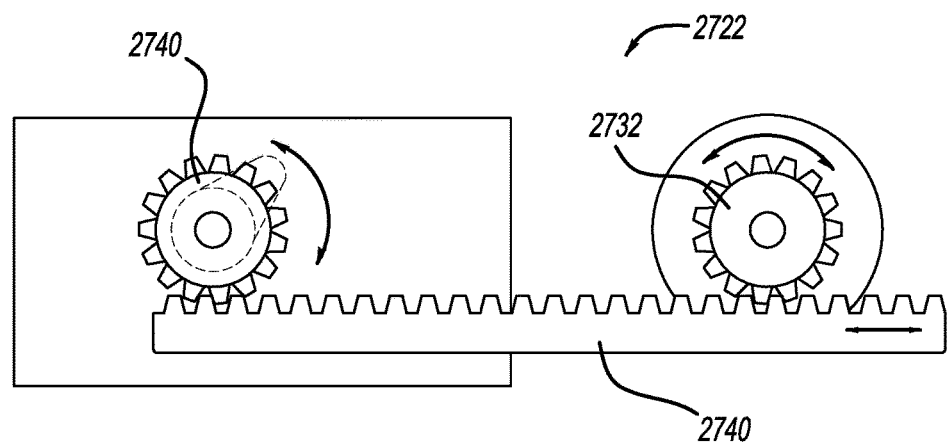
FIG. 77 is a sectional view of the vent shut-off assembly of FIG. 76 and shown with the rack and driven gear in a second position.

FIGS. 76 and 77 illustrate a vent shut-off assembly 2722 constructed in accordance to additional features of the present disclosure. The vent shut-off assembly 2722 can be used in conjunction with any of the systems described herein. In particular, the vent shut-off assembly 2722 may be used in place of the valve actuation assembly 1110 described above with respect to FIG. 32. In this regard, instead of a central rotating camshaft, the vent shut-off assembly 2722 includes a rack and pinion assembly 2730 having a drive gear 2732 driven by a motor 2734 and a driven gear 2740. A rack 2740 is meshingly engaged to both of the drive gear 2732 and the driven gear 2740. Rotation of the drive gear 2732 causes translation of the rack 2740 and consequently rotation of the driven gear 2740. The driven gear 2740 can rotate a single cam or a collection of cams such as described above with respect to FIG. 32.

Figure 78:
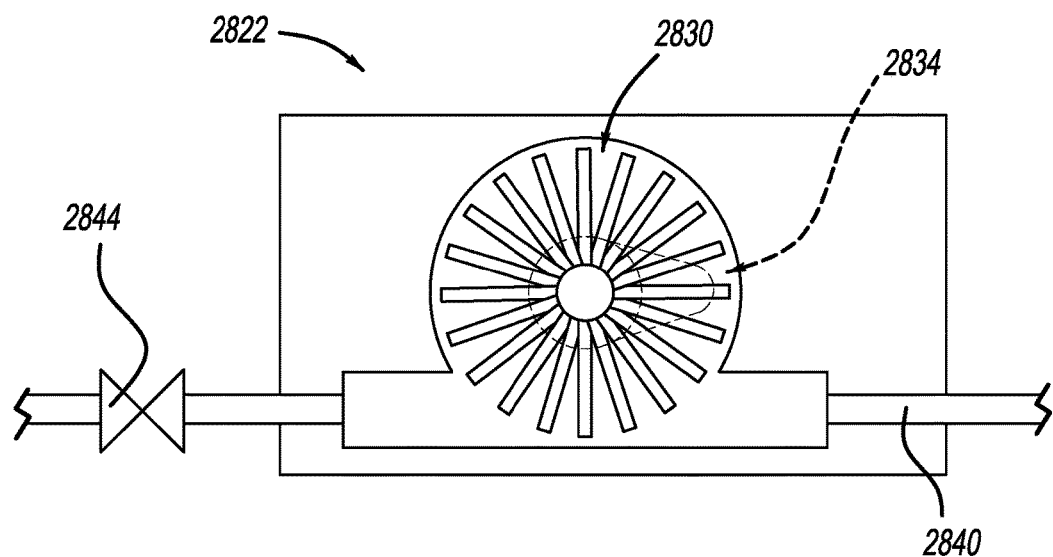
FIG. 78 is a schematic illustration of a hydraulically driven vent shut-off assembly constructed in accordance to another example of the present disclosure and shown with a cam assembly in a first position.
Figure 79:
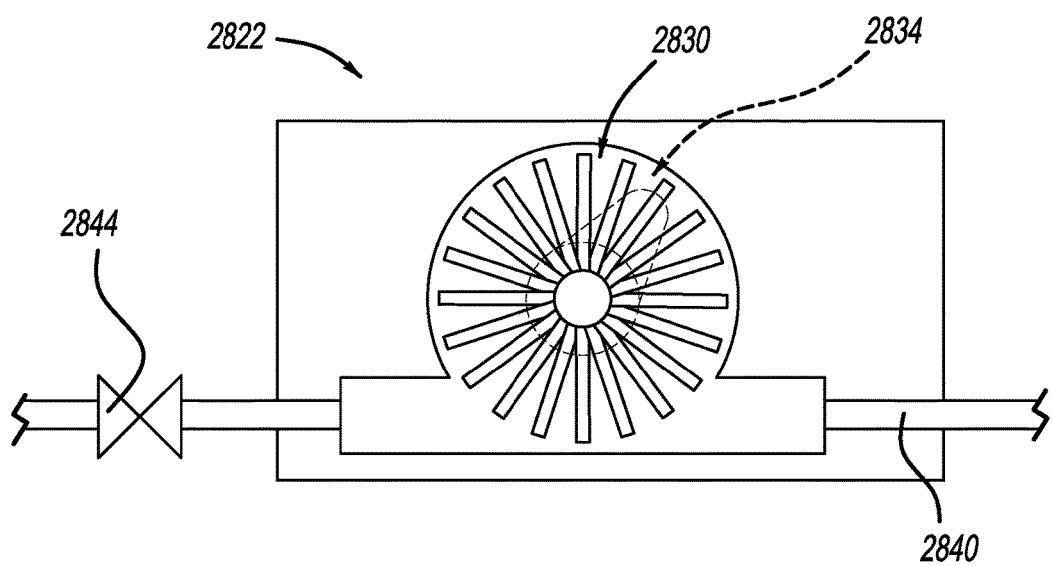
FIG. 79 is a schematic illustration of the vent shut-off assembly of FIG. 78 and shown with the cam assembly in a second position.

FIGS. 78 and 79 illustrate a vent shut-off assembly 2822 constructed in accordance to another example of the present disclosure. The vent shut-off assembly 2822 can be used in conjunction with any of the systems described herein. The vent shut-off assembly 2822 can be pneumatically driven. In this regard, a motor 2830 can drive a cam assembly 2834, such as described in any of the above configurations. An air or vacuum source 2840 can drive the cam assembly 2834. A control valve 2844 can be fluidly connected to the vacuum source 2840. A braking mechanism and/or a position sensing mechanism can further be included.

Figure 80:
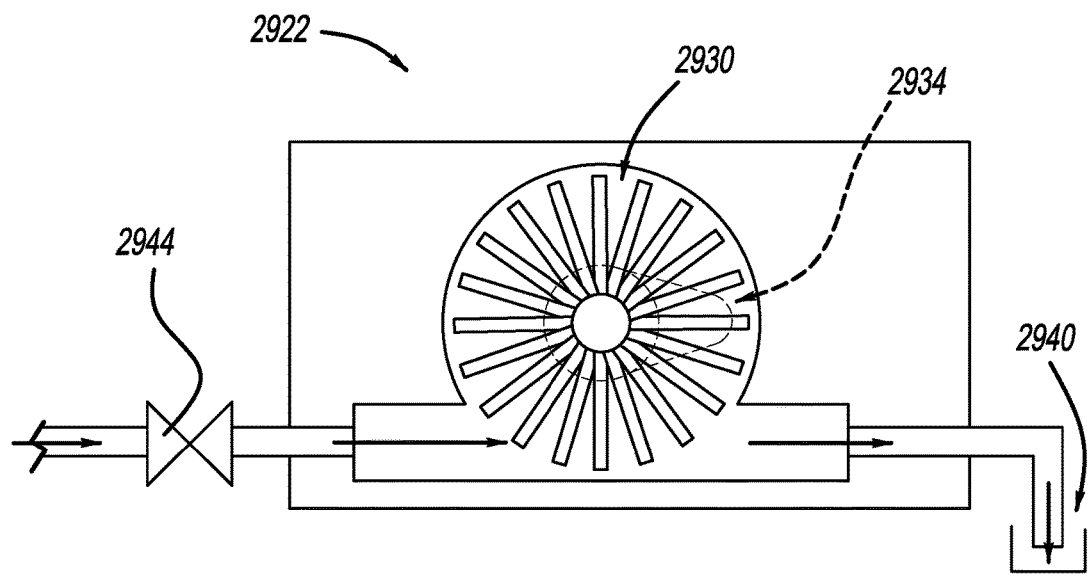
FIG. 80 is a schematic illustration of a pneumatically driven vent shut-off assembly constructed in accordance to another example of the present disclosure and shown with a cam assembly in a first position.
Figure 81:
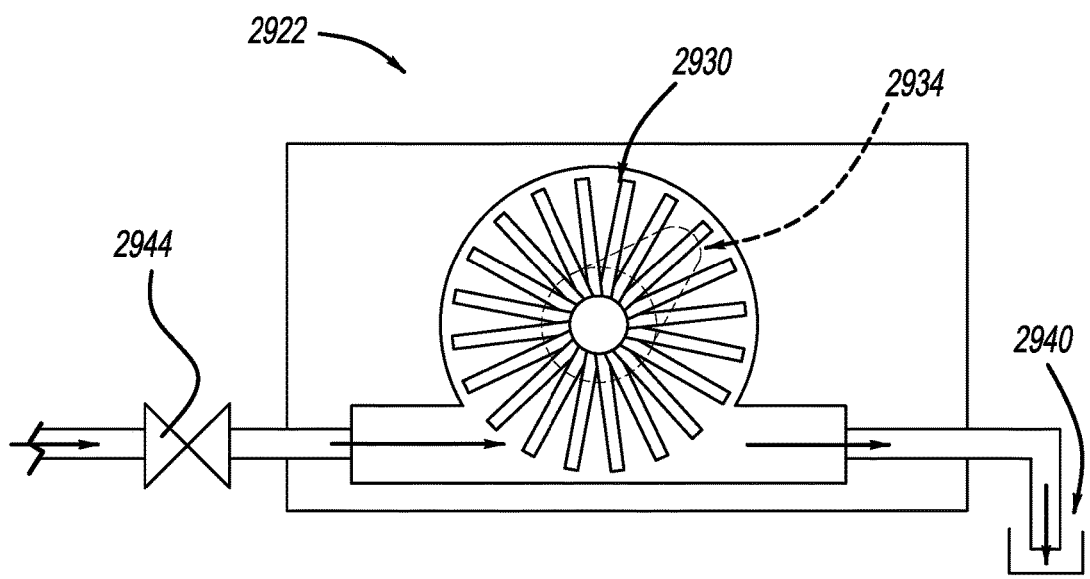
FIG. 81 is a schematic illustration of the vent shut-off assembly of FIG. 80 and shown with the cam assembly in a second position.

FIGS. 80 and 81 illustrate a vent shut-off assembly 2922 constructed in accordance to another example of the present disclosure. The vent shut-off assembly 2922 can be used in conjunction with any of the systems described herein. The vent shut-off assembly 2922 can be hydraulically driven. In this regard, a motor 2930 can drive a cam assembly 2934, such as described in any of the above configurations. A hydraulic source 2940 can drive the cam assembly 2934. A control valve 2944 can be fluidly connected to the hydraulic source 2940. A braking mechanism and/or a position sensing mechanism can further be included.

Figure 82:
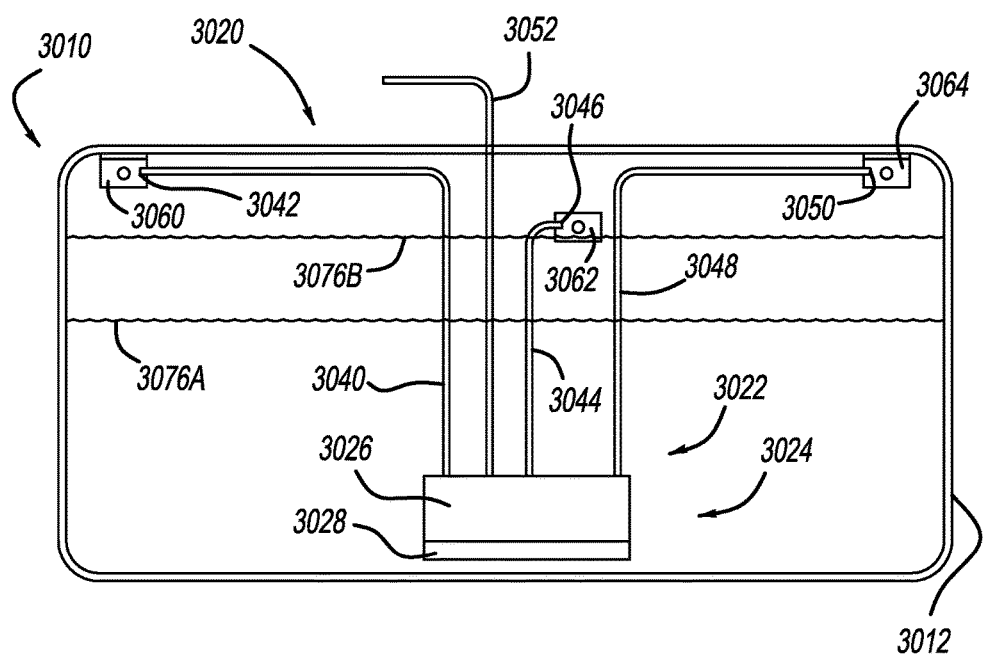
FIG. 82 is a schematic illustration of a fuel tank system constructed in accordance to additional features of the present disclosure and incorporating a refueling baffle.
Figure 83:
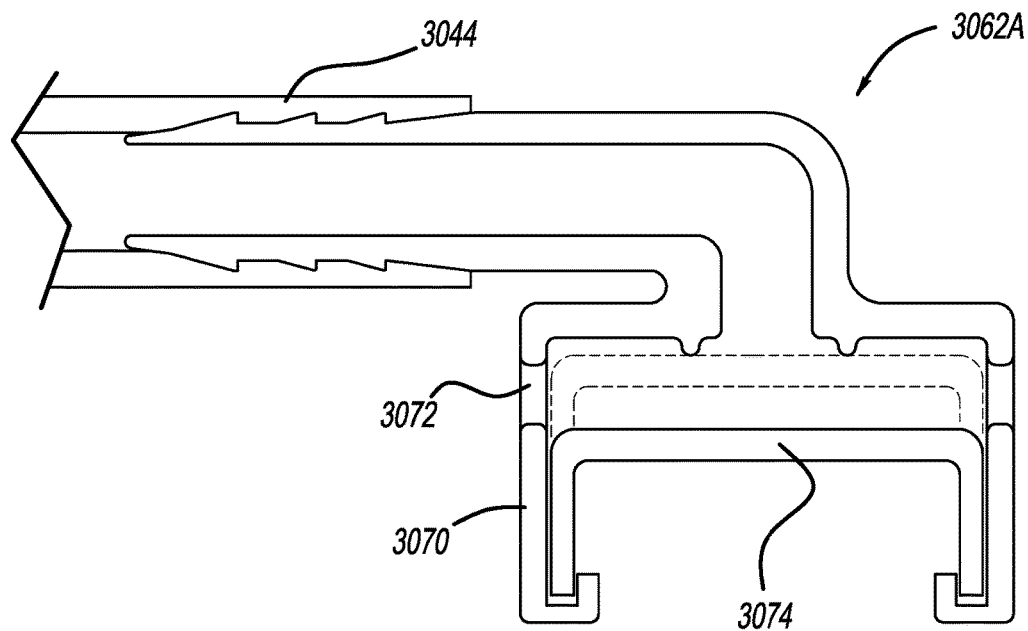
FIG. 83 is a sectional view of a refueling baffle constructed in accordance to one example of the present disclosure and shown with a cut in a first open position (solid line) and a second closed position (phantom line)
Figure 84:
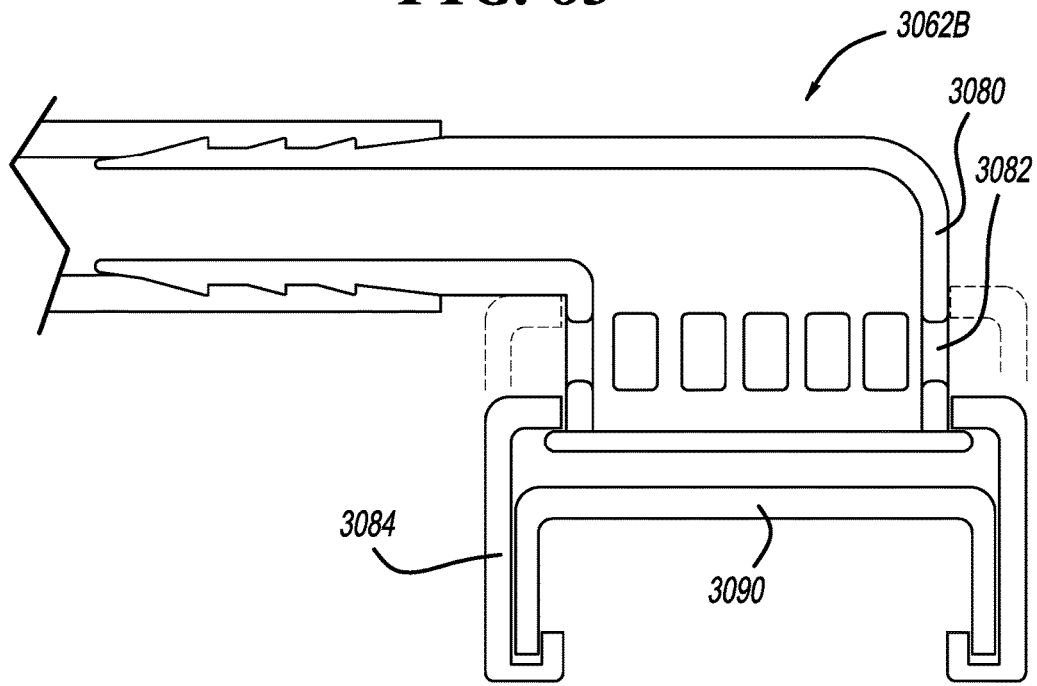
FIG. 84 is a sectional view of a refueling baffle constructed in accordance to another example of the present disclosure and shown with a cut in a first open position (solid line) and a second closed position (phantom line)
Figure 85A:
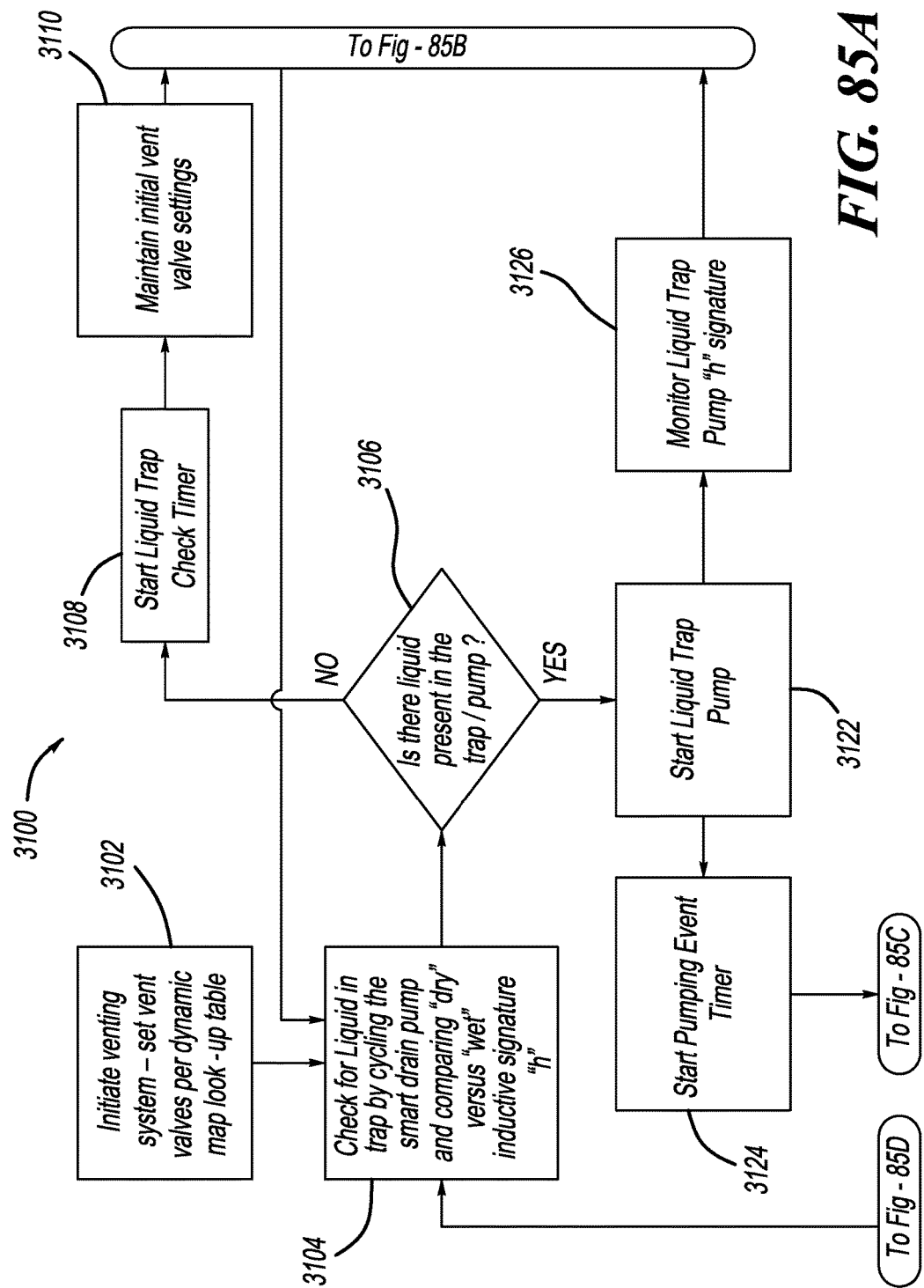
FIGS. 85A-85D illustrate an exemplary method of controlling a fuel tank system according to one example of the present disclosure.
Figure 85B:
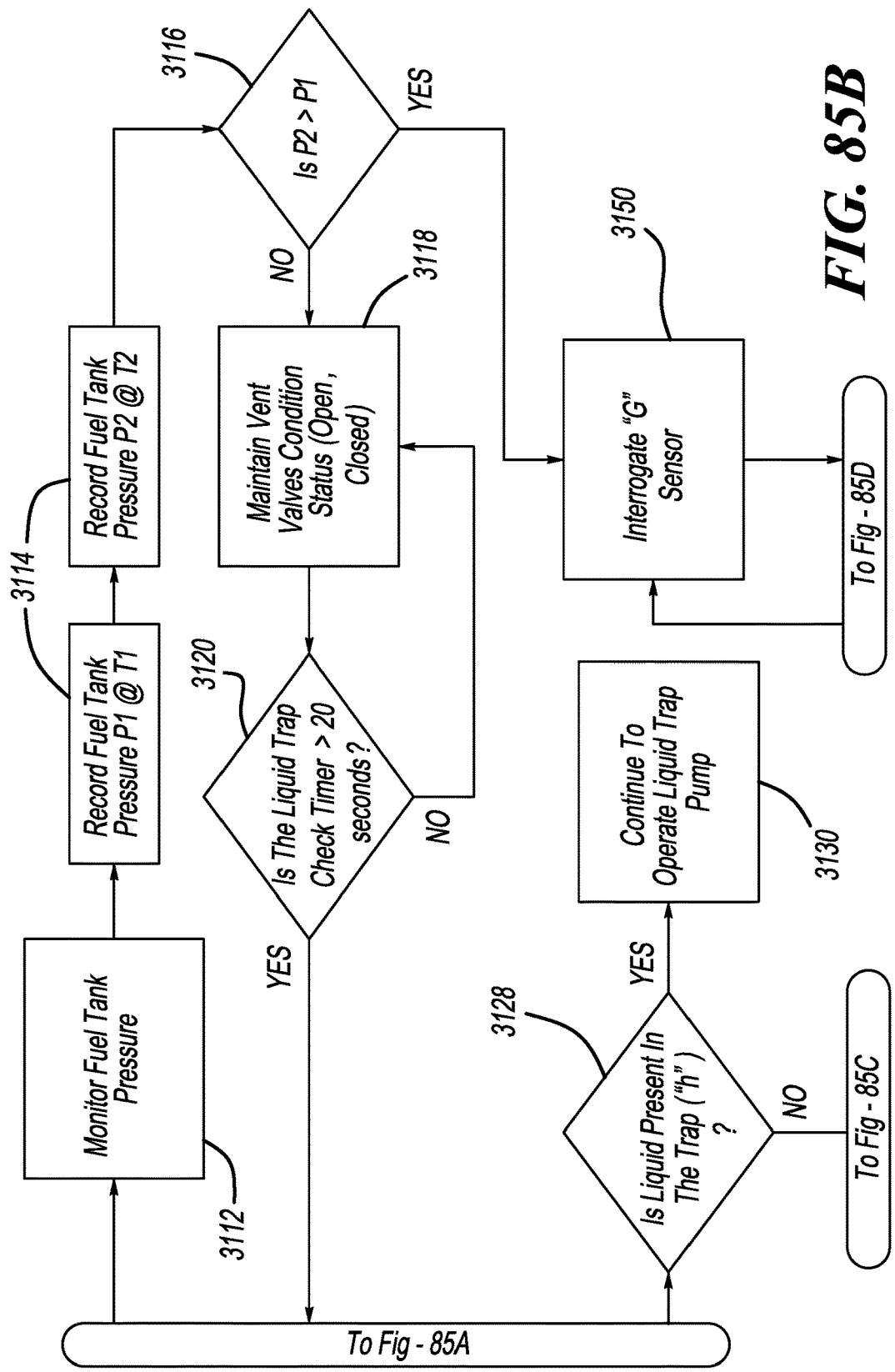
Figure 85C:
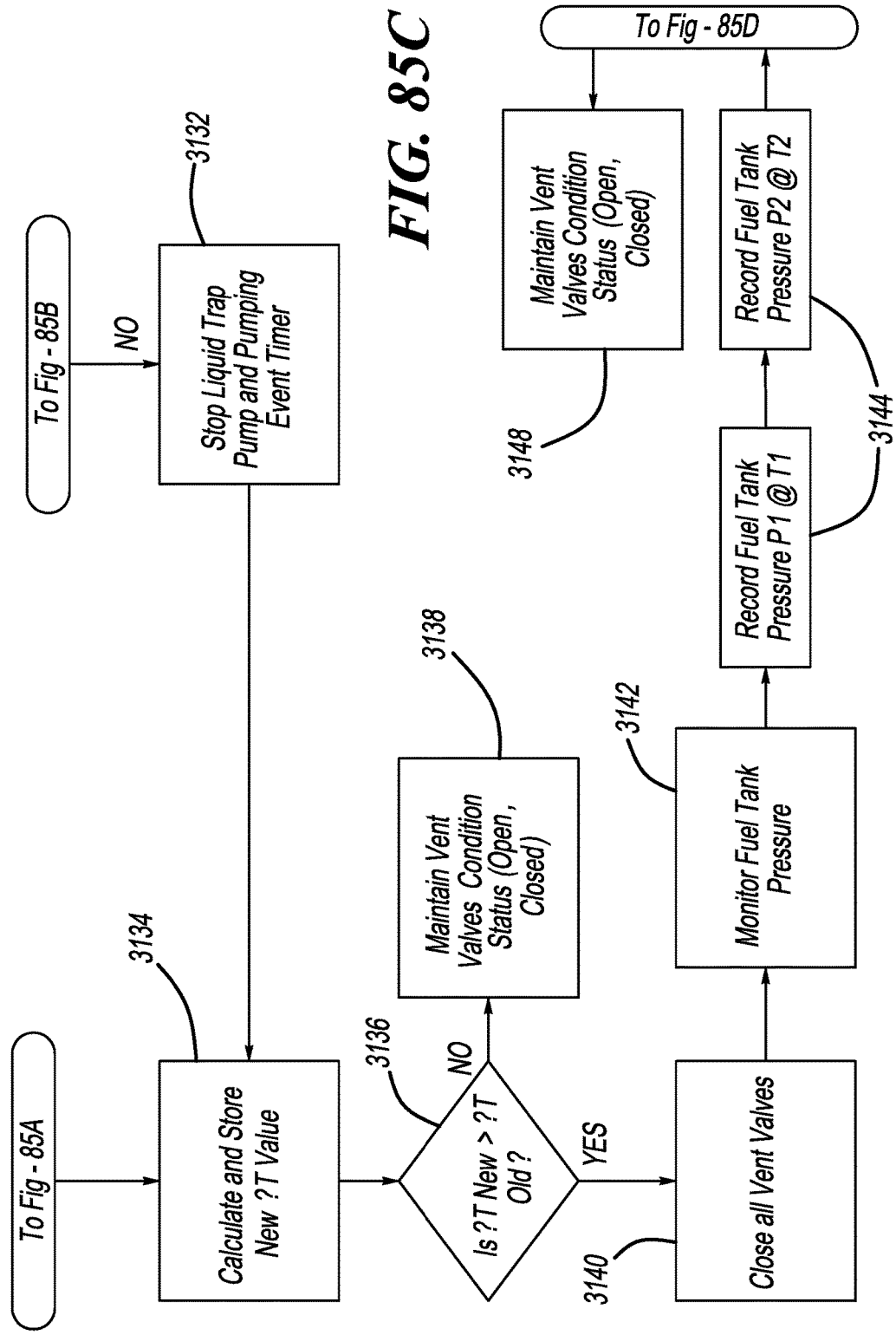
Figure 85D:
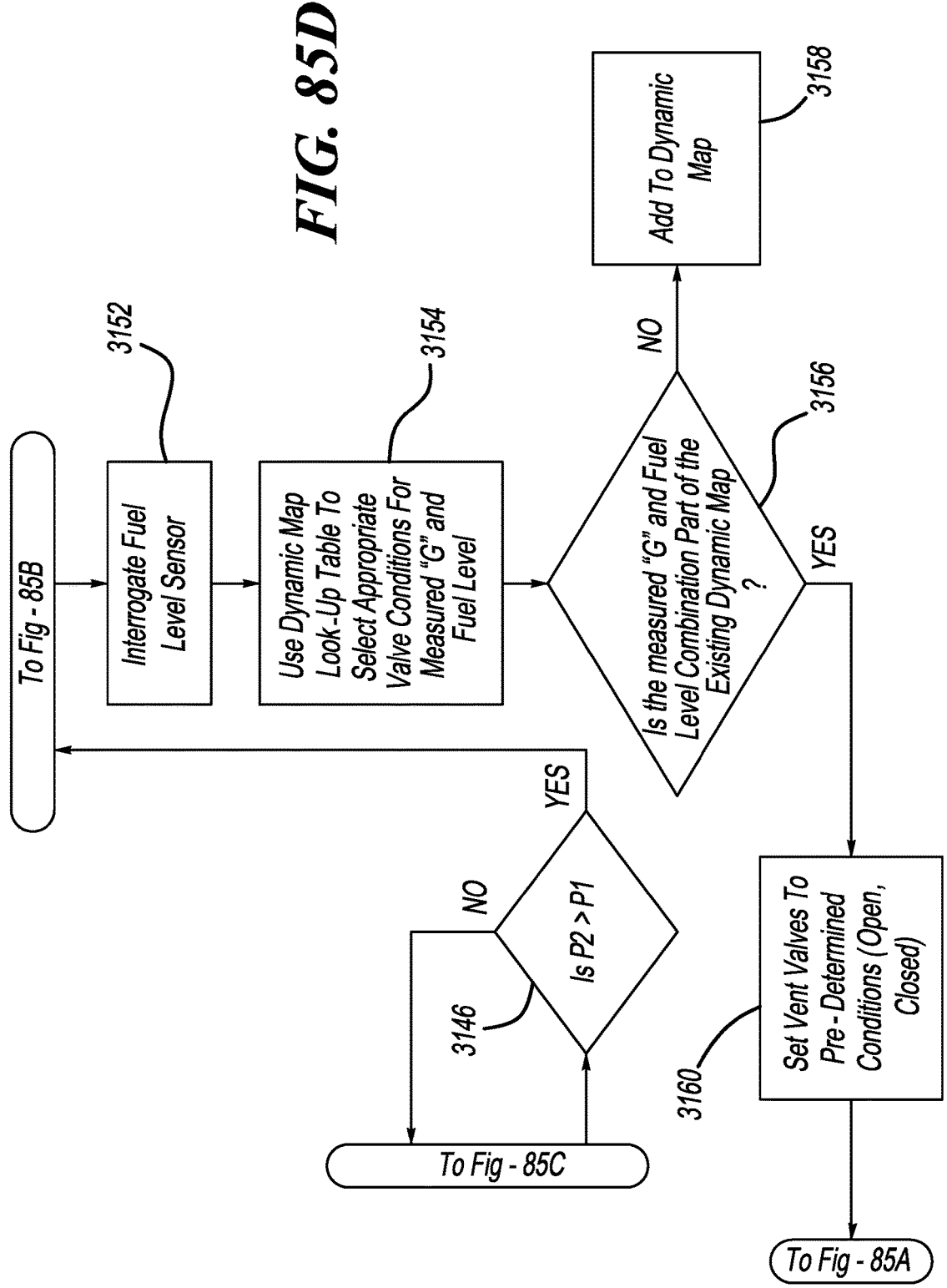
Figure 86:
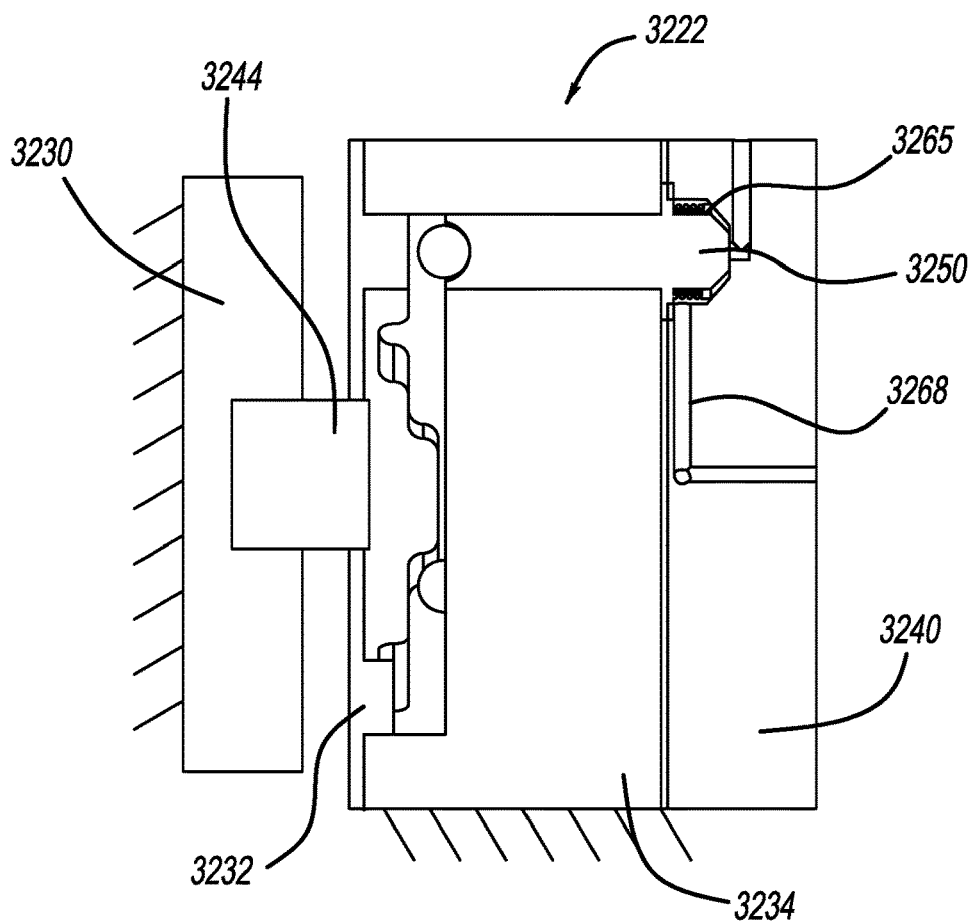
FIG. 86 is a sectional view of a vent shut-off assembly constructed in accordance to another example of the present disclosure.
Figure 89:
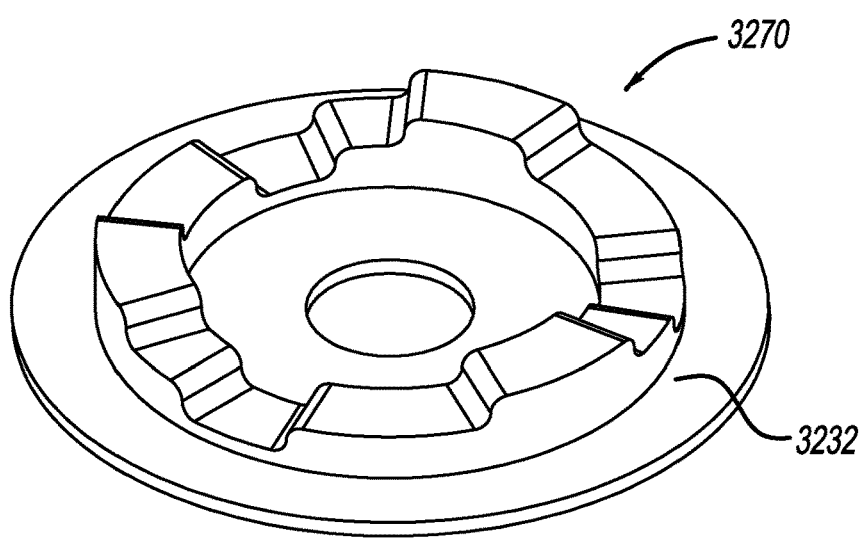
FIG. 89 is a top perspective view of the disk of FIG. 88.
Figure 87:
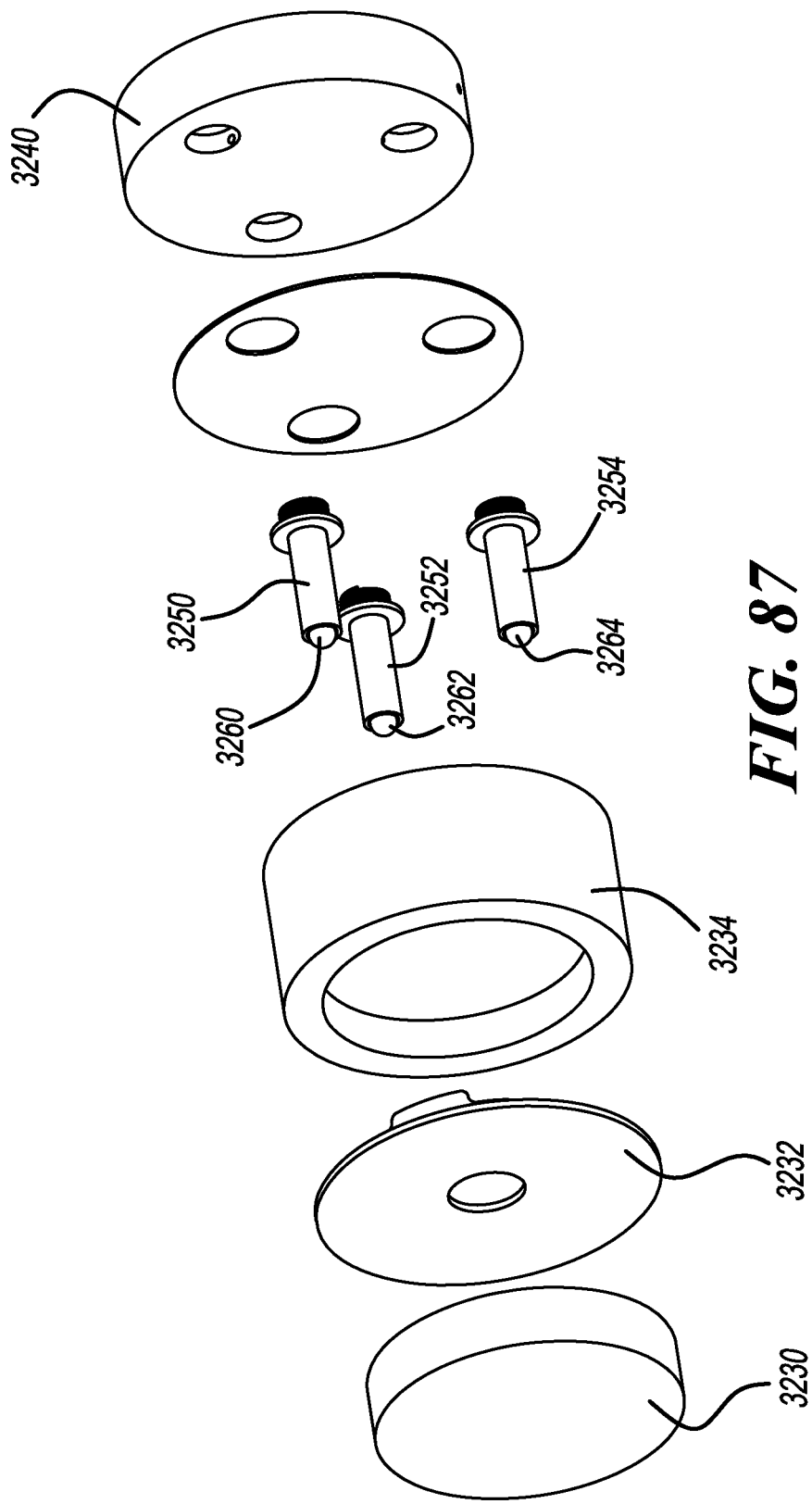
FIG. 87 is an exploded view of the vent shut-off assembly of FIG. 86.
Figure 88:
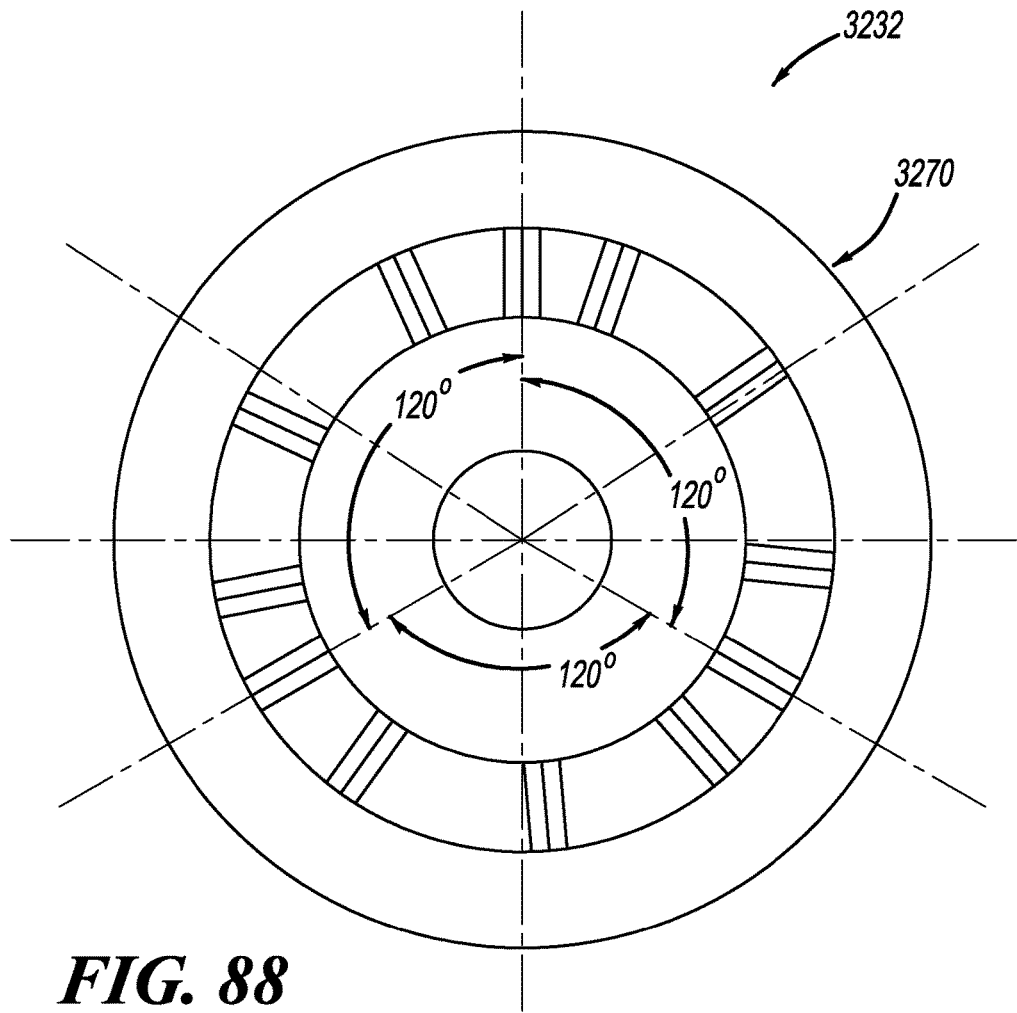
FIG. 88 is a top view of a disk of the vent shut-off assembly of FIG. 86.
Figure 90:
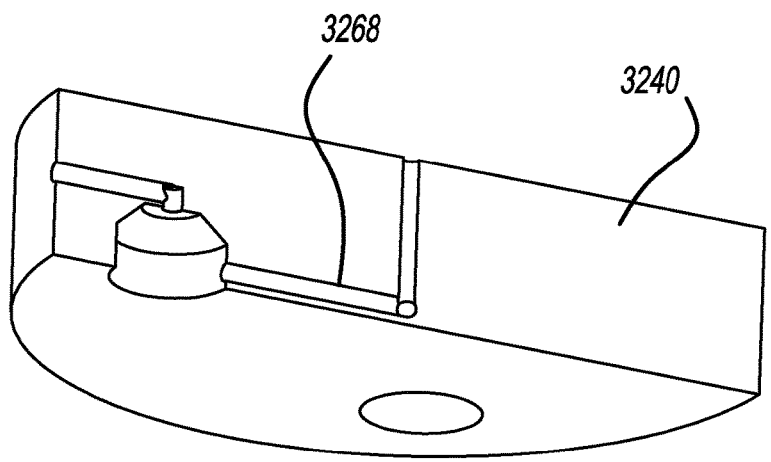
FIG. 90 is a partial sectional view of a manifold of the vent shut-off assembly of FIG. 86.

With reference now to FIGS. 82-84, a fuel tank system 3010 arranged on a fuel tank 3012 having an evaporative emissions control system 3020 constructed in accordance to additional features of the present disclosure will be described. Unless otherwise described, the fuel system 3010 and evaporative emissions control system 3020 can be constructed similarly to the evaporative emissions control system 1020 discussed above. The fuel tank system 3010 provides a mechanical shut-off that will prevent fuel tank overfilling in the case of power loss.

The evaporative emissions control system 3020 generally includes a vent shut-off assembly 3022 having a manifold assembly 3024. A liquid trap 3026 and pump 3028 can be arranged in the manifold assembly 3024. that routs to a first line 3040 having a first outlet 3042, a second vent line 3044 having a second outlet 3046, a third vent line 3048 having a third outlet 3050 and a fourth vent line 3052 that routs to a canister (see canister 1032). Baffles 3060, 3062 and 3064 can be arranged at the first, second and third outlets 3042, 3046 and 3050.

The baffle 3062 is a refueling baffle arranged in elevation lower than the first and third outlets 3042 and 3050. The refueling baffle 3062 includes a flow shut-off mechanism 3066 that moves from an open position to a closed position based on liquid fuel rising.

A baffle 3062A constructed in accordance to one example of the present disclosure is shown in FIG. 83. The baffle 3062A includes a baffle housing 3070 that defines windows 3072 therein. A cup 3074 is slidably received by the baffle housing 3070 and is configured to rise from the solid position shown in FIG. 83 to the phantom position shown in FIG. 83. In the solid position, vapor flow is permitted through the windows 3072 and through the second vent line 3044 to the liquid trap 3026. When fuel rises beyond a desired fuel fill level 3076A to a higher fuel fill level 3076B, the cup 3074 rises to the closed position shown in phantom where vapor flow is inhibited from passing through the windows 3072 and to the second vent line 3044 to the liquid trap 3026.

A baffle 3062B constructed in accordance to another example of the present disclosure is shown in FIG. 84. The baffle 3062B includes a baffle housing 3080 that defines windows 3082 therein. A cup 3084 is slidably mounted to the baffle housing 3080 and is configured to rise from the solid position shown in FIG. 84 to the phantom position shown in FIG. 84. In the solid position, vapor flow is permitted through the windows 3082 and through the second vent line 3044 to the liquid trap 3026. When fuel rises beyond a desired fuel fill level 3076A to a higher fuel fill level 3076B, the cup 3084 rises to the closed position shown in phantom where vapor flow is inhibited from passing through the windows 3082 and to the second vent line 3044 to the liquid trap 3026. A disk 3090 coupled to the cup 3084 can also rise to cover the opening of the baffle housing 3080 in the closed position.

With reference to FIG. 85A-85D, an example method 3100 of controlling a fuel tank system is described in reference to fuel tank system 1010. Method 3100 can enable the control module to learn and adapt from monitored conditions to optimize venting of the fuel tank system and maintain the fuel tank pressure and/or the trap liquid level at acceptable levels.

Method 3100 includes, at step 3102, initiating a venting system or evaporative emissions control 1020 and setting vent valves 1040, 1042 based on a dynamic map look-up table (e.g., a dynamic map holding conditions such as vent solenoid states, G-peak, G-avg., fuel tank pressure, bulk fuel tank temperature, and fuel level). At step 3104, control module 1030 checks for liquid in the liquid trap 1026, for example, by cycling the smart drain pump and comparing a "dry" and "wet" inducting signature "h". At step 3106, control module 1030 subsequently determines if liquid is present in the liquid trap 1026 and/or the jet pump. If liquid is not present, at step 3108, control module 1030 starts a liquid trap check timer.

At step 3110, control module 1030 maintains the initial settings of the vent valves 1040, 1042. At step 3112, control module 1030 monitors fuel tank pressure and, at step 3114, subsequently records fuel tank pressures P1 . . . Pn at a predetermined time intervals T1 . . . Tn. At step 3116, control module 1030 determines if a monitored pressure (e.g., P2) is greater than a previously monitored pressure (e.g., P1). If yes, control proceeds to step 3150 described below. If no, at step 3118, control module 1030 maintains the vent valves 1040, 1042 in the current position. At step 3120, control module 1030 determines if the liquid trap check time has exceeded a predetermined time (e.g., 20 seconds). If not, control returns to step 3118. If yes, control returns to step 3104.

If liquid is detected at step 3106, control moves to step 3122 or step 3124. At step 3122, control module 1030 activates the liquid trap jet pump and proceeds to step 3124 or 3126. At step 3126, control module 1030 monitors the inductive signature "h" of the jet pump. At step 3128, control module determines if liquid is present in the liquid trap based on the inductive signature "h". If liquid is present, control module 1030 continues to operate the jet pump at step 3130. Control then returns to step 3128. If liquid is not present, control proceeds to step 3132.

At step 3132, control module 1030 deactivates jet pump and the pumping event timer. At step 3134, control module 1030 calculates and stores a new ΔT indicative of how long the pump was operated. At step 3136, control module 1030 determines if the new ΔT is greater than a previous ΔT (e.g., "old ΔT"). If no, at step 3138, control module 1030 maintains the vent valves 1040, 1042 in the current position and may subsequently return to step 3104. If yes, at step 3140, control module 1030 closes all vent valves.

At step 3142, control module 1030 monitors pressure in the fuel tank 1012 and proceeds to step 3144, subsequently records fuel tank pressures P1 . . . Pn at a predetermined time intervals T1 . . . Tn. At step 3146, control module 1030 determines if a monitored pressure (e.g., P2) is greater than a previously monitored pressure (e.g., P1). If no, at step 3148, control module 1030 maintains the vent valves 1040, 1042 in the current position. If yes, control proceeds to step 3150.

Returning to step 3150, control module 1030 monitors G-sensor 1060E and determined G-peak and G-avg over a predetermined time (e.g., five seconds). In step 3150, the control module 1030 determines the average "G" force applied to the system and records the G-peak. At step 3152, control module 1030 interrogates the fuel level sensor 1048.

At step 3154, control module 1030 uses a dynamic map look-up table to select appropriate valve conditions for the measured "G" and fuel level. At step 3156, control module 1030 determines if the captured system states are within predetermined limits. If no, control proceeds to step 3158. If yes, at step 3160, control module 1030 sets the vent valves to predetermined conditions at step 3160. If not, the control module 1030 adds to a dynamic map.

Returning to FIG. 1, the energy storage device 1034 can include a capacitor, battery, pre-loaded valve or other device. The energy storage device 1034 can be connected to the vent shut-off assembly 1022 for providing power to the associated actuator (solenoids, motor etc.) in the event of power loss. The energy storage device 1034 has sufficient power to rotate the cam assembly 1130 (see FIG. 8) plus have logic that confirms the orientation of the shaft 1132. One example includes reading an encoder or accessing a last recorded angle from memory. Other examples are contemplated. The actuator assembly 1110 will rotate the shaft 1132 to a designated angle where the system will remain until power is restored. If the system is able to access current or recent accelerometer data and or fill volumes, the information can be used to define the state to rotate to. In other examples there may be a universal default state.

Exemplary fault states will now be described. If the accelerometer 1060E identifies the vehicle is upside down, all valves are rotated closed. If the accelerometer 1060E identifies a potential front end collision, valves associated with the front of the fuel tank are closed while valve associated with the rear of the fuel tank are open. If the accelerometer 1060E identifies the vehicle is at rest or cruise and the fuel volume is half-full, the actuator assembly 1110 rotates the shaft 1132 to open the first and second valves.

With reference now to FIGS. 86-90, a vent shut-off assembly 3222 constructed in accordance to another example of the present disclosure will be described. The vent shut-off assembly 3222 can be used with any of the actuator assemblies described herein for opening and closing various vent ports. In the example shown, the vent shut-off assembly 3222 includes an actuator assembly 3230, a cam disk 3232, a follower guide 3234 and a manifold 3240. In the example shown, the actuator assembly 3230 includes a rotary solenoid or stepper motor. The disk 3232 is mounted on an output shaft 3244 of the actuator assembly 3230.

First, second and third poppet valves 3250, 3252 and 3254 are arranged for translation along respective bores defined in the follower guide 3234. Each of the first, second and third poppet valves 3250, 3252 and 3254 have a cam follower 3260, 3262 and 3264, respectively at a terminal end thereof and an overmold rubber seal (identified at 3265) at an opposite end. The manifold 3240 defines various fluid paths such as fluid path 3268 to vent the fuel tank to various vents in the fuel tank such as described herein.

The cam plate 3232 includes a cam profile 3270 that includes various peaks and valleys. When the cam plate 3232 is rotated by the actuation assembly 3230, the cam profile 3270 engages the respective cam followers 3260, 3262 and 3264 and urges the respective first, second and third poppet valves 3250, 3252 and 3254 open and closed.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fuel tank system comprising:
a fuel tank;
a first vent tube disposed in the fuel tank;
an evaporative emissions control system configured to recapture and recycle emitted fuel vapor, the evaporative emissions control system having a controller; and
a cam driven tank venting control assembly having a rotary actuator that rotates a cam assembly based on operating conditions, the cam assembly having at least a first cam having a first cam profile configured to selectively open and close the first vent tube based on operating conditions.

2. The fuel tank system of claim 1 wherein the first cam profile has profiles that correspond to at least a fully closed valve position, a fully open valve position and a partially open valve position.

3. The fuel tank system of claim 1, further comprising:
a second vent tube disposed in the fuel tank.

4. The fuel tank system of claim 3 wherein the cam assembly further comprises:
a second cam having a second cam profile configured to selectively open and close the second vent tube based on operating conditions.

5. The fuel tank system of claim 4 wherein the second cam profile has profiles that correspond to at least a fully closed valve position, a fully open valve position and a partially open valve position.

6. The fuel tank system of claim 4, further comprising a third cam having a third cam profile and a fourth cam having a fourth cam profile, the third cam profile configured to selectively open and close a third vent tube disposed in the fuel tank, the fourth cam profile configured to selectively open and close a fourth vent tube disposed in the fuel tank.

7. The fuel tank system of claim 1, further comprising a first valve, wherein the first valve selectively opens and closes based on rotation of the first cam.

8. The fuel tank system of claim 4, further comprising a second valve, wherein the second valve selectively opens and closes based on rotation of the second cam.

9. The fuel tank system of claim 8 wherein at least one of the first and second valves is a poppet valve.

10. A fuel tank system comprising:
a fuel tank;
a first vent line disposed in the fuel tank;
an evaporative emissions control system configured to recapture and recycle emitted fuel vapor, the evaporative emissions control system having a controller; and
a cam driven tank venting control assembly having:
a rotary actuator that rotates a cam assembly based on operating conditions, the cam assembly having at least a first cam having a first cam profile; and
a first valve that opens and closes a first port based on a position of the first cam, the first valve selectively communicating vapor to the first vent line based on operating conditions.

11. The fuel tank system of claim 10 wherein the first vent line is fluidly coupled between the first port and a first vent opening within the fuel tank.

12. The fuel tank system of claim 10, further comprising:
a housing that at least partially houses the rotary actuator; and
wherein the rotary actuator includes a motor disposed on the housing and configured to rotate the cam assembly.

13. The fuel tank system of claim 12 wherein the motor is a stepper motor.

14. The fuel tank system of claim 10 wherein the cam assembly further comprises:
a second vent line disposed in the fuel tank;
a second cam having a second cam profile; and
a second valve that opens and closes a first port based on a position of the second cam, the second valve selectively communicating vapor to the second vent line based on operating conditions.

15. The fuel tank system of claim 14 wherein the second vent line is a canister vent line that is fluidly coupled between the second port and a purge canister.

16. The fuel tank system of claim 14 wherein the cam assembly further comprises:
a third vent line disposed in the fuel tank;
a third cam having a third cam profile; and
a third valve that opens and closes a third port based on a position of the third cam, the third valve selectively communicating vapor to the third vent line based on operating conditions.

17. The fuel tank system of claim 16 wherein the third vent line is fluidly coupled between the third port and a second vent opening within the fuel tank.

18. The fuel tank system of claim 17 wherein the third port is configured solely as a refueling port that is opened and closed based on a refueling event.

19. The fuel tank system of claim 12, further comprising a drain configured on the housing.

20. A fuel tank system comprising:
a fuel tank;
a first vent line disposed in the fuel tank;
a second vent line disposed in the fuel tank;
an evaporative emissions control system configured to recapture and recycle emitted fuel vapor, the evaporative emissions control system having a controller; and
a cam driven tank venting control assembly having:
a rotary actuator that rotates a cam assembly, the cam assembly having a first cam having a first cam profile and a second cam having a second cam profile;
a first valve that opens and closes a first port based on a position of the first cam, the first valve selectively communicating vapor to the first vent line based on operating conditions, wherein the first vent line is fluidly coupled between the first port and a first vent opening arranged in a vapor space within the fuel tank;
a second valve that opens and closes a second port based on a position of the second cam, the second valve selectively communicating vapor to the second vent line based on operating conditions, wherein the second vent line is fluidly coupled between the second port and a purge canister;
a housing that at least partially houses the rotary actuator; and
wherein the rotary actuator includes a motor disposed on the housing and configured to rotate the cam assembly.

* * * * *